(12) United States Patent
Pearson et al.

(10) Patent No.: US 10,515,371 B2
(45) Date of Patent: *Dec. 24, 2019

(54) INTERACTIVE NETWORKING SYSTEMS WITH USER CLASSES

(71) Applicant: GREGORY A. PEARSON, INC., Dunedin, FL (US)

(72) Inventors: Gregory A. Pearson, Dunedin, FL (US); Ronald Shane Hamilton, St. Petersburg, FL (US); David B. Hall, New Port Richey, FL (US); Joseph J. Cahill, St. Petersburg, FL (US); Nicholas N. Panone, St. Petersburg, FL (US)

(73) Assignee: Gregory A. Pearson, Inc., Dunedin, FL (US)

( * ) Notice: Subject to any disclaimer, the term of this patent is extended or adjusted under 35 U.S.C. 154(b) by 940 days.

This patent is subject to a terminal disclaimer.

(21) Appl. No.: 14/950,166

(22) Filed: Nov. 24, 2015

(65) Prior Publication Data

US 2016/0078440 A1 Mar. 17, 2016

Related U.S. Application Data

(63) Continuation of application No. 13/115,277, filed on May 25, 2011, now Pat. No. 9,275,247, which is a (Continued)

(51) Int. Cl.
*G06Q 20/40* (2012.01)
*G06F 21/62* (2013.01)
(Continued)

(52) U.S. Cl.
CPC ....... *G06Q 20/405* (2013.01); *G06F 21/6218* (2013.01); *G06Q 30/0609* (2013.01);
(Continued)

(58) Field of Classification Search
CPC ..... H04L 12/588; H04L 51/32; H04L 67/306; G06Q 30/0269; G06Q 30/0222; G06Q 30/02; G06F 3/0481
See application file for complete search history.

(56) References Cited

U.S. PATENT DOCUMENTS 5,467,388 A 11/1995 Redd, Jr. et al.
5,469,536 A 11/1995 Blank et al.
(Continued)

OTHER PUBLICATIONS

Knowledge Market. Wikipedia [online], [retrieved on Jul. 28, 2013]. Retrieved from the Internet <URL: http://en.wikipedia.org/wiki/Knowledge_market>.
(Continued)

*Primary Examiner* — Haoshian Shih
(74) *Attorney, Agent, or Firm* — Troutman Sanders LLP; James E. Schutz; Christopher C. Close, Jr.

(57) ABSTRACT

A networking system may comprise a web site incorporating a combination of one or more of the following: a crediting system, a chat bidding system, a performance bidding system, a telephony switching system, a media interaction system, a display system, a photo management system, and a messaging system. The networking system may categorize each user of the web site into classes, including a featured class, a common class, a sponsored class, and a sponsoring class. The networking system may facilitate user interactions, some of which may be partially dependent on user classes. A featured user may opt to temporarily appear as a common user, thus activating an alternative user profile and hiding his featured status. A sponsored user may participate in interactions on the web site if a sponsoring user offers his credits to pay for the sponsored member's participation. Other aspects of the networking system are also disclosed herein.

7 Claims, 28 Drawing Sheets

Related U.S. Application Data continuation-in-part of application No. 12/709,205, filed on Feb. 19, 2010, now Pat. No. 9,350,773, and a continuation-in-part of application No. 12/237,316, filed on Sep. 24, 2008.

(60) Provisional application No. 61/059,444, filed on Jun. 6, 2008, provisional application No. 60/974,723, filed on Sep. 24, 2007.

(51) Int. Cl.
*H04L 12/58* (2006.01)
*H04L 29/08* (2006.01)
*G06Q 30/06* (2012.01)
*G06Q 50/00* (2012.01)

(52) U.S. Cl.
CPC ............ *G06Q 50/01* (2013.01); *H04L 51/32* (2013.01); *H04L 67/306* (2013.01)

(56) References Cited

U.S. PATENT DOCUMENTS

| | | | |
|---|---|---|---|
| 5,473,671 | A | 12/1995 | Partridge, III |
| 5,826,244 | A | 10/1998 | Huberman |
| D420,995 | S | 2/2000 | Imamura et al. |
| 6,148,067 | A | 11/2000 | Leipow |
| 6,157,829 | A | 12/2000 | Grube et al. |
| 6,285,989 | B1 | 9/2001 | Shoham |
| 6,856,986 | B1 | 2/2005 | Rossides |
| 6,920,632 | B2 | 7/2005 | Donovan et al. |
| 7,046,782 | B2 | 5/2006 | Miller |
| 7,124,186 | B2 | 10/2006 | Piccionelli |
| 7,155,001 | B2 | 12/2006 | Tiliks et al. |
| 7,165,213 | B1 | 1/2007 | Busey |
| 7,307,636 | B2 | 12/2007 | Matraszek et al. |
| 7,317,787 | B2 | 1/2008 | Crockett et al. |
| 7,457,769 | B2 | 11/2008 | Goren et al. |
| D589,970 | S | 4/2009 | Bhat et al. |
| D590,414 | S | 4/2009 | Bhat et al. |
| D593,114 | S | 5/2009 | Vakkalanka |
| D597,552 | S | 8/2009 | White et al. |
| D598,929 | S | 8/2009 | Bhat et al. |
| D602,036 | S | 10/2009 | Kasuya et al. |
| D602,038 | S | 10/2009 | Channell et al. |
| 7,610,234 | B2 | 10/2009 | Moriyama et al. |
| 7,636,673 | B2 | 12/2009 | Yoneda |
| D609,716 | S | 2/2010 | White et al. |
| D614,636 | S | 4/2010 | Comertoglu |
| D617,335 | S | 6/2010 | Ehrler et al. |
| D623,193 | S | 9/2010 | Cameron et al. |
| D629,418 | S | 12/2010 | Brown et al. |
| D632,698 | S | 2/2011 | Judy et al. |
| 7,945,469 | B2 | 5/2011 | Cohen et al. |
| 8,005,697 | B1 | 8/2011 | Cohen et al. |
| 8,169,436 | B2 | 5/2012 | Rivera et al. |
| D669,090 | S | 10/2012 | Rosen |
| D681,048 | S | 4/2013 | Freiberger |
| D684,180 | S | 6/2013 | Chutani et al. |
| D689,506 | S | 9/2013 | Yanagawa |
| D691,157 | S | 10/2013 | Ramesh et al. |
| D691,158 | S | 10/2013 | Ramesh et al. |
| D696,277 | S | 12/2013 | Lee et al. |
| D696,689 | S | 12/2013 | Lee et al. |
| 2001/0026609 | A1 | 10/2001 | Weinstein et al. |
| 2001/0034697 | A1 | 10/2001 | Kaen |
| 2001/0042038 | A1 | 11/2001 | Phatak |
| 2002/0087382 | A1 | 7/2002 | Tiburcio |
| 2002/0099801 | A1 | 7/2002 | Ishii |
| 2002/0131445 | A1 | 9/2002 | Skubic et al. |
| 2002/0147674 | A1 | 10/2002 | Gillman |
| 2002/0167522 | A1 | 11/2002 | Miyazawa |
| 2003/0043983 | A1 | 3/2003 | Pelletier et al. |
| 2003/0078873 | A1 | 4/2003 | Cohen |
| 2003/0084051 | A1 | 5/2003 | Depura et al. |
| 2004/0034697 | A1 | 2/2004 | Fairhurst et al. |
| 2004/0039455 | A1 | 2/2004 | Donovan et al. |
| 2004/0162763 | A1 | 8/2004 | Hoskin et al. |
| 2004/0247105 | A1 | 12/2004 | Mullis et al. |
| 2004/0263631 | A1 | 12/2004 | Brittan et al. |
| 2005/0013429 | A1 | 1/2005 | Bensman |
| 2005/0052685 | A1 | 3/2005 | Herf et al. |
| 2005/0129206 | A1 | 6/2005 | Martin |
| 2005/0149428 | A1 | 7/2005 | Gooch et al. |
| 2005/0182705 | A1 | 8/2005 | McLemore et al. |
| 2005/0216841 | A1 | 9/2005 | Acker et al. |
| 2005/0240507 | A1 | 10/2005 | Galen et al. |
| 2006/0018208 | A1 | 1/2006 | Nathan et al. |
| 2006/0085408 | A1 | 4/2006 | Morsa |
| 2006/0212383 | A1 | 9/2006 | Campion et al. |
| 2007/0046694 | A1 | 3/2007 | Aizikowitz et al. |
| 2007/0073610 | A1 | 3/2007 | Marugabandhu et al. |
| 2007/0081649 | A1 | 4/2007 | Baudino et al. |
| 2007/0162432 | A1 | 7/2007 | Armstrong et al. |
| 2007/0165608 | A1 | 7/2007 | Altberg et al. |
| 2007/0219863 | A1 | 9/2007 | Park et al. |
| 2007/0219958 | A1 | 9/2007 | Park et al. |
| 2007/0223671 | A1 | 9/2007 | Lee |
| 2007/0238498 | A1 | 10/2007 | Ryckman et al. |
| 2007/0247979 | A1 | 10/2007 | Brillon et al. |
| 2007/0269035 | A1 | 11/2007 | Joy et al. |
| 2008/0008440 | A1 | 1/2008 | Shore et al. |
| 2008/0046803 | A1 | 2/2008 | Beauchamp et al. |
| 2008/0091771 | A1 | 4/2008 | Allen et al. |
| 2008/0306853 | A1 | 12/2008 | McLemore et al. |
| 2008/0319860 | A1 | 12/2008 | Hinkis |
| 2009/0031232 | A1 | 1/2009 | Brezina et al. |
| 2009/0037315 | A1 | 2/2009 | Chu |
| 2009/0037413 | A1 | 2/2009 | Castell et al. |
| 2009/0144376 | A1 | 6/2009 | Moscatelli et al. |
| 2009/0181653 | A1 | 7/2009 | Alharayeri |
| 2009/0326970 | A1 | 12/2009 | Estrada et al. |
| 2009/0327906 | A1 | 12/2009 | Heinemann |
| 2010/0167648 | A1 | 7/2010 | Doutriaux |
| 2010/0255825 | A1 | 10/2010 | Bontempi et al. |
| 2011/0054991 | A1 | 3/2011 | Orellana et al. |
| 2011/0137743 | A1 | 6/2011 | Campion et al. |
| 2011/0252340 | A1 | 10/2011 | Thomas |

OTHER PUBLICATIONS

Get Paid to Answer Questions Online at ChaCha.com [online], [retrieved on Jul. 27, 2013]. Retrieved from the Internet <URL: http://www.searchrank.com/blog/2006/09/chacha.html>.

Forrest, B. NowNow & Askville from Amazon, Oct. 25, 2006 [online], [retrieved on Jul. 27, 2013]. Retrieved from the Internet <URL: http://radar.oreilly.com/2006/10/nownow-askville-from-amazon.html>.

Experts-Exchange. Wikipedia [online], [retrieved on Jul. 27, 2013]. Retrieved from the Internet <URL: http://en.wikipedia.org/wiki/Experts-Exchange>.

Cashmore, P. ChaCha Launches—MySpace Meets Search, Sep. 4, 2006 [online], [retrieved on Jul. 27, 2013]. Retrieved from the Internet <URL: http://mashable.com/2006/09/04/chacha-launches-social-networking-meets-search/ >.

Liang, et al, Understanding KaZaA; Polytechnic University; Brooklyn, NY 11201; Mar. 2004; pp. 1-7.

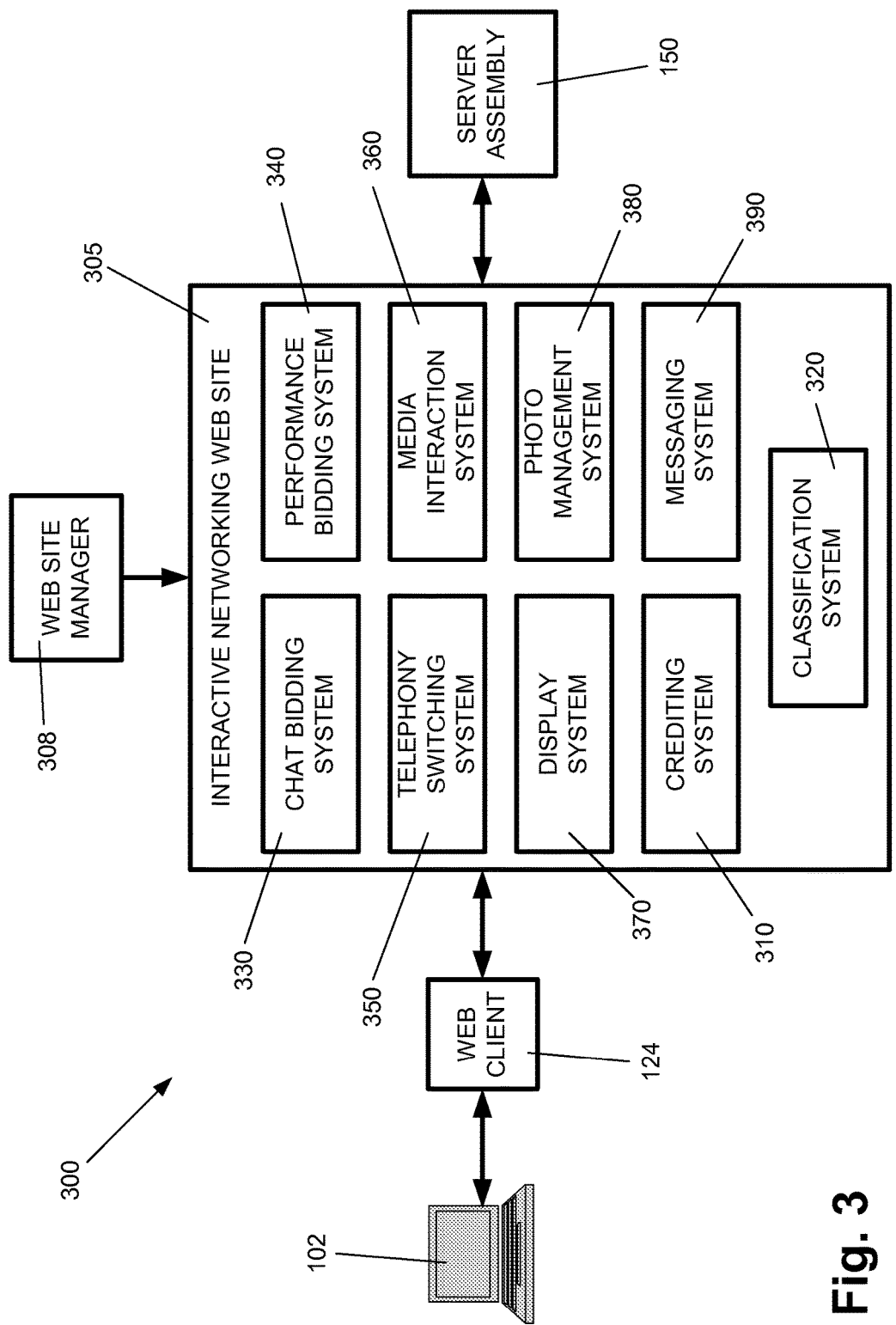

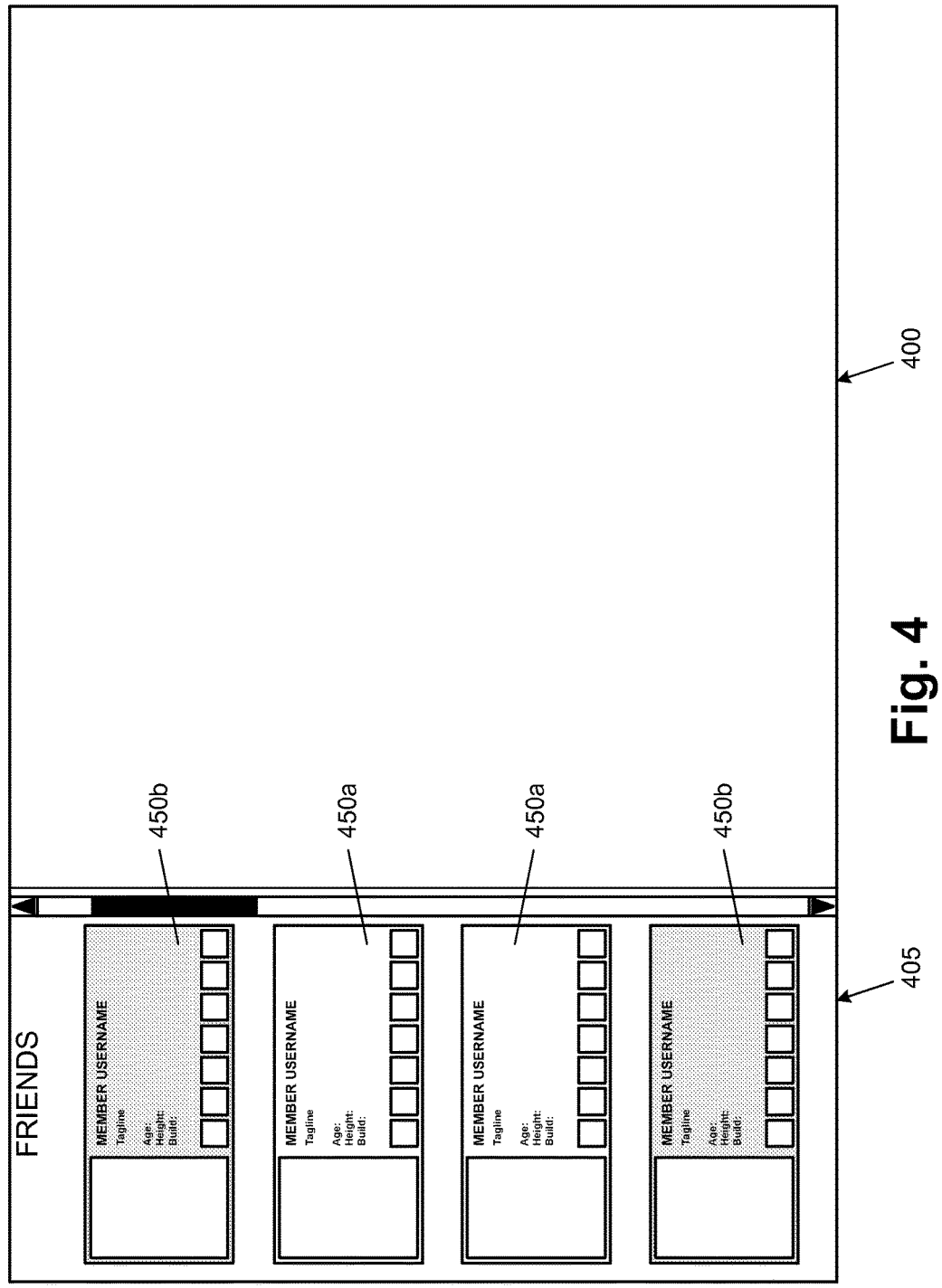

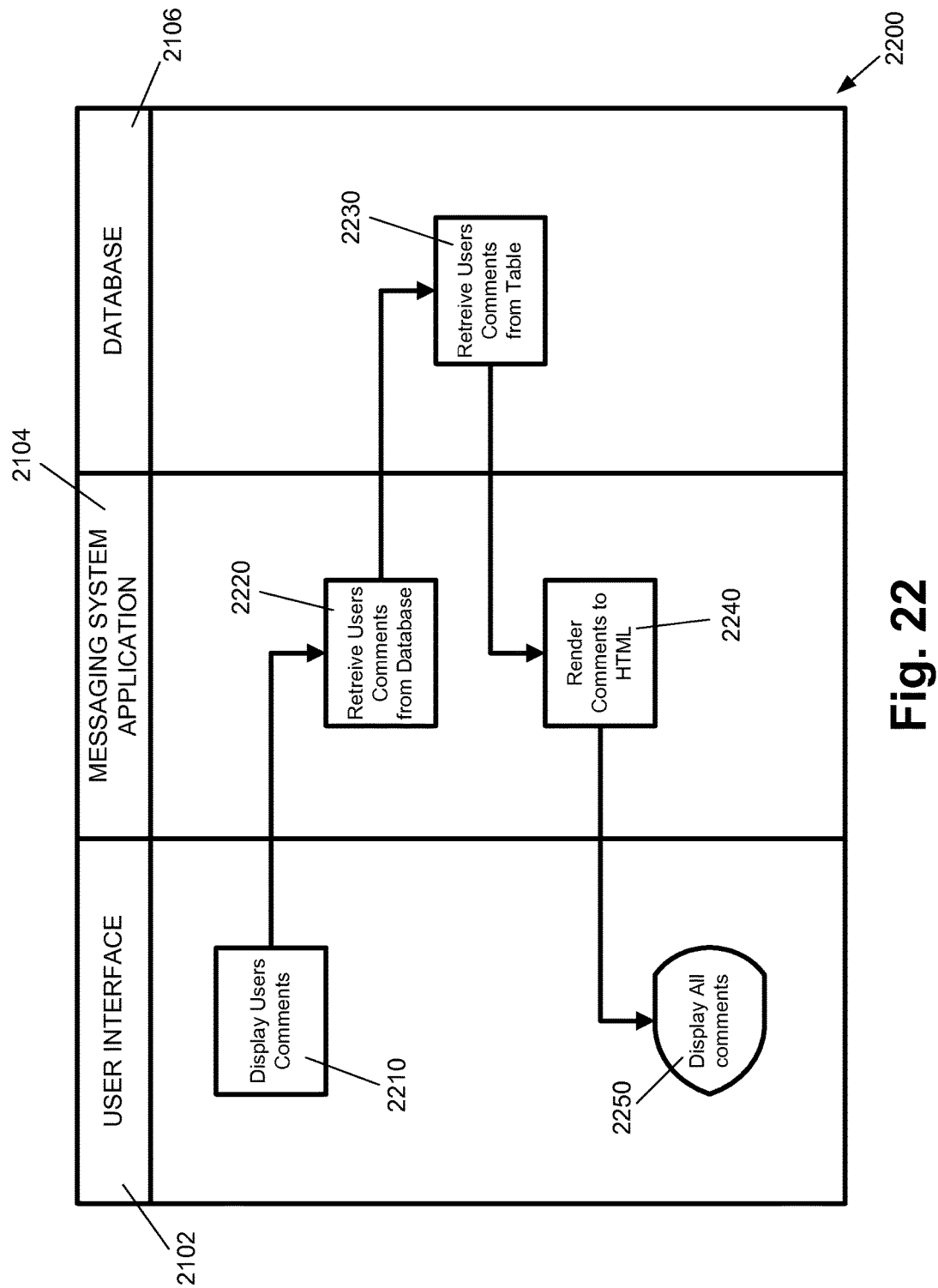

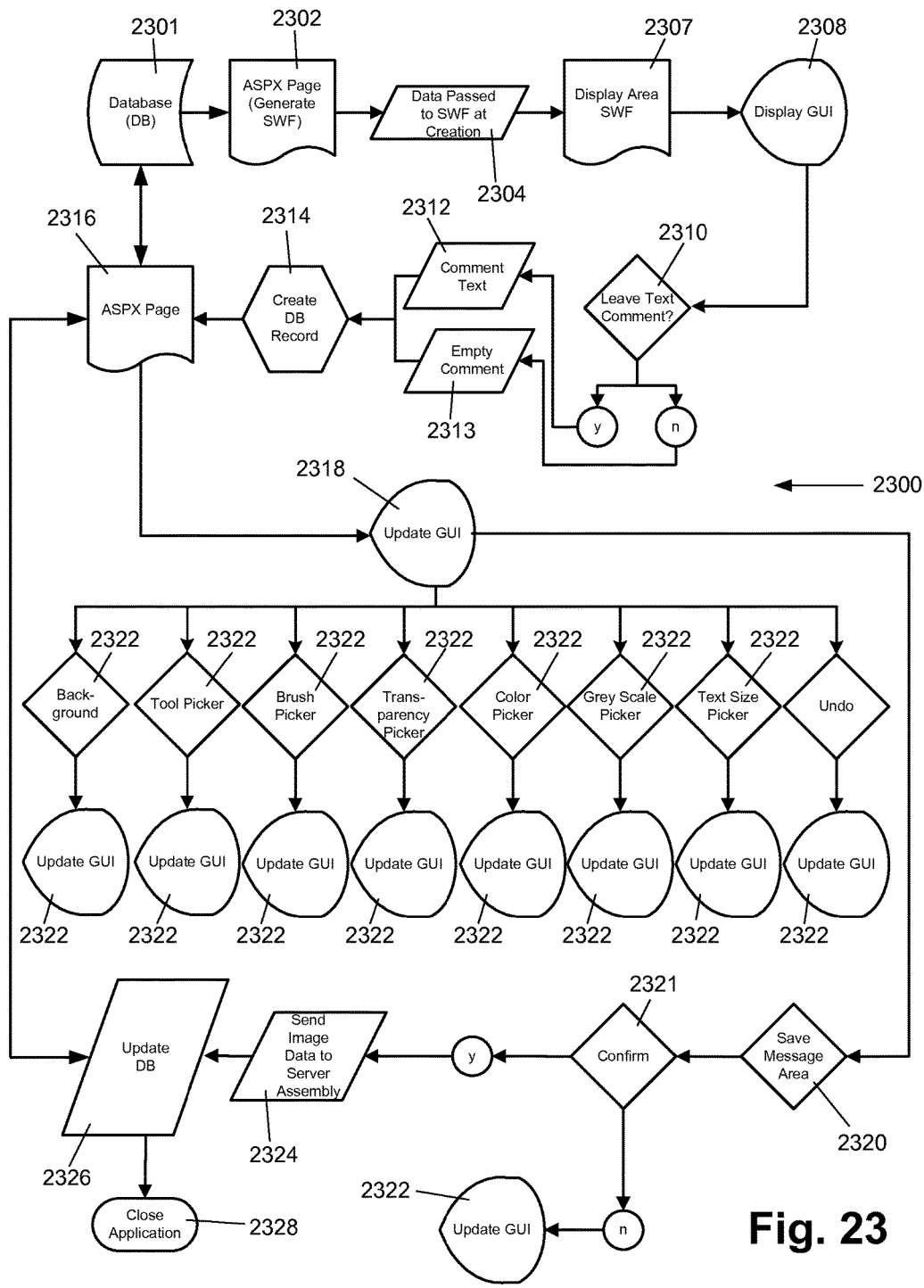

INTERACTIVE NETWORKING SYSTEMS WITH USER CLASSES

CROSS-REFERENCE TO RELATED APPLICATIONS

This application is a continuation and claims the benefit, under 35 U.S.C. § 120, of U.S. patent application Ser. No. 13/115,277, filed 25 May 2011, which is a continuation-in-part and claims the benefit, under 35 U.S.C. § 120, of U.S. patent application Ser. No. 12/237,316, filed 24 Sep. 2008, which claims priority and the benefit, under 35 U.S.C. § 119(e), of both U.S. Provisional Patent Application 60/974,723, filed 24 Sep. 2007, and U.S. Provisional Patent Application 61/059,444, filed 6 Jun. 2008, and which also is a continuation-in-part and claims the benefit, under 35 U.S.C. § 120, of U.S. patent application Ser. No. 12/709,205, filed 19 Feb. 2010. The disclosures of all five of these priority applications are hereby incorporated by reference as if fully set forth below.

BACKGROUND

1. Technical Field

Various aspect of the present invention relate to social and professional networking and, more particularly, to interactive networking systems for enabling interaction between users belonging to one or more classes.

2. Description of Related Art

Conventional social and professional networking systems enable users to interact with one another via various networking protocols. These systems provide a variety of services, but they generally lack the ability to classify a user's network of contacts to provide varying levels of communication capabilities among different levels of users.

Such conventional systems are also not designed for serving as social or professional networking and communications platforms where certain individuals are highly sought after communication partners. For example, while celebrities are able to register and utilize conventional networking systems to communicate directly with their friends and acquaintances, celebrities do not currently have the ability to selectively allow communications from their fans.

These conventional systems are also generally limited in how they allow various users to communicate with one another. For example, conventional systems generally limit inter-user communications to chat rooms, message boards, and/or private email messages.

Therefore, there is a need in the art for a system that provides increased communications capabilities.

There is also a need for a networking system whereby users can control communication capabilities pertaining to communications with other users, where such controls may be at least partially based on a class of such users.

There is a further need for such a networking system having safety controls enabling member interactions while allowing a receiving party to establish criteria controlling receipt of communications.

There is a further need for such a networking system, in which celebrities may communicate directly with fans in a virtual environment providing real-time interaction.

It is to such a networking system that that the present invention is directed.

SUMMARY

Exemplary embodiments of the present invention may include interactive networking systems providing various communication features. Embodiments may allow multiple user classes. In an exemplary embodiment, the networking system may comprise any or all of various components, including a classification system, a crediting system, a chat bidding system, a performance bidding system, a telephony switching system, a media interaction system, a display system, a photo management system, and a messaging system.

To enable operation of such components of the networking system, the networking system may additionally comprise a server assembly. The server assembly may comprise one or more web servers for hosting the web site. A user may interact with the web site through a web client adapted to display the web site. The web client may receive requests from the user and direct such requests to the server assembly. The server assembly may call various operations or programs to implement components and operations of the web site. The server assembly may send responses to user requests through the web client to the user.

The classification system may categorize each user into one or more classes, and may dynamically update the class of each user as needed. For example, and not limitation, the networking system may include a featured class, a common or regular class, a sponsored class, a sponsoring class, or a combination of these classes. The featured class may include users who are deemed desirable contacts for other users. For example, celebrities subscribed to the networking system may be members of the featured class. The sponsored class may include users whose activities associated with the networking system are paid for by one or more other users. The sponsoring class may include sponsors of those included in the sponsored class. The common class may include users who are not featured users or, in some embodiments, users who belong to no other class.

The classification system may associate each user account with one or more classes to which the corresponding user belongs. In some embodiments, the classification system may temporarily or permanently change a user's classes as needed. A first user who is a featured user, for example, may request a temporary switch from the featured class to the common class. The classification system may then automatically and dynamically update the web site to indicate that the first user is a member of the common class, without the featured user having to log out and log back into a different account. While the first user is temporarily treated as a common user, a representation of the first user viewed by another user may be a particular representation used for the common class. Accordingly, the featured user may essentially hide his or her featured status on demand.

The crediting system may manage credit associated with the user accounts. Each user of the web site may have, or be associated with, a user account for accessing the web site. According to the crediting system of the networking system, each user account may be associated with a credit account for purchasing services from the web site. The credit account may represent virtual funds for use on the web site. When a first user's credit account is less than or equal to a predetermined threshold, such as zero, the first user may automatically become a member of the sponsored class. Other members may then opt to use their own credits for interactions with the sponsored first user in situations where the first user would otherwise have the option of using his or her own credits.

The chat bidding system, if included, may enable common users to pose tasks to a featured user in an organized manner. The chat bidding system may generally comprise a featured user, a plurality of common users, and a tasks queue.

The featured user may represent a person or entity in which the common users have interest. For example, the featured user may be a celebrity, a doctor, a counselor, or the like. The featured user may use a featured user account to interact with the web site.

The common users may have an interest in the featured user. For example, the common users may be fans of the featured user. Through the chat bidding system, the common users may pose tasks to the featured user. A common user may pledge credits for a task, thereby associating the task with a bid value. The amount of the bid value may be debited from the user's credit account.

The tasks queue may comprise hardware, software, or a combination thereof, in communication with the server assembly. The tasks queue may organize the tasks in an order corresponding to the bids associated with the tasks.

Through a web client in communication with the server assembly, the featured user may be presented with the tasks in an order determined by the tasks queue and, therefore, determined by the bids associated with the tasks. For each presented task, the featured user may dispatch the task by responding to or skipping the task.

If included, the performance bidding system may enable users to perform on the web site in an organized manner. The performance bidding system may comprise a plurality of users and a performance queue.

Each user may request an opportunity to perform, and may associate such request with a bid. The bid value may represent a number of credits deducted from the user's account in return for the user's performance.

The performance queue may comprise hardware, software, or a combination thereof, in communication with the server assembly. The performance queue may organize the performance requests in an order corresponding to the bids associated with the requests. A user may be allowed to perform on the web site when the user's request reaches a top of the queue.

If included in the web site, the telephony switching system may enable anonymous contact between two parties having user accounts on the web site. The telephony switching system may generally comprise a first communication device, a second communication device, a service center, and a telephony switch.

The first communication device and second communication device may be registered with the service center, and such registration may occur over the web site. Each registration may include a set of contact rules specifying who may connect to the applicable communication device, and when such connections may occur.

A first user associated with the first communication device may request a connection to a second user associated with the second communication device. The service center may receive the request and, based on the contact rules, may determine whether the requested connection is allowed.

The telephony switch may be in communication with the service center. If the requested connection is allowed, the service center may forward the connection request to the telephony switch. In turn, the telephony switch may connect the first communication device to the second communication device. Accordingly, the two communication devices may be connected to each other without phone numbers of either communication device being shared with the other communication device.

If included in the web site, the media interaction system may enable a first user to interact with a second user by extending a media object to the second user. The media object may be customizable, and may comprise various media, including animations, audio, or text. The media object may overlay other objects displayed on a client computer of the first user and a client computer of the second user.

If included, a display system may enable color and theme changes of the web site as viewed by a web client. Based on a user request, a color scheme and theme of the web site may be altered in response to a user request.

The photo management system, if included in the web site, may enable users of the web site to manage and edit digital images stored on the server assembly. The photo management system may comprise an image library and an image editor. The image library may contain images selected or created by a particular user, and the image editor may enable the user to edit images in the image library.

Additionally, a messaging system, if included, may enable a first user to leave a message on a virtual message board of a second user. The messaging system may comprise a message area, one or more graphical tools, and a color selector. The first user may select a graphical tool and a color, and may then modify an image of the message area in a manner customizable based on the chosen graphical tool and color.

These and other objects, features, and advantages of the interactive networking system will become more apparent upon reading the following specification in conjunction with the accompanying drawing figures.

BRIEF DESCRIPTION OF THE FIGURES

FIG. 3 illustrates a block diagram of the networking system, according to an exemplary embodiment of the present invention.

FIG. 4 illustrates a web page of the networking system, incorporating a plurality of customizable action cards, according to an exemplary embodiment of the present invention.

FIG. 22 illustrates a flow diagram of an operation of retrieving messages from the messaging system of the networking system, according to an exemplary embodiment of the present invention.

FIG. 23 illustrates a flow diagram of a general operation of the messaging system of the networking system, according to an exemplary embodiment of the present invention.

DETAILED DESCRIPTION

Figure 1A:
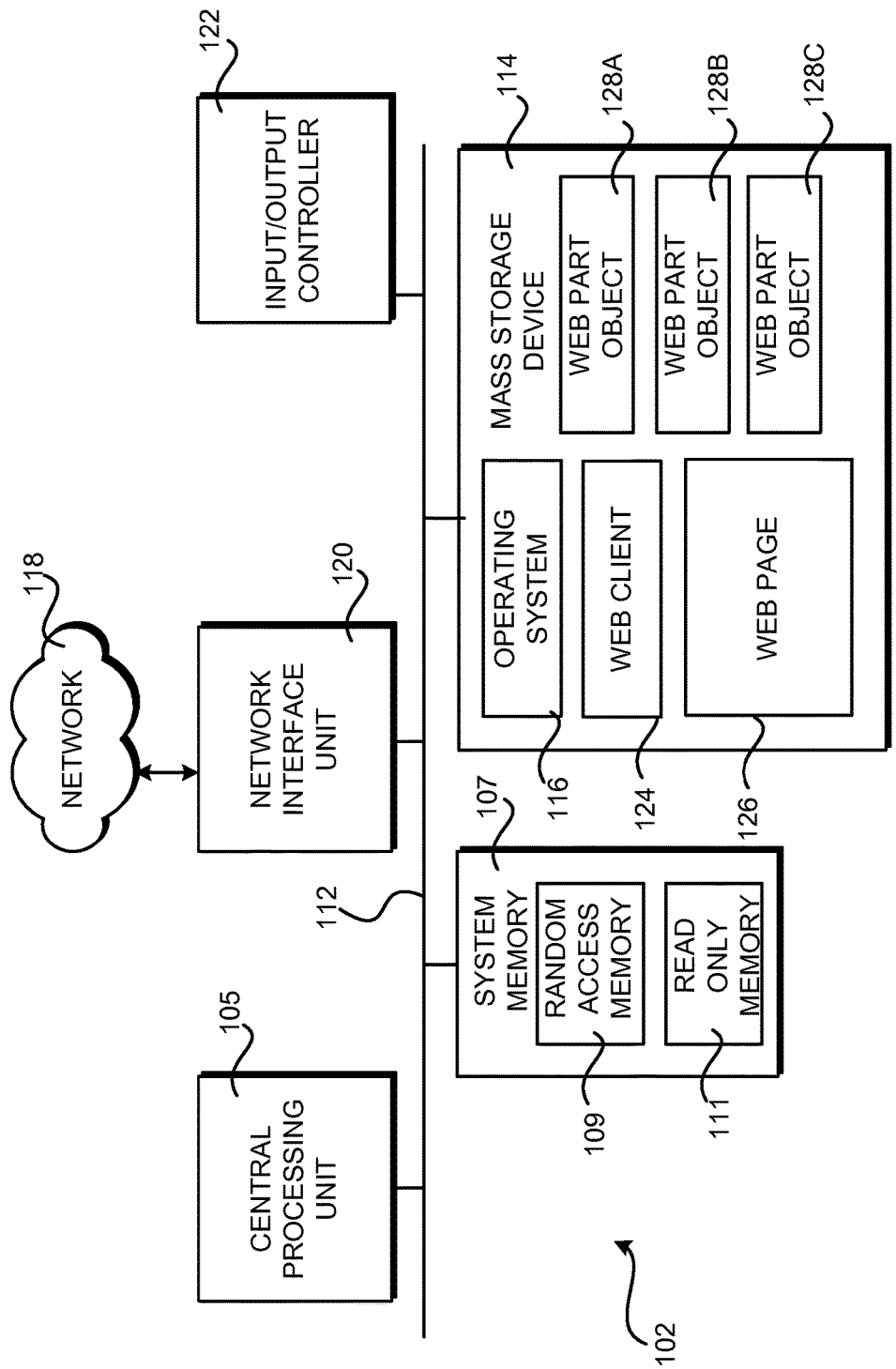
FIG. 1A illustrates an architecture of a client computer utilizing an interactive networking system, in accordance with an exemplary embodiment of the present invention.

To facilitate an understanding of the principles and features of the invention, various illustrative embodiments are explained below. In particular, the invention is described in the context of being a web-based interactive networking system for celebrities and their fans. Embodiments of the invention, however, are not limited to web-based implementations, or to use by celebrities and fans. Rather, embodiments of the invention may be used for networking and interaction between various entities and individuals in various environments, particularly when the use of multiple user classes would be beneficial. For example, and not limitation, doctors, counselors, sports figures, and politicians may benefit from the embodiments of the invention.

Throughout the present description, the present invention is described as embodied in a web environment. However, those of skill in the art will recognize that the concepts of the invention are not limited to a web environment and could be applied to various other systems. Accordingly, reference to web components is for convenience, and such references should not be considered limiting.

For example, and not limitation, embodiments of the present networking system may be implemented in media centers, video game consoles, operating systems, and virtual machines. Media centers may include television, telephone, and internet technologies, any of which may utilize various embodiments of the present networking system. Further, video game consoles now implement social networking, internet communications, video recording, and digital file downloading. Interactive networking may be useful in such video consoles, and may be provided by embodiments of the present networking system. Operating systems, such as Linux™, Mac OS X™, and Microsoft Windows™, enable certain technologies to be implemented within the operating system outside of the framework of the World Wide Web. Accordingly, embodiments of the networking system may be utilized in such operating systems without use of the World Wide Web. In addition, technologies such as Java™ and Adobe Air™ allow functionality outside the scope of the World Wide Web, in the context of "virtual machines," which may utilize the present networking system.

Exemplary embodiments of the networking system may contain components that may be utilized in a wide variety of applications. Some exemplary embodiments may be for personal entertainment, and others may be for professional use. Professional uses of the networking system may include, without limitation, medical personnel recruiting, educational applications, and various other applications matching persons to persons, persons to services, or persons to products. The networking system may comprise various classes of users, and may enable one or more user classes to control access and duration of interaction between themselves and users of one or more other user classes.

The components described hereinafter as making up various elements of the invention are intended to be illustrative and not restrictive. Many suitable components that would perform the same or similar functions as components described herein are intended to be embraced within the scope of the invention. Such other components not described herein may include, but are not limited to, for example, components developed after development of the invention.

Various embodiments of the present invention comprise interactive networking systems. Referring now to the figures, wherein like reference numerals represent like parts throughout the views, various embodiments of the networking system will be described in detail.

FIG. 1A illustrates a computer architecture for a client computer 102, in accordance with an exemplary embodiment of the present invention. The client computer 102 may be used to access the networking system 300, including a web site 305 provided by the networking system 300 (See FIG. 3). Those skilled in the art will recognize that the general architecture described with reference to FIG. 1A is for example only, and may be modified to accommodate various embodiments of the networking system and particular operational environments.

As shown in FIG. 1A, the client computer 102 may comprise a central processing unit 105 ("CPU") and one or more system memories 107, such as a random access memory 109 ("RAM") and a non-volatile memory, such as a read-only memory ("ROM") 111. The client computer 102 may further comprise a system bus 112 coupling together the memory 107, the CPU 5, and various other components. A basic input/output system containing routines to assist in transferring information between components of the client computer 102 may be stored in the ROM 111. Additionally, the client computer 102 may include a mass storage device 114 for storing an operating system 116, application programs, and other program modules.

Figure 1B:
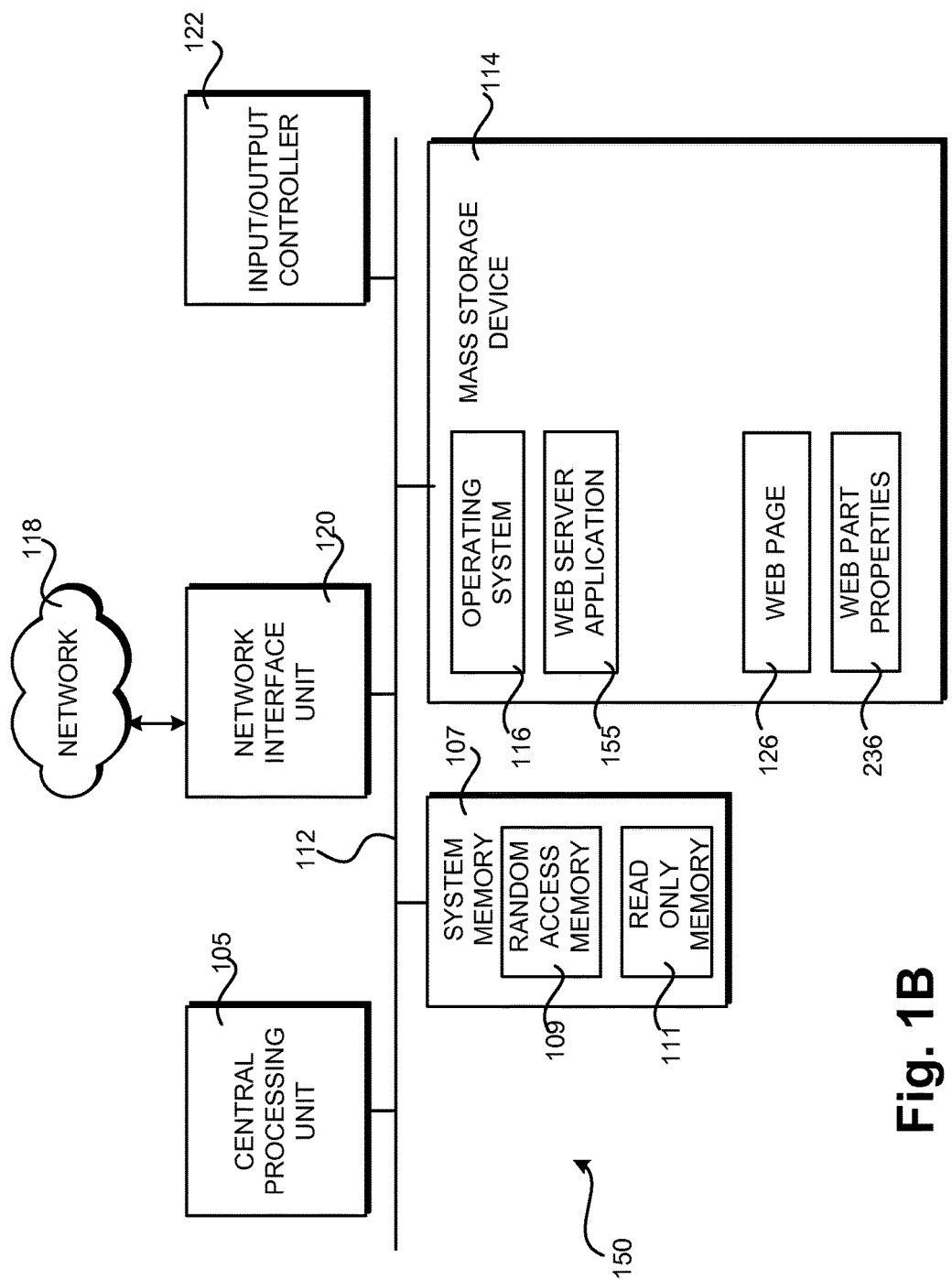
FIG. 1B illustrates an architecture of a server assembly of the networking system, according to an exemplary embodiment of the present invention.

The mass storage device 114 is generally connected to the CPU 105 through a mass storage controller (not shown) connected to the bus 112. The mass storage device 114 and its associated computer-readable media provide non-volatile storage for the client computer 102. Although the description of computer-readable media contained herein generally refers to a mass storage device, such as a hard disk or CD-ROM drive, it will be appreciated by those skilled in the art that computer-readable media may include any available media accessible by the client computer 102 or a server assembly 150 (FIG. 1B).

By way of example, and not limitation, the computer-readable media may comprise computer storage media and communication media. Computer storage media may include volatile and non-volatile, removable and non-removable media implemented in any method or technology for storage of information, such as computer-readable instructions, data structures, program modules, or other data. Computer storage media includes, but is not limited to, RAM, ROM, EPROM, EEPROM, flash memory, other solid state memory technology, CD-ROM, digital versatile disks ("DVD"), other optical storage, magnetic cassettes, magnetic tape, magnetic disk storage, other magnetic storage devices, or any other media that may be used to store the desired data and may be accessible by the client computer 102 or the server assembly 150. Computer-readable instructions on the storage media of the client computer 102 may include, for example, instructions for implementing processes, preferably client-side processes, of the networking system 300.

According to various embodiments, the client computer 102 may operate in a networked environment using logical connections to remote computers, such as the server assembly 150, through a network 118, such as the Internet. The client computer 102 may connect to the network 118 through a network interface unit 120 connected to the bus 112. It will be appreciated that the network interface unit 120 may also be utilized to connect to other types of networks and remote computer systems.

The client computer 102 may also include an input/output controller 122 for receiving and processing input from a number of other devices, including a keyboard, mouse, or electronic stylus. The input/output controller 122 may provide output to a display screen, a printer, or other type of output device.

A number of program modules and data files may be stored in the mass storage device 114 and RAM 109 of the client computer 102. Such program modules and data files may include an operating system 116 suitable for controlling operations of a networked personal computer. A web browser application program, or web client 124, may also be stored on the mass storage device 114 and the RAM 109. The web client 124 may comprise an application program for requesting and rendering web pages 126 created in Hypertext Markup Language ("HTML") or other types of markup languages. The web client 124 may also be capable of executing scripts through the use of a scripting host. The scripting host executes program code expressed as scripts within the browser environment.

The web client 124 may be operative to execute one or more client side objects. As discussed briefly above, client side objects are executable objects that may be identified in a web page 126 and executed in conjunction with the rendering of the web page 126. For instance, Java™ applets or ActiveX™ controls may be identified on a web page 126 and rendered by the web client 124 to generate a portion of the web page 126 display.

According to an exemplary embodiment of the invention, the web client 124 may be further operative to utilize client side objects called web part objects 128A-128C, or web parts. Web part objects 128A-128C are reusable client side objects that stand and contain web-based content such as Extensible Markup Language ("XML"), HTML, and scripts. Web parts 128A-128C have a set of standard properties that control how they are rendered. These properties enable web parts to be storage-neutral and reusable. Because web parts 128A-128C adhere to a common standard, they may be stored in libraries, which may be utilized to create a variety of web pages 126. Web pages 126 that include web part objects 128A-128C may be referred to herein as web part pages.

Referring now to FIG. 1B, a server assembly 150 utilized in various exemplary embodiments of the networking system 300 (FIG. 3) will be described. The server assembly 150 may service the web site 305 by receiving and responding to requests from web clients 124. The server assembly 150 may comprise various combinations of hardware and software for servicing the web site 305. Those skilled in the art will recognize that the server assembly 150 illustrated in FIG. 1B is an exemplary server configuration and may be modified to accommodate various embodiments of the networking system 300. As shown in FIG. 1B, the server assembly 150 may include many of the conventional computing components included in the client computer 102 and described above with respect to FIG. 1A. In particular, the server assembly 150 may include a CPU 105, a network interface unit 120 connected to a network 118, such as the Internet, a system memory 107, and a mass storage device 114.

The mass storage device 114 utilized by the server assembly 150 may typically be operative to store an operating system 116 suitable for servicing the web site 305 and controlling operations of a server computer. The mass storage device 114 and its associated computer-readable storage media provide non-volatile storage for the server assembly 150. Computer storage media may include volatile and non-volatile, removable and non-removable media implemented in any method or technology for storage of information, such as computer-readable instructions, data structures, program modules, or other data. Computer-readable instructions on the computer-readable media of the server assembly 150 may include, for example, instructions for implementing processes, preferably server-side processes, of the networking system 300.

The server assembly 150 may utilize a web server application 155. The web server application 155 may receive and respond to requests from web clients 124 at remote computers, such as the client computer 102, for web pages 126 located at or accessible to the server assembly 150. It will be appreciated that web pages 126, as described herein, include both those pages stored statically and utilizing only HTML, as well as pages generated dynamically through use of server-side scripting technologies.

According to various embodiments of the networking system 300, the web server application 155 may receive requests for web pages 126 that include one or more web parts 128A-128C. As discussed above, web parts 128A-128C comprise client-side objects that may be used by the web client 124 when displaying a web page 126.

FIG. 3 illustrates a block diagram of the networking system 300, according to an exemplary embodiment of the present invention. The networking system 300 may operate in an environment of the client computer 102 and the server assembly 150. As shown in FIG. 3, an exemplary embodiment of the networking system 300 may comprise an interactive networking web site 305, the server assembly 150, and a web site manager 308. The client computer 102 may interact with the web site 305 and, accordingly, the server assembly 150 through the web client 124 at the client computer 102.

The web site 305 may enable interaction between and among one or more featured users and a plurality of common users. The featured users may interact with one another via the web site 305, and similarly, the common users may interact with one another via the web site 305. Additionally, the common users may desire some level of interaction with the featured users, and the featured users may desire some level of privacy in their interactions with the common users. For example, a featured user may be a celebrity, and a set of common users may be fans of the celebrity. The web site 305 may provide a virtual environment for such interactions.

The server assembly 150 may service the web site 305. The server assembly 150 may operate as discussed in detail above, or in various manners for providing services to client computers 102 over a network.

The web site manager 308 may manage the web site 305, act as administrator of the web site 305, and provide customer service to users of the web site 305. Preferably, the web site manager 308 may be one or more humans or entities, but may also comprise computing devices and automated services.

The web site 305 may generally comprise any combination of the following components: a crediting system 310, a classification system 320, a chat bidding system 330, a performance bidding system 340, a telephony switching system 350, a media interaction system 360, a display system 370, a photo management system 380, and a messaging system 390. Each component of the web site 305 may provide various services as described further below.

Crediting System

The web site 305 may include a crediting system 310 to provide users a means to purchase services of the web site 305. Each user may have a user account, and the user account may be associated with the user's history of activities on the web site 305. According to the crediting system 310, the user account may include a credit account representing virtual credits allotted to the user. The credits may be used to purchase services from the web site 305, or products and services from entities associated with the web site 305.

The web site 305 may provide multiple categories of credits, such as universal credits and limited credits. Universal, or non-promotional, credits may be purchasable by the user. The user may purchase universal credits from the web site manager 308 via the web site 305, over a phone call, or via various other means of communicating a desire to purchase credits. In contrast, limited, or promotional, credits may be awarded to the user based on promotions. The web site 305 may separately account for universal and limited credits. However, the web site 305 may present the user with either a combined total of credits or with separate totals for each of universal and limited credit accounts. As mentioned above, various services of the web site 305 may be purchased with credits. Preferably, predetermined exclusive services of the web site 305 may be purchased only with universal credits, while non-exclusive services may be purchased with universal credits, limited credits, or various combinations thereof.

As will be discussed in more detail below, the networking system 300 may provide various classes of user membership. For example, and not limitation, the web site 305 may provide featured user accounts for featured users and common user accounts for common users. The users may purchase services, such as participation in web site activities, with their credit accounts. Such services may include opportunities to interact with the featured users. Purchasable services may be activities of the chat bidding system 330, the performance bidding system 340, the telephony switching system 350, the media interaction system 360, the display system 370, the photo management system 380, the messaging system 390, and/or other web service systems.

For purchase of services on the web site 305, the web site 305 may implement a predetermined scheme for determining which credits are debited from the purchasing user's credit account. For example, and not limitation, a purchase of an exclusive service may automatically debit the user's universal credits. For a purchase of a non-exclusive service, the user may be allowed to specify which credits are debited for the purchase. Alternatively, the web site 305 may implement a first-in-first-out accounting, in which the first credits placed into the user's credit account are the first credits debited from the users account, or a last-in-first-out accounting, in which the last credits placed in the user's account are the first credits debited from the user account. As another option, the web site 305 may automatically debit any available limited credits before universal credits for the purchase of non-exclusive services.

Through the use of credit accounts, common users may interact with featured users, and as a result, common users, featured users, and the web site manager 308 may profit from such interaction. Common users may benefit by fulfilling desires to interact with featured users, such as celebrities, who might otherwise be inaccessible to the common users. Featured users may interact with common users and, thereby, increase their popularity and fan bases. Further, featured users may have agreements with the web site manager 308, whereby featured users share in revenues generated by the web site 305 or whereby the web site manager 308 donates revenues from the web site 305 to favored charities of the featured users. Additionally, the web site manager 308 may reap financial benefits through selling credits to common users.

Classification System

The classification system 320 may classify each user of the networking system 300 into one or more user classes. In an exemplary embodiment, each user is a member of at least one user class, and each user may be a member of multiple user classes. Some user classes may be mutually exclusive with other user classes, in which case each user may be a member of no more than one of each such mutually exclusive classes. Not all user classes need be mutually exclusive with one another, however, so a user may be a member of multiple user classes.

Figure 2:
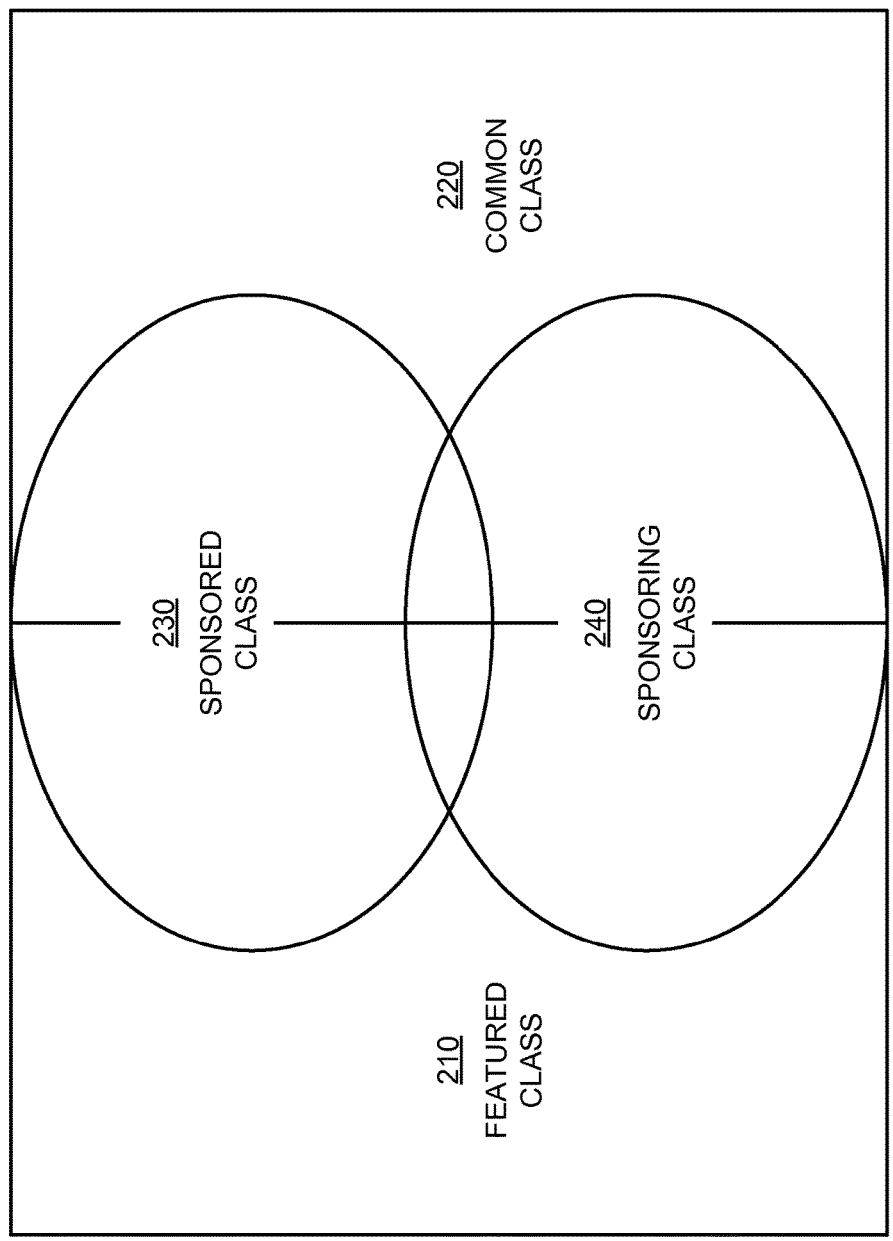
FIG. 2 illustrates a map diagram of user classes in the networking system, according to an exemplary embodiment of the present invention.

FIG. 2 illustrates a map diagram of various classes of the networking system 300, according to an exemplary embodiment of the present invention. As shown in FIG. 2, user classes of the networking system 300 may include the following, for example: featured class 210, common class 220, sponsored class 230, and sponsoring class 240. Other classes may be used instead of, or in addition to, those illustrated in FIG. 2. For example, in some embodiments, the networking system 300 may comprise two or more sub-communities, such as a dating sub-community and a job search sub-community. Each sub-community to which a user belongs or on which a user is currently active may correspond to a class of that user. Accordingly, a user who is a member of the dating sub-community may be deemed a member of a dating class.

In addition to any classes defined by the networking system 300, the classification system 320 may also maintain user-defined classes defined by individual users for their own use. For example, and not limitation, a first user may create a friends class, a family class, or a co-workers class. That first user may categorize other users of the networking system 300 into the user-defined classes. In some embodiments, the first user's classifications of other users may be private, such that other users cannot see the first user's user-defined classes or the classifications of various users.

The featured class 210 may be a class for members who are in high demand for interactions with other members. For example, celebrities may be members of the featured class 210. The common class 220 may comprise all those members who are not classified as featured members or all those users who are otherwise unclassified. Accordingly, in some exemplary embodiments of the networking system 300, the featured class 210 and the common class 220 may be mutually exclusive, as shown in FIG. 2. The featured class 210 and the common class 220 may also be comprehensive in some embodiments, such that each and every user may belong to one of these two classes, as is also shown in FIG. 2.

In some embodiments of the networking system 300, featured users (i.e., members of the featured class 210) may have access to one or more features or activities of the web site 305 that are unavailable to the common users (i.e., members of the common class 220). For example, a featured user may be allowed to participate in more or different activities than common users on the web site 305. For further example, each featured user may have more than a single user profile.

Each user of the networking system 300 may be associated with a profile, and each user's associated user profile may include various information related to the corresponding user. Information included in the user's profile may include the following, for example: name; photo or other selected image; tagline; relationship status; information entered by the user about himself or herself, such as interests and hobbies; information about the user entered by others; and history of activities on the web site 305. Each user may also have an associated profile page, which may be a page on the web site 305 that provides or summarizes the information in the user's profile. A user may visit another user's profile page, for example, to learn more about the other user or to initiate an interaction with the other user. A common user may have a single profile and single profile page associated with his common user account. As mentioned above, a featured user may have one or more than one profile associated with a featured user account and, accordingly, may have one or more than one profile page associated with the featured user account.

A featured user may have two profiles associated with a featured user account, a featured profile and an alternative profile. Because the two profiles are associated with a single account, the featured user need not log out and log back in, or otherwise re-authenticate to a second account, to switch between the two profiles. Rather, the networking system 300 may dynamically effect the switch upon request from the featured user. The featured and alternative profiles may each contain the same types of information related to the featured user. For example, and not limitation, both the featured and alternative profiles may comprise a name, history of web site activities within that profile, and photos. The information in each profile, however, may be distinct from the other profile. Accordingly, even though both profiles are associated with a single featured user account, a first set of data related to the featured user may be associated with the featured profile, while a second set of data related to the featured user may be associated with the alternative profile. Each data set corresponding to a specific profile may comprise its own user name, photos, activity history, friends list, or various other information related to the featured user.

In an exemplary embodiment, a featured user may be a celebrity and may use his or her featured profile as a celebrity profile, with which fans may interact. The alternative profile may be the featured user's non-celebrity profile, such that switching to the alternative profile enables the celebrity to hide the celebrity status. For example, the featured user may opt to interact with only personal friends and family members through the alternative profile.

As discussed in more detail below, users may participate in various activities on the web site 305 of the networking system 300. In some instances, the activities available to a particular user or the roles available to the particular user within an activity may vary based on whether the user is a featured user or not. In some or all of such activities, a featured user may play the same or similar role as common users when the alternative profile of the featured user is active. Activities and roles within certain activities that are limited to featured users may not be accessible to a featured user when the alternative profile is active. Alternatively, when any such activity or role is accessed by a featured user with an active alternative profile, the networking system 300 may automatically activate the featured profile and deactivate the alternative profile, thus enabling the featured user to access features of the networking system 300 that are limited to featured users. In short, the featured user may be treated as a common user and may appear to others on the web site 305 as a common user, when the alternative profile is active.

A featured user may switch back and forth between profiles upon request to the networking system 300. If the featured user indicates to the networking system 300 that he or she would like to hide his or her featured status, or switch to the alternative profile, then the networking system 300 may respond by activating the alternative profile. When the alternative profile for the featured user is active, the networking system 300 may dynamically update the web site 305 so that some or all other users see the featured user as a common user. In an exemplary embodiment, no more than one of these profiles may be active at a given time. Thus, when the alternative profile is activated, the featured profile may be automatically deactivated. Analogously, when the featured profile is activated, the alternative profile may be automatically deactivated.

Various aspects of the web site 305 of the networking system 300 may dynamically update when a featured user switches profiles. For example, when a featured user switches to her alternative profile, some or all representations of the featured user throughout the web site 305 may be modified to disguise the featured user as a common or non-featured user, or to falsely indicate that the featured user is a common user. As a result, the featured user may be attributed common user status in some or all activities in which the featured user participated while the alternative profile remains active. When a featured user switches from her alternative profile to the featured profile, some or all representations of the featured user on the web site 305 may indicate that the featured user is indeed a featured user, and the user may then be treated fully as a featured user by the web site 305.

In one or more instances, the web site 305 may provide representations of one or more users, so that a current user viewing the representations may learn about or interact with the other users through those representations. In an exemplary embodiment, a representation may be a graphical object, such as an icon, an identification card, or a profile page.

In addition to identifying a particular user, a representation of the particular user may also include one or more characteristics that identify one or more classes of the particular user. In an exemplary embodiment, representations of common users may have a first characteristic not had by representations of those who appear to be featured users. Representations of featured users with active featured profiles may have a second characteristic not had by common users. A featured user with an active alternative profile may be provided with the first characteristic, such that the featured user may appear to be a common user. For example, and not limitation, the first characteristic may be a certain color, icon, or template associated with the profile page or other representation of common users (and featured users with active alternative profiles). The second characteristic may also be a certain color, icon, or template, or may be simply the lack of the first characteristic. Analogously, the first characteristic may simply be the lack of the second characteristic. Accordingly, the first characteristic may behave as a class-identifier to users of the web site 305, and may identify a featured user as being a non-featured user when the featured user desires.

In some embodiments, both the alternative profile and the featured profile of a featured user may remain visible in some respects on the web site 305 by other users, regardless of which profile is currently active. For example, although a featured user may be actively using his or her alternative profile, a profile page associated with the featured profile may remain accessible to users of the web site 305. As a result, users may continue to interact with the featured profile, e.g., by leaving messages and requesting to become a fan, even when the featured user is currently using the alternative profile. Analogously, users with the proper access may continue to interact with the featured user's alternative profile, while the featured user uses the featured profile.

The sponsored class 230 may comprise all members who have equal or less than a sponsorship threshold number of credits in their user account. For example, and not limitation, the sponsorship threshold number of credits may be zero, such that a sponsored user has no credits or a negative number of credits in his or her credit account. A sponsored user may thus rely on sponsorship to participate in activities of the networking system 300 that require payment. In an exemplary embodiment, a user may become a sponsored member automatically when the credits in his credit account drop to or below the sponsorship threshold.

As will be discussed in more detail below, various users of the networking system 300 may participate in various activities, including interactions with one another, through the web site 305. In some instances, an activity may be associated with a cost, such that a user is required to pay credits corresponding to the associated cost to participate in the activity. In the case of a sponsored user, however, an associated sponsoring user may pay the credits on the sponsored user's behalf.

The sponsoring class 240 may include users who have indicated that they will or might sponsor a sponsored user. There may be various reasons why a first user may choose to sponsor a second user. For example, and not limitation, sponsorship may enable the sponsoring user to interact with the sponsored user through purchasable activities of the web site 305 in which the sponsored user may not otherwise be able to participate. If the sponsoring user believes that he or she would benefit from the sponsored user's participation, i.e., by spending time with the sponsored user, then the sponsoring user may sponsor the sponsored user in such activity. Alternatively, a sponsoring user may be an advertiser that sponsors the sponsored user in exchange for some service provided by the sponsored user, such as reviewing or promoting the sponsoring user's products or services. Other reasons for sponsorship may also exist and may vary between sponsoring users of the networking system 300.

In some embodiments of the networking system 300, a first user need not have a credit balance at or below a sponsorship threshold to be eligible for sponsorship. Rather, in some embodiments, no sponsorship threshold need be used at all or in all circumstances. For example, and not limitation, a sponsoring user may opt to pay for the first user's participation in an activity even though the first user has enough credits to pay for his or her own participation. For another example, an advertiser may choose to sponsor a user who has enough credits to pay for his or her own participation in an activity, when that user provides a service to the advertiser in return.

When a user is sponsored despite having a credit balance above a sponsorship threshold, the networking system may, or may not, deem that user to be a member of the sponsored user class 230, depending on the particular implementation of the networking system 300. In an exemplary embodiment, the sponsored user class 230 may be made up of only those users whose credit accounts are at or below the sponsorship threshold. In such an embodiment, these sponsored users' credit balances may be too low to enable them to sponsor other users, and thus the sponsoring class 240 and the sponsored class 230 of users may be mutually exclusive. Some alternative embodiments may include in the sponsored class 230 one or more users who have enough credits to potentially become sponsors themselves. In this case, the sponsored class 230 and the sponsoring class 240 may overlap, as shown in FIG. 2.

A sponsoring user may specify a particular sponsored user or users to sponsor, or may opt to become a general sponsor whose credit may be available by request on a case-by-case basis. In some embodiments, the pairing of a sponsored user with a sponsoring user may be prompted by either party, and either party may be able to refuse the sponsorship. In some other embodiments, only a potential sponsoring user may prompt the pairing. A sponsored user may have the option of refusing sponsorship in general or sponsorship of a particular other user. If a sponsorship relationship is formed, i.e., if both parties agree to the sponsorship or if neither party objects, then the sponsored user and the sponsoring user may be associated with each other in the networking system 300.

In general, a sponsoring party may pay for one or more activities to allow an associated sponsored user to participate in such activities. In some embodiments of the networking system 300, the sponsoring party only pays for interactions that involve both the sponsored user and the sponsoring user, and such sponsored interactions may be paid for by the sponsoring user on a case-by-case basis as requested by the sponsoring user. In other embodiments, the sponsoring user may pay for every activity in which the sponsored user opts to participate on the web site 305. In still other embodiments, the circumstances in which the sponsoring user pays on behalf of the sponsored user may depend on sponsorship rules that apply to the sponsorship relationship between the two parties.

Either party to a sponsorship relationship, i.e., either the sponsoring user or the sponsored user, may specify sponsorship rules to apply to the relationship. The sponsorship rules may be guidelines indicating the circumstances in which the sponsoring user will pay on behalf of the sponsored user. For example, and not limitation, the guidelines may provide a schedule during which sponsorship applies; a duration of sponsorship; a total balance available to the sponsoring user; a set of activities to be sponsored; a set of activities to be excluded from sponsorship; a set of users with whom interactions are sponsored; or a set of users with whom interactions are excluded from sponsorship. The sponsorship rules may specify automatic payment in some or all instances, or that the sponsoring party must approve some or all activities before payment is made. In some embodiments, each sponsoring user may specify default sponsorship rules to be used for every sponsorship relationship in which he or she is involved. These default rules may be modifiable and customizable on a case-by-case basis.

When the networking system 300 receives a request for a sponsored user to participate in an activity that has an associated cost, the networking system 300 may determine whether the sponsored user is associated with a sponsoring user. For each associated sponsoring user identified, the networking system 300 may then determine whether the applicable sponsorship rules allow payment for the desired activity. If no associated sponsoring user is identified whose sponsorship rules allow payment, the networking system 300 may refuse to allow the sponsored user's participation in the activity or, alternatively, the networking system 300 may send out an alert to other users indicating that the sponsored user seeks an immediate sponsor. If a single sponsoring user is identified whose sponsorship rules allow payment for the selected activity, then the cost of the activity may be withdrawn from that sponsoring user's account to pay for the sponsored user's participation in the activity.

On the other hand, if multiple associated sponsors are identified whose sponsorship rules allow payment for the selected activity, then the networking system 300 may apply a predetermined sponsorship formula to determine which one or more of the sponsoring users pay for the activity. The sponsorship formula may be a system-defined formula, may be part of the sponsorship rules, or may be defined by the sponsored user. For example, the sponsorship formula may simply select whichever sponsoring user the sponsored user wishes to be billed. For another example, the networking user may arrange the sponsoring users in a ranked list and may select the sponsoring user at the top of the list, before then moving that sponsoring user to the bottom of the list for payment on a later activity. For still another example, the sponsorship formula may split the cost of the activity equally or in predetermined weighted proportions among the applicable sponsoring users.

In an exemplary embodiment of the networking system 300, a sponsored user need not always have an associated sponsoring user. If this is the case, then the sponsored user may be unable to participate in non-complimentary activities of the networking system 300 until a sponsoring user is found or until enough credits are added to the sponsored user's account to pay for the desired activities.

FIG. 4 illustrates an exemplary web page 400 of the web site 305 of the networking system 300, according to an exemplary embodiment of the present invention. As mentioned above, a web page 400 of the web site 305 may display representations 450 of other users, to enable a current user to view information about or interact with other users of the web site 305.

A representation 450 of another user may be, for example, a profile page, an icon or photo, or an identification card. The representation 450 may have some characteristic identifying a class of the user represented. Representations 450 of common users and featured users (with active featured profiles) may be distinguishable from each other in some manner, such as by a predetermined characteristic that is common to users of the same class. For example, as shown in FIG. 4, the common user representations 450a may be a different color than the featured user representations 450b. Representations 450 of featured users with active alternative profiles, however, may share the predetermined characteristic of the representations 450 of common users and may therefore be indistinguishable from common users in some instances.

The type or appearance of a representation 450 of a particular second user as displayed to a current user may depend on various factors, including for example: the particular web page 400 of the web site 305 that provides the representation 450, the classes of the second user, and customizations made by the current user. For example, and not limitation, on a profile page of the second user, the representation 450 of the second user that is displayed to the current user may be full-page description of the second user. Alternatively, if the current user is browsing some other page 400 of the web site 305, the representation 450 of the second user may appear as a small icon, identification card, or other identifier that preferably takes up only a small portion of the web page 400, such as in FIG. 4.

The representations 450 need not be displayed to the current user at all times while the current user uses the networking system 300. For example, the representations 450 may be displayed on only the home page of the current user, or only when the current user navigates to certain web pages of the networking system 300. Some exemplary embodiments, however, may display the representations 450 on every page of the networking web site 305, such as in a stationary frame object 405 of the website 305.

Because the networking system 300 may have numerous users, not every user need be represented by the representations 450 displayed to the current user. The subset of representations 450 actually displayed may be selected by various means. For example, and not limitation, in some embodiments, only "friends" of the current user are represented in displayed representations 450, or only a random subset of friends is represented. Alternatively, only users currently logged in to the web site 305 may be represented in the displayed representations 450; a rotating selection of all users may be represented in the displayed representations 450; or the current user may preselect which user's representations 450 will be displayed.

Figure 5A:
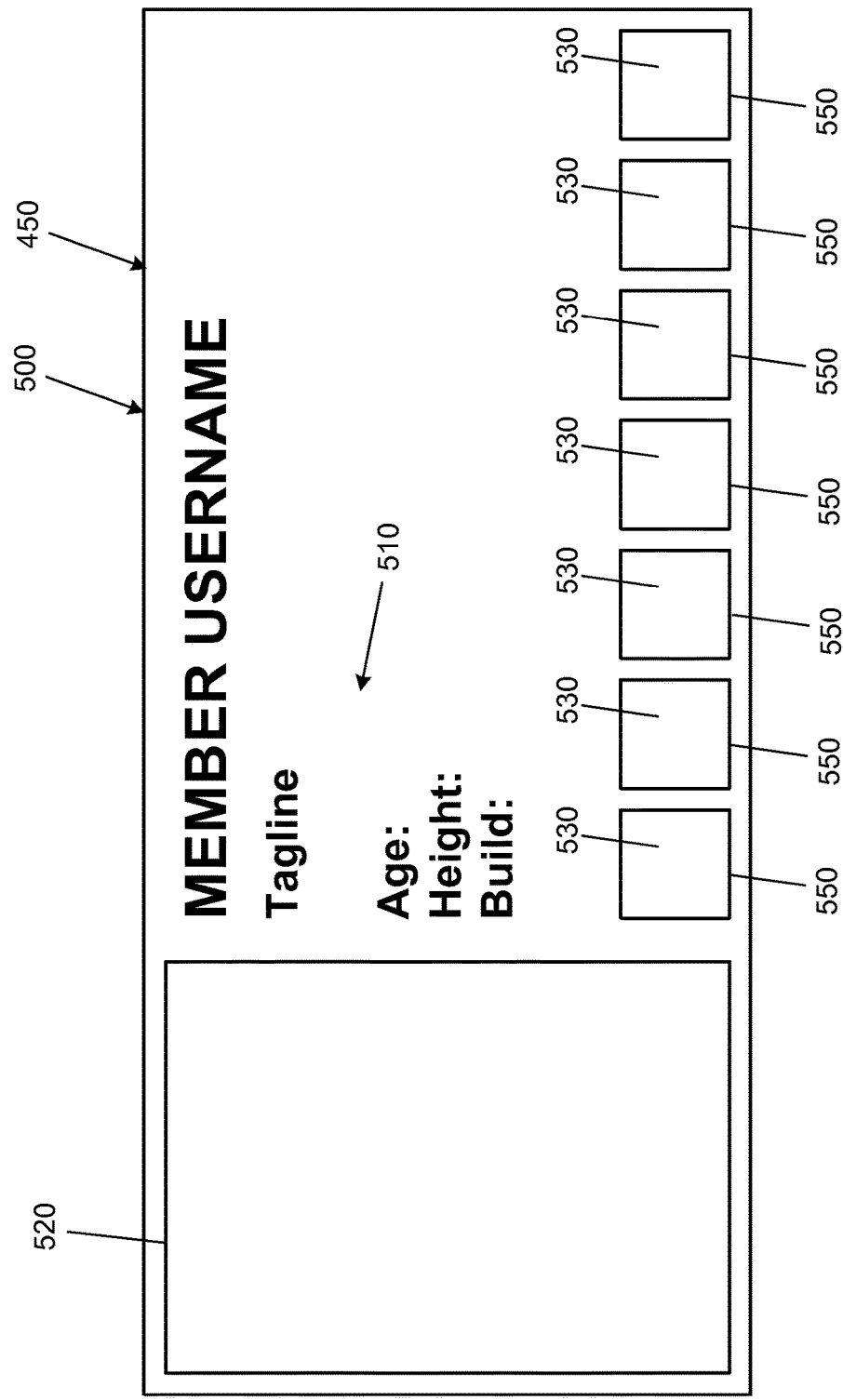
FIG. 5A illustrates a customizable action card representation of a user of the networking system, according to an exemplary embodiment of the present invention.

FIG. 5A illustrates an exemplary action card 500, which may be used by the networking system 300 as an interactive representation 450 of a user. The networking system 300 may provide one or more action cards 500 as the representations 450 of other users, wherein an action card 500 may identify the particular user with whom it is associated and my also identify one or more classes of the associated user, such as either the common 220 or featured class 210. When a featured user has an active alternative profile, his or her action card 500 may identify her as a common user.

As shown in FIG. 5A, an action card 500 may comprise, for example, user information 510, a user picture 520, and one, two, or more action indicators 530. The user information 510 and user picture 520 may be items for the associated user's profile. In the case of a featured user, the information shown in the corresponding action card 500 or other representation 450 may be information from the active profile of the featured user. As shown, for example, the user information 510 may include the user's username, tagline, age, height, and build description. The picture 520 may be a picture 520 selected by the corresponding user to represent the user in his or her profile.

Each action card 500 may identify the represented user, and may also include a plurality of placeholders 550. Each placeholder may contain an action indicator 530, where an action indicator 530 may correspond to an action that may be performed by the networking system 300 on the represented user, or between the represented user and the current user interacting with the action card 500. For example, and not limitation: action indicators 530 may be provided for any or all of the following: email the user; call the user; initiate chat session with the user; invite the user to an activity; and request friendship with the user. When the current user selects an action indicator 530 on an action card 500, the networking system 300 may respond by performing the action indicated by the action indicator 530 and, where appropriate, by performing that action between the current user and the user represented by the action card 500.

The action cards 500, or other user representations 450, viewable by the current user may be customizable by the current user. For example, the current user may customize the appearance of representations 450, and an action card 500 may be further customized to contain the action indicators 530 that the current user finds most useful. The action indicators 530 shown in the placeholders 550 of an action card 500 may vary between different action cards 500. The networking system 300 may provide one or more representation templates for each user, and the current user may customize each template to specify an appearance of action cards 500 based on that template.

In an exemplary embodiment of the networking system 300, the networking system 300 may allow the current user to customize a distinct representation template for each of one or more user classes. A unique template may be customizable for each of the common and featured classes. Analogously, a unique template may be customizable for each of the sponsored class and the sponsoring class. A unique template may also be customized for each class associated with members of a sub-community of the networking system 300. When action cards 500 are presented to the current user on the web site 305, the action indicators 530 in each action card 500 may correspond to those selected for the user class to which the user represented by the action card 500 belongs. If the current user utilizes certain operations more in interacting with a first class of users than with a second class of users, the current user may opt to customize the action cards 500 of those user classes accordingly. Accordingly, the current user may not only identify the classes of other users based on their action cards 500, but may also interact with other users as desired through use of the action cards 500.

Customizations of representation templates may vary between user accounts. As a result, an action card 500 for a particular user may have a different appearance and different action indicators 530 when viewed through different user accounts.

Figure 5B:
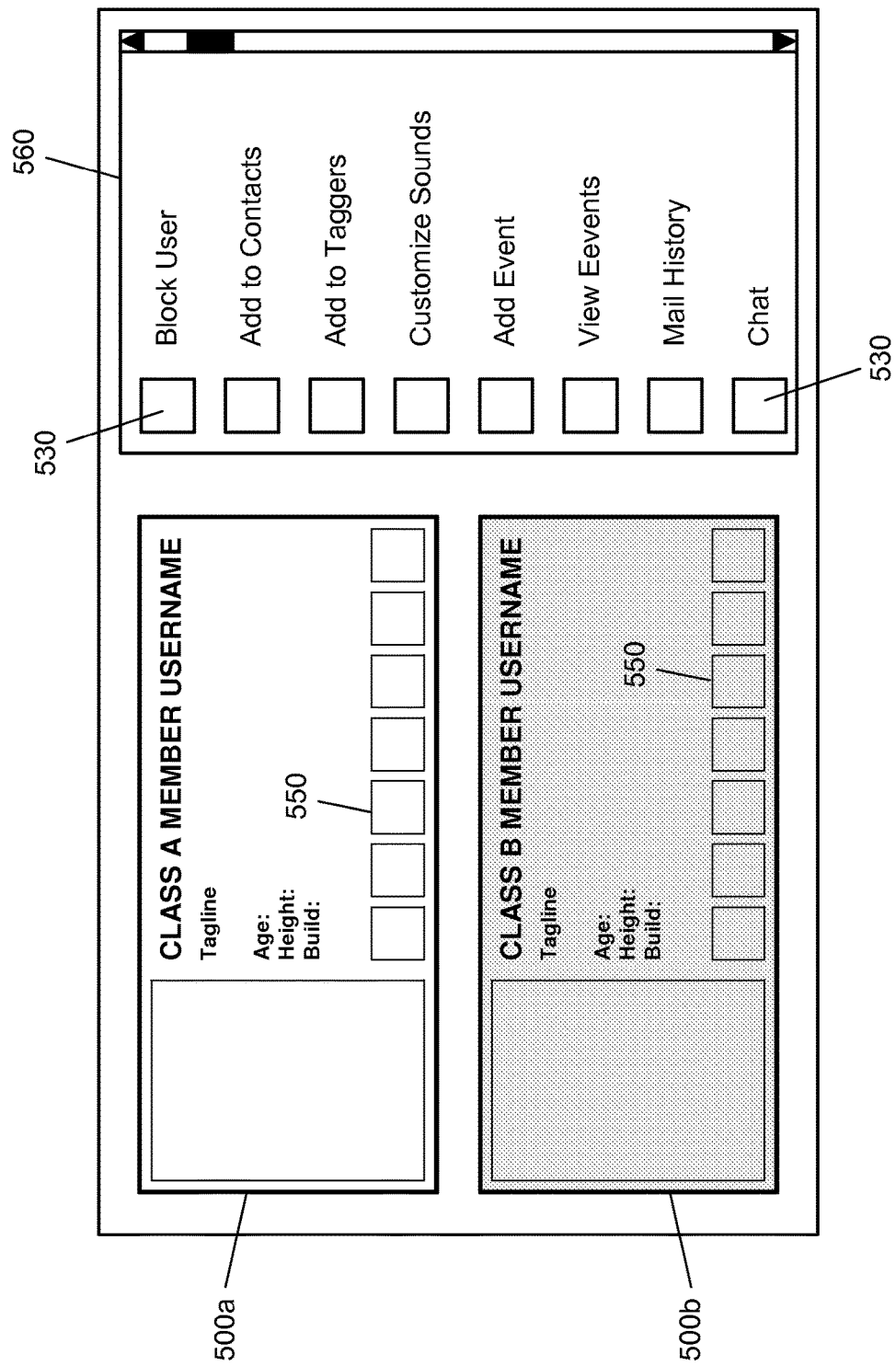
FIG. 5B illustrates a user interface for customizing action cards of the networking system, according to an exemplary embodiment of the present invention.

FIG. 5B illustrates a user interface for customizing action cards of the networking system, according to an exemplary embodiment of the present invention. As shown in FIG. 5B, the networking system 300 may present the user with one or more templates 500a and 500b, where each template 500a or 500b corresponds to action cards 500 for members for a corresponding class of users. Customizations made to a template 500a for Class A may be applied to action cards 500 representing members of Class A. Customizations made to a template 500b for Class B may be applied to action cards 500 representing members of Class B. For example, Class A may be the class of featured users, while Class B is the class of common users; or Class A may be the class of sponsored users, while Class B is the class of sponsoring users. As shown in FIG. 5B, action card templates 500a and 500b for different classes may differ from one another even before customization, such as by being different colors, having different background images, or having other identifiable characteristics. Each action card 500 may inherit these distinctions from its corresponding template 500a or 500b, such that action cards 500 may be quickly identifiable as corresponding to users belonging to certain classes.

The networking system 300 may provide a plurality of available action indicators 530. Each action indicator 530 may represent and correspond to an action that the current user may desire to perform. Templates 500a or 500b and action cards 500 may each have one or more placeholders 550, and each placeholder 500 may be filled with an action indicator 530. In appearance, an action indicator 530 may be various displayable objects, such as an icon, an image, or a text string briefly describing the corresponding action.

In an exemplary embodiment, the action indicators 530 correspond to actions that may connect two or more users in an interaction, such as a chat interaction or transmission of a message from one user to another. Action indicators 530 may represent, for example, one or more of the following operations that may be performed by the networking system: block user, add event, view related events, add note, add to contacts, add to favorites, add to taggers, blogs, chat, chat history, customize sounds, view mail history, view media gallery, public group invite, send video mail, send virtual café item, send virtual drink, send virtual gift, SMS notification, sync to contact, watch intro video, join fan club, media gallery, call, email, write on page, or watch video. In some embodiments, the networking system 300 may also enable users to create their own action indicators 530, such as by recording a series of tasks and associating the series with a representative image, icon, text, or other object receivable by a placeholder 550 of an action card 500.

As shown in FIG. 5B, the networking system 300 may present a current user with a plurality of available action indicators 530, such as in an action list 560. The action indicators 530 within the action list 560 may change based on which action card template 500 is active and currently being customized. In other words, when the current user clicks on a first action card template 500a, the action list 560 may contain the action indicators 530 available for inclusion in that template 500. If the current user then clicks on a second action card template 500b that has different action indicators 530 available to it, the action list 560 may automatically change to list the action indicators 530 that are available for inclusion in the second action card template 500. There may be various reasons why an action indicator 530 would be available to one action card template 500a and not available to another action card template 500b. For example, and not limitation, it may be desirable to limit interactions with featured users by common users. To this end, certain action indicators 530 representing means of communication may be unavailable to a common user for inclusion in an action card template 500a or 500b corresponding to the featured class, so as to limit those means of communication between featured users and common users.

The current user may select a subset of the action indicators 530 to be included in the placeholders 550 of each action card template 500a or 500b, where a different subset of action indicators 530 may be selected for each action card template 500a or 500b. The current user may select action indicators 530 for a template 500 by selecting each desired action indicator 530 from the action list 560, such as by holding a mouse button down when the mouse cursor hovers over the action indicator 530, and then dragging the desired action indicator 530 to a placeholder 550 within the action card template 500. After an action indicator 530 is moved to a placeholder 550 in a template 500, the action indicator 530 may remain displayed in that placeholder 550 in the user-friendly customization interface to remind the current user of his or her selections. If the current user wishes to remove an action indicator 530 from a placeholder 550, he or she may simply drag the action indicator 530 out of the placeholder 550 or may replace the action indicator 530 with another action indicator 530 by selecting the other action indicator 530, such as by dragging, for the same placeholder 550.

After receiving the current user's selections of action indicators 530 for one or more templates 500a and 500b, the networking system 300 may then associate the selected subsets with the action card templates 500a and 500b for which the subsets were selected. Accordingly, the user classes corresponding to a particular action card template 500a or 500b may also be associated with the selected subset of action indicators 530. When an action card 500 is displayed to the current user, that action card's placeholders 550 may hold the action indicators 530 selected by the current user for the applicable action card template 500a or 500b. Accordingly, a class of a user may be identified by the action card 500 used to represent that user.

Because user classes may overlap, a user may belong to multiple classes, such as the common class and the sponsored class. In some embodiments of the networking system 300, multiple classes of a user may be indicated in some manner on the representation 450, such as an action card 500, of that user. In some other embodiments, if a user falls into multiple classes, then that user's representation 450 may be determined based on the user's priority class. The networking system 300 may provide a formula for determining the user's priority class and corresponding representation template. The priority formula may be system-defined or defined by the current user for use within the current user's account.

In some embodiments, the formula for determining a user's priority class may be as simple as ranking the various available classes. In that case, a user's priority category is simply the highest ranked class to which the user belongs. Alternatively, the current user may manually select a user's priority class, or a more complex formula may be used to take various factors about users into consideration. In the case of a featured user with an active alternative profile, that featured user's priority class may be determined based on the assumption that the featured user is actually a common user. Accordingly, when viewed by a current user, the featured user may appear as a common user would appear.

Accordingly, the networking system 300 may classify users, enable users to easily identify the classes of other users, and facilitate convenient interactions between users of various classes.

Chat Bidding System

Figure 6:
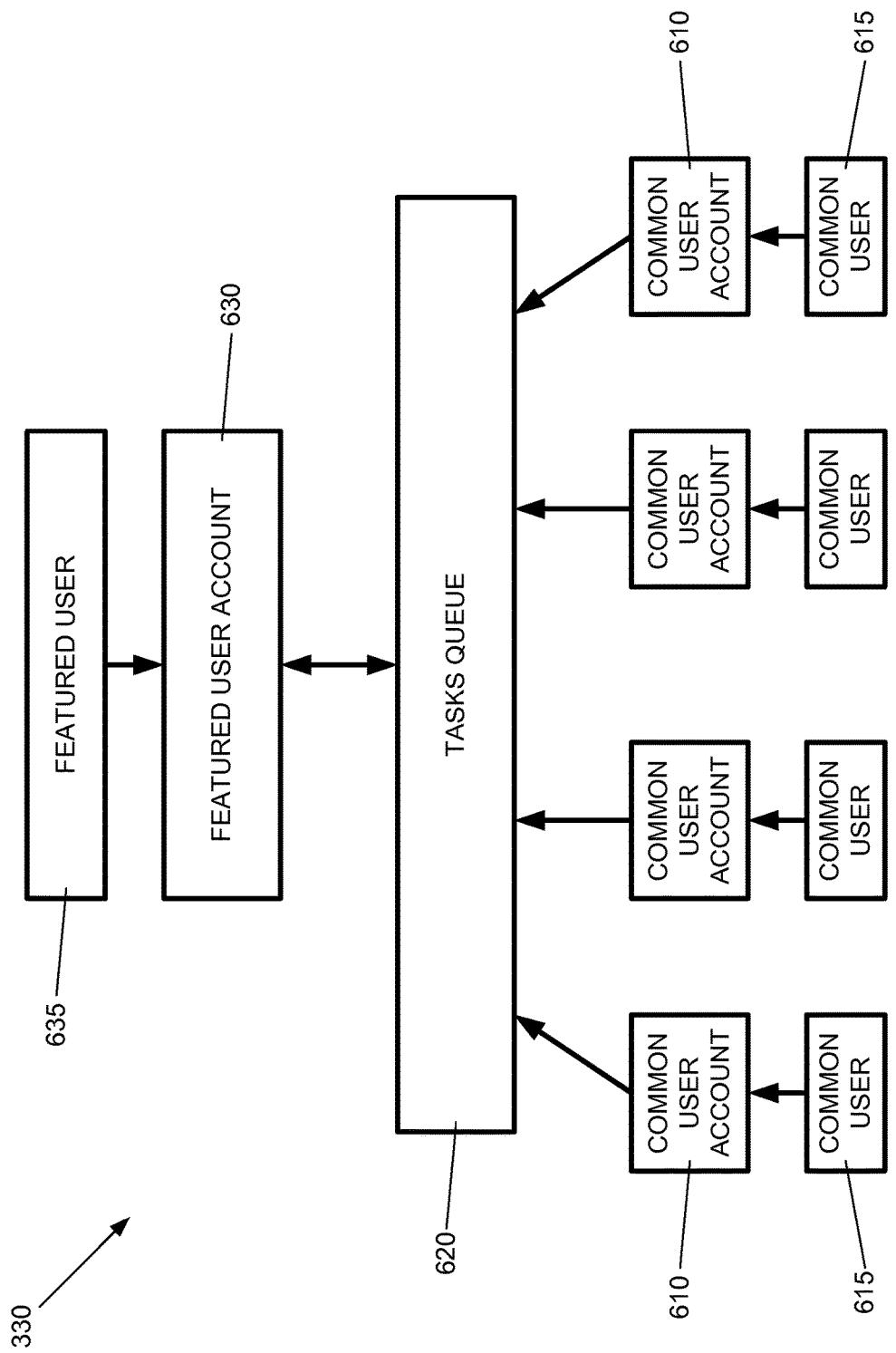
FIG. 6 illustrates a block diagram of a chat bidding system of the networking system, according to an exemplary embodiment of the present invention.

The chat bidding system 330 of the web site 305 may provide an organized community in which common users may interact with a featured user. FIG. 6 illustrates a block diagram of an exemplary chat bidding system 330 of the web site 305. As shown in FIG. 6, an instance of the chat bidding system 330, a chat bidding session, may comprise a plurality of common user accounts 610, a tasks queue 620, and a featured user account 630.

Each chat bidding session of the chat bidding system 330 may comprise a plurality of common users 615 and at least one, and preferably only one, featured user 635. Through common user accounts 610, the common users 615 may pose tasks to the featured user 635. The tasks queue 620 may store the posed tasks or references to the posed tasks. Through the featured user account 630, the featured user 635 may be presented with the tasks, preferably one at a time, and may choose whether to respond to each task as it is presented.

Figure 7:
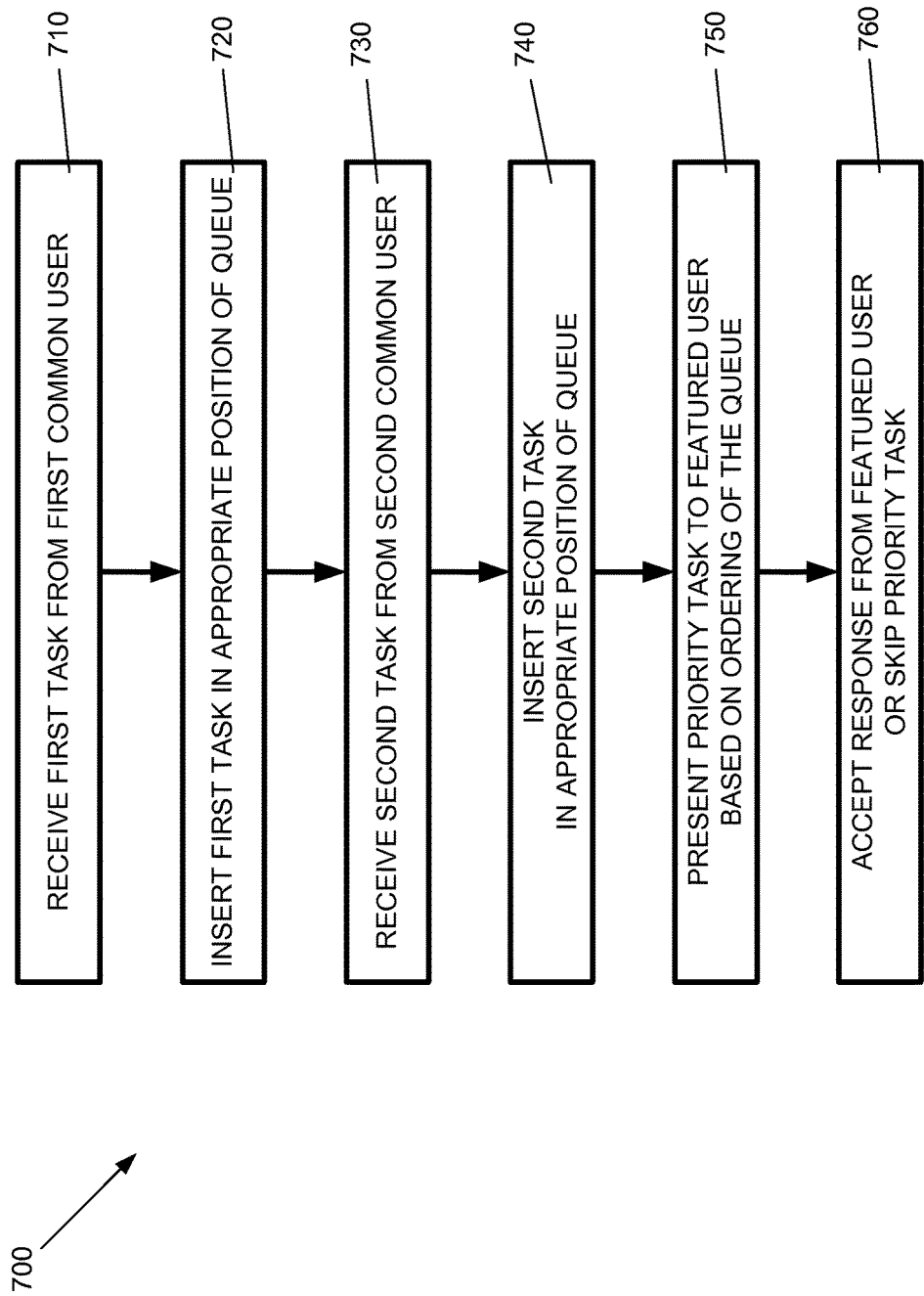
FIG. 7 illustrates a flow diagram of an operation of the chat bidding system of the networking system, according to an exemplary embodiment of the present invention.

FIG. 7 illustrates a flow diagram of an operation 700 of the chat bidding system 330 according to an exemplary embodiment of the networking system 300. As shown in FIG. 7, at 710, the web site 305 may receive a task posed by a first common user 615. The task may be accompanied by a pledge from the common user 615, and a bid value corresponding to the pledge may be associated with the task. At 720, the task may be inserted into an appropriate position of the queue 620 based on the task's associated bid value. A second task may be received from a second common user 615 at 730, and at 740, the second task may also be inserted into an appropriate position of the queue 620. At 750, the web site 305 may present the featured user 635 with a priority task, which is the task currently at the top of the ordered queue 620. The featured user 635 may choose to respond to the priority task, or to skip the priority task. In an exemplary embodiment of the chat bidding system 330, common users 615 whose tasks are skipped may receive refunds for their pledged credits. At 760, the web site 305 may respond according to the featured user's decisions to skip or respond to the priority task. This may comprise accepting the featured user's response to the task or indicating that the priority task has been skipped.

Referring now back to FIG. 6, the common users 615 may pose tasks to the featured user 635. Each task may comprise a question, comment, or request of the posing common user 615. In posing a task, a common user 615 thereby requests that the featured user 635 respond to the posed task. Tasks may be posed in various formats. For example, a task may be a typed question, an audio challenge or other request, or various other formats for prompting a response from the featured user 635. The web site 305 may receive the tasks and, as described further below, may store the tasks in an ordered manner through use of the queue 620.

A common user 615 may associate a bid with a posed task. The bid is preferably a pledge of credits from the common user's credit account. If the common user 615 is also a sponsored user, the bid may be a pledge of credits from an associated sponsoring user's credit account instead. In pledging a credit amount, the common user 615 may commit to purchase the featured user's response to the task for the pledged amount or, alternatively, may commit to purchase an opportunity to present the task to the featured user 635 for the pledged amount. If the common user 615 does not associate the task with a bid, a bid value for the posed task may be set to zero. A first exemplary embodiment of the chat bidding system 330 debits the common user's credit account regardless of whether the featured user 635 responds to the common user's task. An alternative exemplary embodiment of the chat bidding system 330, however, debits the credit account only if the featured user 635 is eventually presented with the common user's task or, alternatively, only if the featured user 635 responds to the common user's task.

The tasks queue 620 may store the tasks or references to the tasks. Storage space for the tasks queue 620 may be provided on the server assembly 150. In the tasks queue 620, tasks may be ordered based at least partially on their bid values. In other words, a first task with a first bid value may be ranked higher than a second task with a lower bid value. When a new task is posed by a common user 615, such new task may be inserted into the tasks queue 620 based on a ranking of the bid value of the new task. In an exemplary embodiment of the chat bidding system 330, if the new task has a bid value equal to a bid value of a previously-posed task already in the tasks queue 620, the new task may be ranked behind the previously-posed task. The web site 305 may notify the common user 615 of positions of his tasks in the queue 620. Additionally, the web site 305 may allow the common user 615 to alter the bid values of his tasks and, thereby, potentially modify the positions of his tasks in the tasks queue 620. The web site 305 may also display to the common user 615 an amount of credits required to increase a task of the common user 615 to a certain rank in the tasks queue 620. In some exemplary embodiments, bids for previously submitted tasks may be increased but not decreased.

A predetermined number of highest ranked tasks in the queue 620 may have a fixed ranking order at the top of the queue 620. For example, and not limitation, the top N tasks may be fixed such that a bid modification of a previously lower-ranked task may not affect the positions of such top N tasks. Further, the top N tasks may be presented to the featured user 635, according to their rank amongst the other top N tasks.

In some implementations of the chat bidding system 330, fixing ranks of the top N tasks may entail removing the top N tasks from the tasks queue 620, and inserting them into a standby queue. Tasks in the standby queue may be ordered according to when they were removed from the tasks queue 620, and may be presented to the featured user 635 in an order in which they were inserted into the standby queue. In other words, the standby queue may be a first-in-first-out queue, and after a task is removed from the standby queue for presentation to the featured user 635, a highest ranked task in the tasks queue 620 may be removed from the tasks queue 620 and inserted into the standby queue. In other implementations, fixing ranks of the top N tasks may entail setting fixed positions for such top N tasks within the queue 620 and restricting resorting of such tasks. In either of these implementations, any resorting or rearranging of the queue 620 may not affect the positions of the top N tasks.

Those skilled in the art will recognize that a queue may be implemented in various manners and through use of various data structures. Those skilled in the art will further recognize that a queue may refer to certain types of related data, which may, but need not, be stored in contiguous physical space. Accordingly, as used herein, the standby queue of the chat bidding system 330 may refer to a set of data stored distinct from the tasks queue 620, or to a set of data sharing physical space with the tasks queue 620.

Fixing ranks of the top N tasks may incentivize common users 615 to pledge high bid values for their tasks, because after such tasks reach a predetermined rank, their positions become fixed. Preferably, N is a small number, such as two. A large value of N may discourage common users 615 by making too many of the top positions unreachable.

To increase efficiency of the networking system 300, data regarding posed tasks may be stored on the client computer 102, in addition to the server assembly 150. A client-side application may run at the client computer 102, and may cache task data on the client computer 102. In an exemplary embodiment of the networking system 300, client-side caching may occur locally on the client computer 102 by storing task data in an array in the order in which the tasks were posed. The array may contain task data including, for example, question text, bid amount, and current position in the tasks queue 620. The order in which tasks are stored in the array may be retained when a web page of the chat bidding session is reloaded. The client-side cache may be updated at various occurrences, such as a rank change or an update to task text or bid amount.

The web site 305 may present the featured user 635 with the priority task. The priority task may be the highest ranked task in the tasks queue 620. Alternatively, if the top N tasks are removed from the tasks queue 620 and inserted into the standby queue, the priority task may be the highest ranked task in the standby queue. The featured user 635 may be able to view a predetermined number of other posed tasks in addition to the priority task, but preferably, the featured user 635 must act on the priority task before being presented with any other tasks. Also preferably, the featured user 635 may view only the top N tasks, which have fixed position in the order in which they will be presented to the featured user 635. In such embodiments, the featured user 635 may be permitted to select presented tasks out of order. For each viewable task, the featured user 635 may also view statistics related to the task, such as the associated bid value and how long the task has been in the queue 620.

After being presented with the priority task, the featured user 635 may choose to respond to the priority task or to skip the priority task. If the priority task is skipped, the featured user 635 may not have another opportunity to respond to such task unless it is again posed by a common user 615. By presenting the featured user 635 with each task only once, the web site 305 may provide an organized manner for the featured user 635 to handle a small or large number of tasks. Additionally, common users 615 may be encouraged that their tasks may eventually be presented to the featured user 635 and may, therefore, more confidently pledge credits towards their tasks to increase a possibility that their tasks will be viewed. In an alternative embodiment of the chat bidding system 330, however, the featured user 635 may be entitled to temporarily skip a task and have it represented later, preferably after the following task.

When a task becomes the priority task, the common user 615 who posed such task may become a recognized common user 615. In that case, data relating to the recognized common user 615 may be displayed to other common users 615 and to the featured user 635. Such data may include, without limitation, the recognized common user's username and picture. Additionally, other users, both common 615 and featured 635, may have an opportunity to follow a web hyperlink and, thereby, view the recognized common user's full profile on the web site 305. Accordingly, the recognized common user 615 may be rewarded for his pledge in that all other parties may know who posed the priority task. If the common user 615 who posed the priority task is a sponsored user, the associated sponsoring users may be recognized along with the common user 615 who posed the task.

As mentioned above, the featured user 635 may choose to respond to the priority task. The type of response given by the featured user 635 may depend on the type of task posed. For example and not limitation, if the task is a question, the featured user 635 may answer the question, and if the task is a request, the featured user 635 may comply with the request. The web site 305 may receive the response of the featured user 635 in various ways. For example, the web site 305 may receive and display an answer to a question in the form of text. Alternatively, the web site 305 may receive the featured user's compliance with a tasked request through, for example, a webcam or other recording media, in which case the result may be displayed in a video or audio format.

A role of the featured user 635 may be similar to a role of a chat moderator. For example, the featured user 635 may initiate the chat bidding session and may prompt tasks from the common users 615. When initiating a chat bidding session, the featured user 635 may select a charity to share in revenues generated by the chat bidding session. The featured user 635 may be able to change the benefiting charity during the chat bidding session. Credits deducted from credit accounts of the common users 615 for posed tasks represent revenues of the chat bidding session. In predetermined percentages, such revenues may be divided among the web site manager 308, the featured user 635, and, if indicated, the selected charity.

The featured user 635 may also have access to a synchronous alert tool on the web site 305. For example, when initiating a chat bidding session, the featured user 635 may issue a mass notification to all common users 615 or to a predetermined set of common users 615, to notify such common users 615 of the chat bidding session. In an exemplary embodiment of the chat bidding system 330, the synchronous alert tool issues a pop-up alert to common users 615.

A common user 615 may view various elements of the chat bidding session. For example, the web site 305 may display to the common user 615 a name and biography of the featured user 635. The web site 305 may also display responses for each task to the plurality of common users 615, as in a group chat session. In other words, if the featured user 635 responds to a task of a first common user 615, such response may be displayed to all common users 615 in a virtual group environment of the web site 305. Additionally, each common user 615 may view and scroll through his own posed tasks. The common user 615 may view the queue position of each of his tasks and may modify the bid amount of each of his tasks. Optionally, the common user 615 may also have access to a complete list of posed tasks from the plurality of common users 615. In some exemplary embodiments of the chat bidding system 330, a first common user 615 may be able to pledge his credits to a task posed by a second common user 615. In this case, the second common user 615 need not be a sponsored user. Accordingly, the first common user 615 may increase the bid value and, potentially, the rank of a task of the second common user 615. Additionally, in such a scenario, the web site 305 may acknowledge both the second common user 615 and the first common user 615 when the task is featured and presented to the featured user 635.

Throughout the chat bidding session, the web site 305 may display various statistics related to the chat bidding session. For example, and not limitation, the web site 305 may display the total credits raised during the chat bidding session up to the current point in time, the time elapsed in the bidding session, the number of posed tasks not yet presented to the featured user 635, the name of the selected charity, the average time the featured user 635 has taken to act on or respond to each presented task, and the estimated time remaining in the chat bidding session. At any point in time, the featured user 635 may pause the chat bidding session and, thereby, pause any running clocks utilized for calculating statistics related to the chat bidding session.

Figure 8:
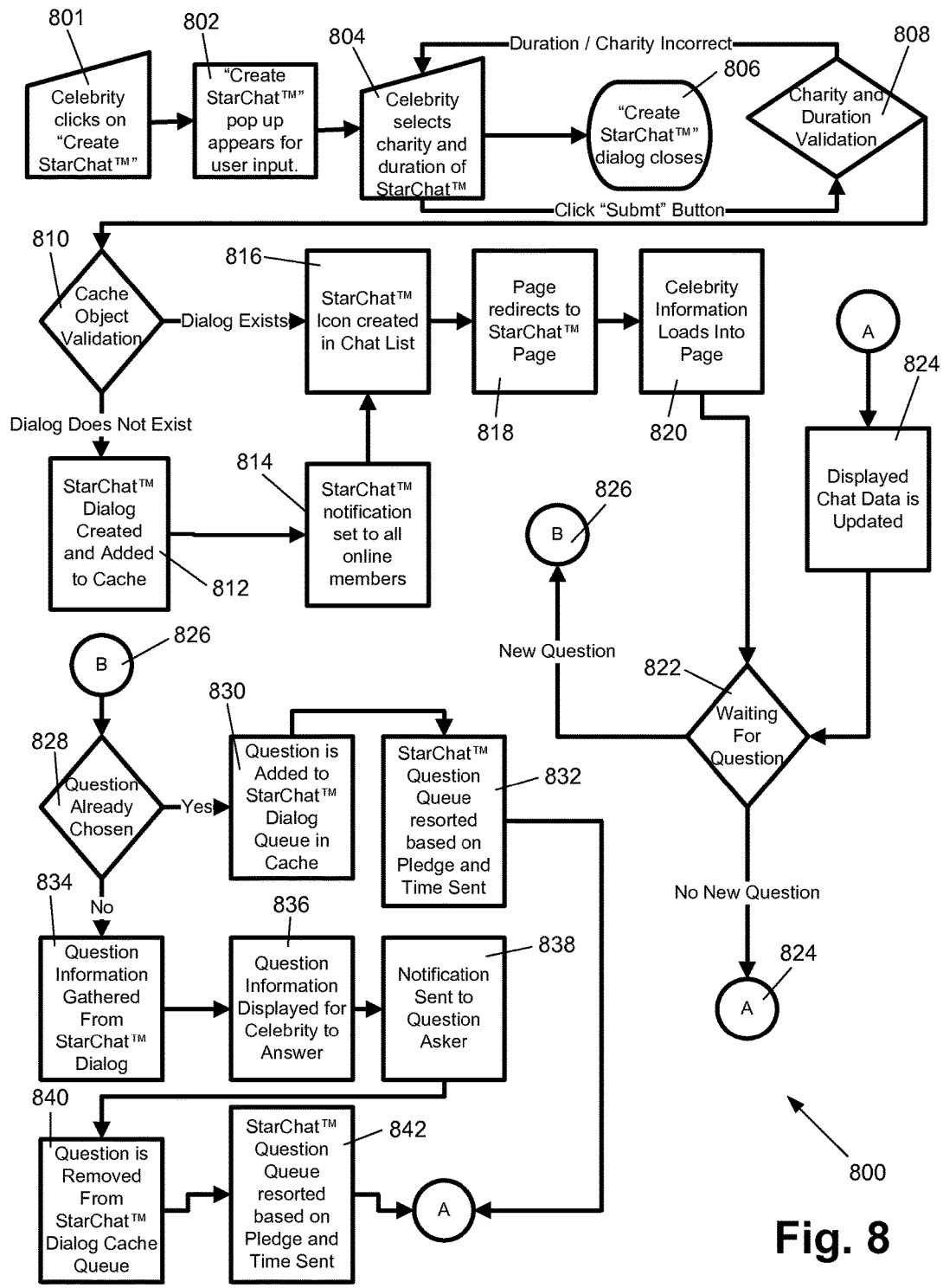
FIG. 8 illustrates a flow diagram of a process of a featured user initiating and participating in a chat bidding session of the chat bidding system, according to an exemplary embodiment of the present invention.

FIG. 8 illustrates a flow diagram of a process 800 of a featured user 635 initiating and participating in a chat bidding session, according to an exemplary embodiment of the chat bidding system 330 of the web site 305.

As shown in FIG. 8, at 801, the featured user 635, such as a celebrity, may initiate the chat bidding session. This may occur when the featured user 635 selects an appropriately labeled button, such as a button labeled "Create StarChat." At 802, a pop-up or dialog may appear allowing the featured user 635 to create the new chat bidding session. At 804, the featured user 635 may select a charity to benefit from the chat bidding session, and may determine a duration for the chat bidding session. At 806 and 808, the networking system 300 may create the chat bidding session using the validated charity and duration selections.

Cache object validation may occur at 810. If a cache object does not exist, the networking system 300 may create a new cache object for managing the chat bidding session. To improve performance, the networking system 300 may cache objects on the server assembly 150 so that they can be used and manipulated quickly. Upon creation of a new chat bidding session, the networking system 300 may determine whether a dialog for a chat bidding session has already been created. If not, at 812, a chat bidding session dialog, in which tasks and responses may be displayed, is created and added to the cache. Then, the next time the dialog is requested, it may be retrieved from the cache. Upon creation of the new dialog, at 814, the networking system 300 may notify all online users of creation of the chat bidding session.

A new chat icon may be created at 816, and may be viewable by the common users 615. At 818, the networking system 300 may direct the featured user's web client 124 to a web page of the chat bidding session. At 820, the featured user's information, such as name and occupation, may be loaded into the chat bidding session for viewing by the common users 615. At 822, the featured user 635 may await questions and tasks from the common users 615. While there are no new questions or tasks, as shown at 824, certain data about the chat may automatically update. Such data may include, without limitation, elapsed time, average time to respond to a question or task, and estimated time remaining. Preferably, this data is maintained and displayed as needed and appropriate throughout the chat bidding session.

At 826, a process of acting on questions and other tasks of common users 615 may begin. The networking system 300 may determine whether a question or task has already been chosen by the featured user 635 at 828. At 830, if a question or task is already chosen, the question or task is added to the tasks queue 620 in cache to be stored for efficient future use. At 832, the tasks queue 620 may be re-sorted based on bid values relating to one or more newly inserted tasks.

Returning to 828, alternatively, if a question or task has not yet been chosen, a question or task may be retrieved, at 834, along with related data, such as data pertaining to the common user 615 who posed the question or task. At 836, the question or task data may be displayed so that the featured user 635 may respond. At 838, a notification may be sent to the common user 615 who posed the question or task, informing the common user 615 that his question or task is the priority task. At 840, this priority task may be removed from the tasks queue 620, and at 842, the tasks queue 620 may be updated to reflect that the priority task has been removed.

Figure 9A:
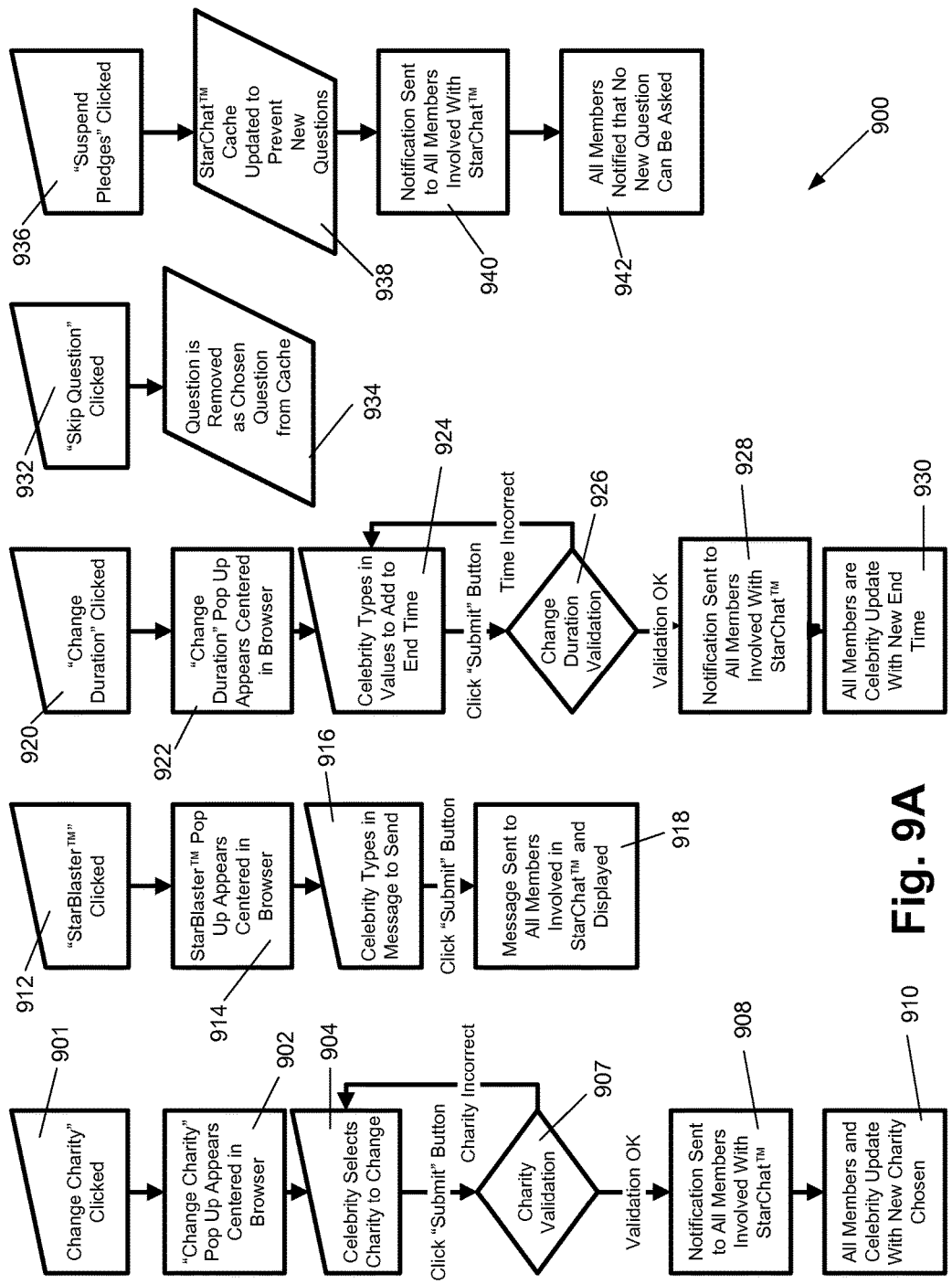
FIGS. 9A-9B illustrate flow diagrams of a process of the featured user moderating the chat bidding session of the chat bidding system, according to an exemplary embodiment of the present invention.
Figure 9B:
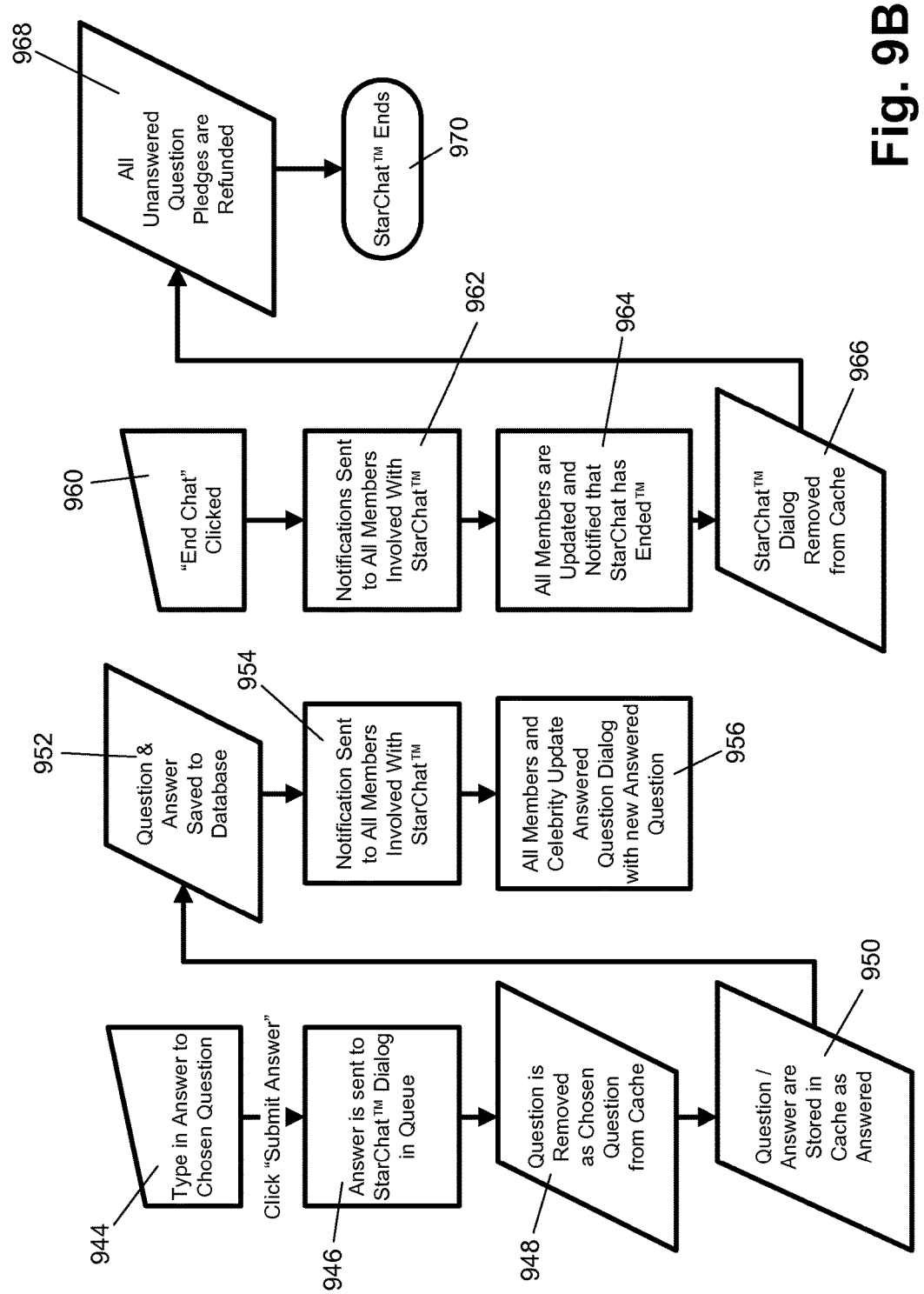

FIGS. 9A-9B illustrate flow charts depicting further exemplary functions 900 of the featured user 635 during the chat bidding session. At 901, if the featured user 635 previously elected a charity benefactor, the featured user 635 may change the selected charity from within the chat bidding session. Changing the charity may be initiated when the featured user 635 selects a "Change Charity" button at 902. Then, a pop-up or dialog may appear, enabling the featured user 635 to select a new charity. The pop-up or dialog may provide a list of approved charities from which the featured user 635 may choose. At 904, the featured user 635 may select a new charity, and the newly selected charity may be verified at 907. This validation step may include, for example, verifying that the charity is a valid charity associated with the featured user 635. At 908, a notification of the new charity may be transmitted to all common users 615 related to the chat bidding session, and 910, all common users 615 and featured users 635 may be updated with the newly selected charity.

In an exemplary embodiment of the present invention, changing the benefiting charity of a chat bidding session may not affect a distribution of the revenues generated through the chat bidding session before the change occurred. In other words, a first charity may benefit from the chat bidding session for the time period during which such first charity was specified as the benefiting charity. If the benefiting charity is changed to a second charity during a chat bidding session, only revenues after the change may be generated for the benefit of the second charity.

At 912, the featured user 635 may have an ability to use the synchronous alert feature. This feature, as discussed above, may enable the featured user 635 to send a message to all common users 615 participating in the chat bidding session. After selecting the synchronous alert feature, e.g. a "StarBlaster" button, at 912, a pop-up window may be presented to the featured user 635 at 914. At 916, the featured user 635 may provide and submit a message for the common users 615. At 918, the message may be transmitted to all common users 615 involved in the chat bidding session.

As mentioned above, the featured user 635 may have an ability to select the duration of the chat bidding session. At 920, the featured user 635 may change such duration. He or she may accomplish this by selecting a "Change Duration" button. At 922, a pop-up may appear, allowing the featured user 635 to modify the duration. At 924, the featured user 635 may enter the modified duration information, which may then be validated at 926. Upon approval of the new duration, a notification may be sent to all users in the chat bidding session at 928 and at 930. If the chat bidding session displays an end time to the common users 615, such end time may be updated in accordance with the new duration.

As at 932 and 934, the featured user 635 may skip the priority task, which may be a question or other item prompting a response. For example, after the featured user 635 selects a "Skip Question" button at 932, the question or task may be removed from the cache at 934. Then, a new priority task may be presented to the featured user 635.

At 936, the featured user 635 may opt to end pledging in the chat session. For example, the featured user 635 may select a "Suspend Pledges" button. This option may prevent common users 615 from posing additional tasks, and may additionally prevent pledge increases for queued tasks. At 938, the cache may be updated in response to the featured user's indication that pledges are no longer allowed, and accordingly, the networking system 300 may no longer accept new questions or other tasks from the common users 615. Next, at 940 and 942, a notification may inform the common users 615 that no new tasks may be posed in the chat bidding session. In an exemplary embodiment of the chat bidding system 330, the featured user 635 may be required to continue acting on posed tasks until all tasks with non-zero bid values are acted upon. Common users 615 whose tasks remain in the tasks queue 620 after the featured user 635 exits the chat bidding session may receive refunds for their pledged credits.

Turning to 944, an exemplary process of responding to a posed question or task is depicted. After the question or task is answered at 946, a response is displayed via the chat bidding session. At 948, the question or task may be removed from the cache, and at 950, the task and response may be stored in the cache as answered. At 952, the task and response, or question and answer, may also be stored in the database. Then, at 954, notification of such response may be sent to the common users 615 participating in the chat bidding session. At 956, common users 615 and featured users 635 may be informed that a response to the priority task has been issued, and the task and corresponding response may be available for viewing.

The featured user 635 may terminate the chat bidding session, such as by selecting an "End Chat" button at 960. After which, a notification may be issued to the common users 615 in the chat bidding session at 962. The common users 615 may then receive notification that the chat has ended at 964. At 966, a record of the chat bidding session dialog may be removed from the cache. At 968, all pledges associated with unanswered tasks may be voided when the chat bidding session ends at 970.

Figure 10:
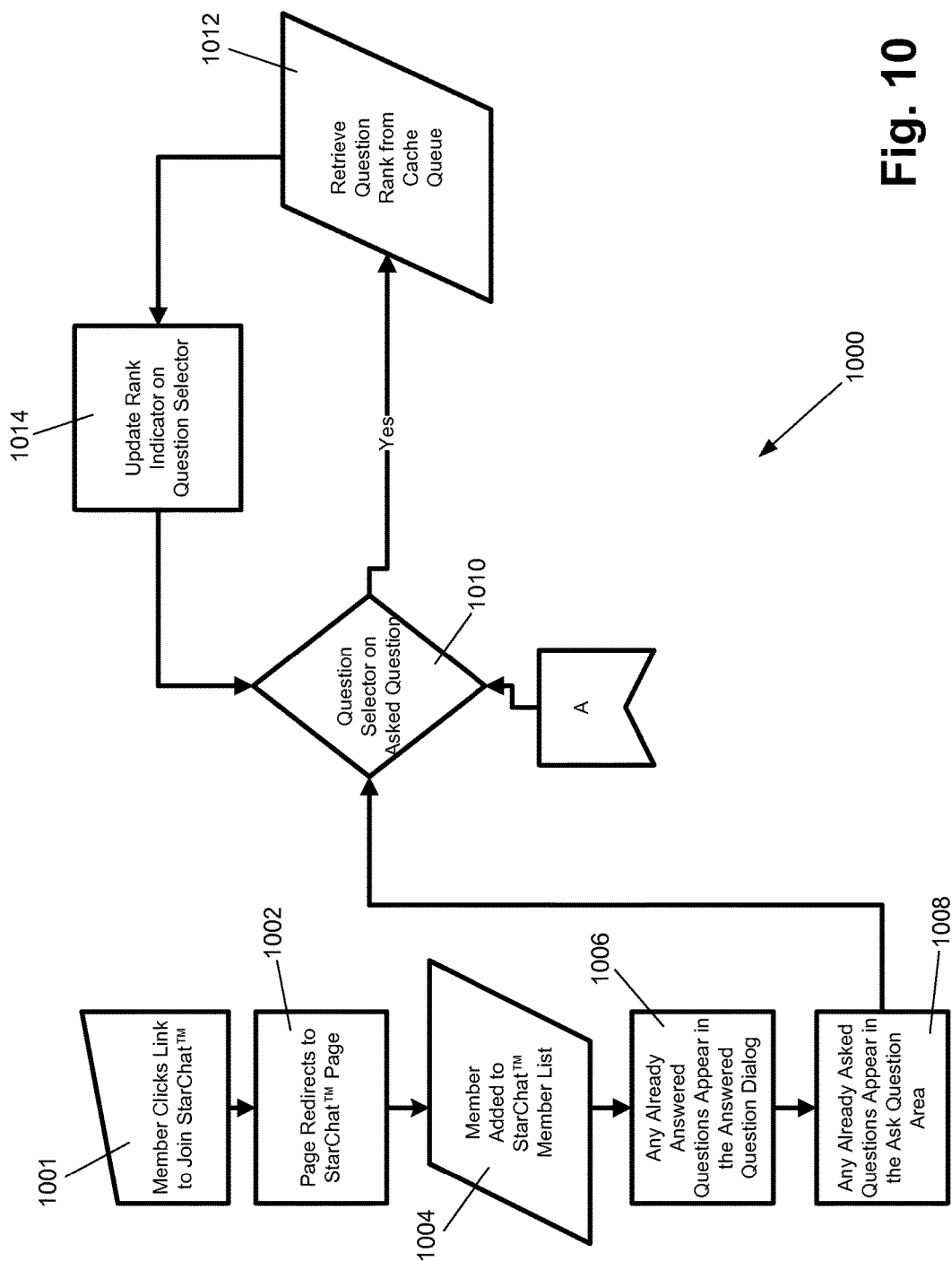
FIG. 10 illustrates a flow diagram of a process of a common user joining the chat bidding session of the chat bidding system, according to an exemplary embodiment of the present invention.

FIG. 10 illustrates an exemplary process 1000 of a common user 615 joining and viewing an exemplary chat bidding session. As shown in FIG. 10, at 1001, the common user 615 may elect to join a particular chat bidding session. At 1002, the server assembly 150 may redirect the common user 615 to an appropriate web page for the chat bidding session, and the common user 615 may be added to a user list of the chat bidding session at 1004. The common user 615 may then be presented with tasks to which the featured user 635 has previously responded in the chat dialog at 1006. Additionally, questions and tasks to which the featured user 635 previously responded may appear in an "asked questions" area of the web page at 1008.

At 1010, the networking system 300 may enter a cycle of updating ranks of posed tasks. Such updating may ensure that the tasks, as displayed on the web site 305, reflect accurate rankings based on updated bid values from common users 615. Updating may be implemented, preferably behind the scenes and out of view of the users 615 and 635, by providing a question selector on the client computer 102 to iterate through tasks in the local tasks queue 620. Each web client 124 may provide metadata to the server assembly 150 describing changes to bid values and task ranks. In each iteration, at 1010, a web client 124 may determine whether the question selector references a posed task. If so, at 1012, an updated rank of the task may be retrieved from the tasks queue 620 on the server assembly 150. The rank of the task referenced by the question selector may then be updated on the web client 124 to reflect current bid values at 1014.

Figure 11:
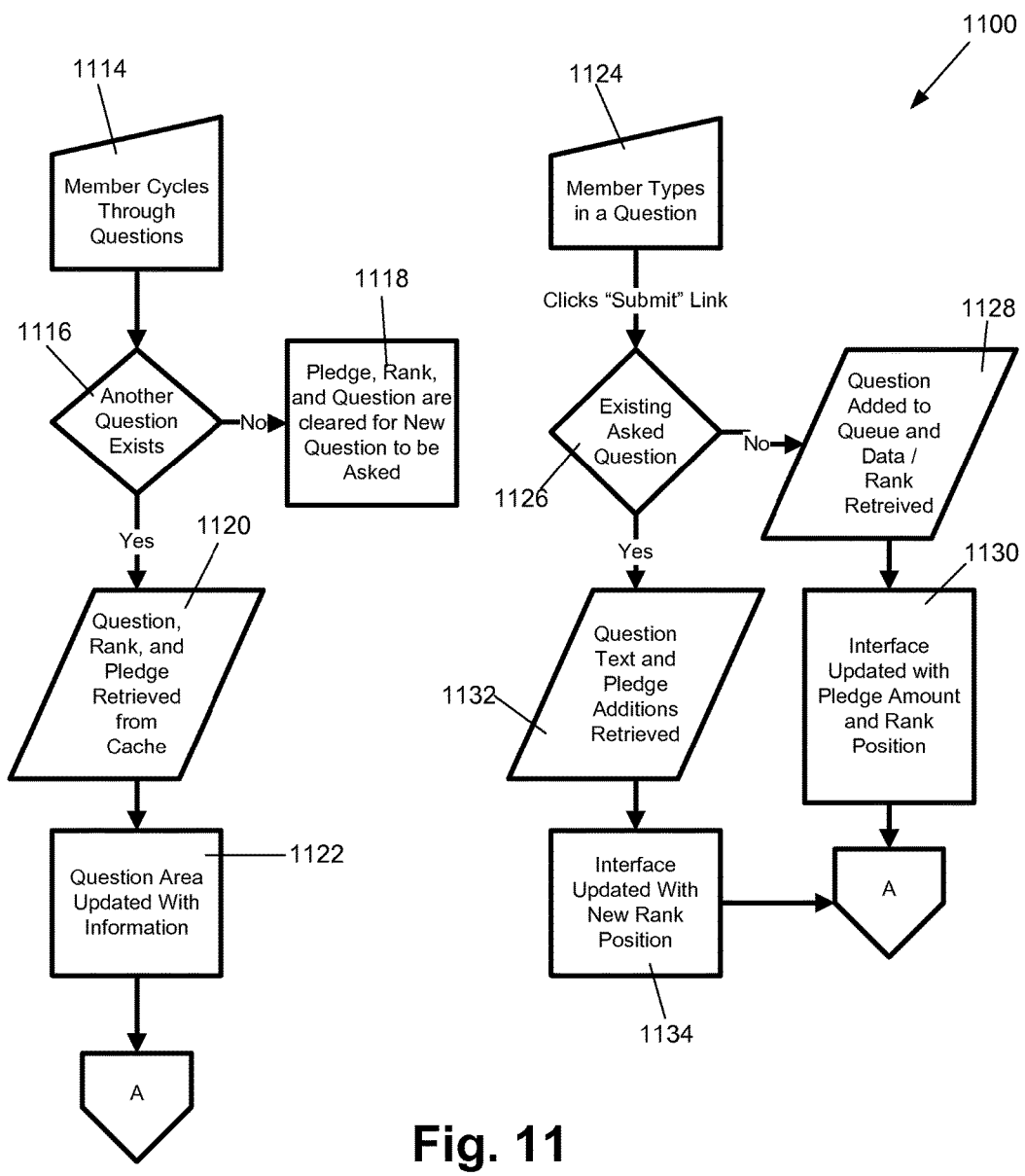
FIG. 11 illustrates a flow diagram of a process of the user participating in the chat bidding session of the chat bidding system, according to an exemplary embodiment of the present invention.

FIG. 11 illustrates an exemplary process 1100 of a common user 615 participating in an exemplary chat bidding session. At 1114, the common user 615 may use arrows, or similar selectors, to cycle through tasks previously posed by that particular common user 615. At 1116, the networking system 300 may determine whether questions or other tasks posed by other common users 615 exist in the queue 620. If no such tasks exist, the networking system 300 may clear areas of the cache used for displaying tasks and their pledges and ranks. The common user 615 may then pose new tasks to the featured user 635. Alternatively, if one or more tasks remain in the tasks queue 620, as at 1120, data regarding such tasks may be retrieved from the cache and then displayed at 1122. Then, when the common user 615 enters a question or other task at 1124, the networking system 300 may insert such question or other task into the tasks queue 620. If the newly posed task has not been previously posed in the chat bidding session, the web page of the chat bidding session may then be updated with data regarding the newly posed task of the common user 615. Otherwise, if the task was previously posed, the task and related data, such as an associated bid value, may be retrieved from the cache at 1132, and then displayed on the web page of the chat bidding session at 1134.

Preferably, the client computer 102, such as that used by the common users 615 or the featured user 635, and the server assembly 150 interact in the chat bidding session through a service executing a dynamic update. This service may enable the web page of the chat bidding session to update without user interactions, such as clicking a "Refresh" button on the web client 124. The dynamic update service may enable the common user 615 to view real-time positions of his tasks in the queue 620, as well as real-time data for various other statistics viewable to the common user 615. The dynamic update service may enable the featured user 635 to view real-time data related to, without limitation, any or all of the following: number of tasks in the tasks queue 620, number of queued tasks associated with bids, elapsed time of the chat bidding session, estimated time to respond to all queued tasks, average time to respond to each task, amount of money raised, number of common users 615 viewing the chat bidding session, and various other statistical data related to the chat bidding session Performance Bidding System Through the performance bidding system 340, users may request to perform on the web site 305, and may pledge credits to determine an order in which they may be allowed to perform. Such pledged credits may be directed towards a benefiting charity or may be paid to the web site 305 for the opportunity to perform. Alternatively, credits may be divided between the web site 305 and the benefiting charity. In some exemplary embodiments, the benefiting charity, if any, may be predetermined, and the users may be notified of information regarding the charity.

The performance bidding system 340 may be available to both common users 615 and featured users 635. Through the performance bidding system 340, common users 615 may have an opportunity to perform for featured users 635 and other common users 615. Similarly, featured users 635 may have an opportunity to perform for common users 615 and other featured users 635. Users participating in the performance bidding system 340, but not currently queued for a performance on the web site 305, are herein referred to as observers. The users queued for performances are herein referred to as performers. Together, performers and observers may make up the participants of the performance bidding system 340.

The performance bidding system 340 of the web site 305 may function in some manners similar to the chat bidding session. Similarly to the chat bidding system 330, the performance bidding system 340 may comprise a queue, specifically a performance queue, and a plurality of participating users.

When a performance request reaches the top of a performance queue, the user making the performance request may perform live for other participants. During a performance, the networking system 300 may provide the performing user with music and lyrics, as in a karaoke-style performance. If a non-karaoke type of performance is desired, the web site 305 may provide other, appropriate support for the performance. For example, if the performing user indicates that she would like to perform in spoken word, the web site 305 may provide soft background music as indicated by the performing user. The performing user may provide one or more recording devices, such as a webcam and a microphone, and the server assembly 150 may receive media representing the performance. Preferably, such media is streaming media. The web site 305 may present the performance, preferably streaming, to the observers.

Users who make performance requests may be provided with a menu of selections for supporting their performance. For example, a user requesting to perform may be presented with a list of songs for the web site 305 to provide music and lyrics. Upon selecting specific performance support for a performance, the user's username and support selections, such as a song title, may appear in a status section of a web page of the performance bidding system 340 to identify the user's position in the performance queue. All other queued performers, or alternatively, a predetermined number of highest ranked performers in the performance queue, may also appear in the status section, thereby providing participants with data regarding expected performances.

Through the performance bidding system 340, the web site 305 may display data regarding the performers, observers, or all participants. For example, and not limitation, the web site 305 may display the total numbers of performers and observers. The web site 305 may also display statistics of performers or of the total participating users, such as displaying geographic statistics of the performers or of all participants. This may give participants an estimate of the geographic range of the performers, and may give performers a geographic range of the observers.

Upon making a performance request, a user may pledge credits to the request and, thereby, associate the request with a bid value. If the user requesting to perform is a sponsored user, then the pledged credits may be credits from an associated sponsoring user's account. If no bid value is provided with a performance request, the request may be placed at the bottom of the performance queue. However, a performer may increase her position in the queue by increasing her pledge value above other another performer's pledge value. Performers may rise in the performance queue as others perform and are, consequently removed from the queue. A performer's position in the queue may be dynamic, as all performers may increase their bid values to escalate their own positions in the performance queue. Therefore, a performer's queue position may periodically change and be updated accordingly in the status section.

A bidding dialog box on the web site 305 may provide performers with means to increase their pledges and, thereby, potentially increase their positions in the performance queue. The bidding dialog box may display to each performer an amount of credits required to increase the performer's queue position to a certain rank in the performance queue. After a performer attains one of the top X positions in the performance queue, the performer's position may become locked. Locking the top X positions in the performance queue may be implemented in various manners, including those described above with reference to the top N positions of the tasks queue 620. Performers with the top X locked positions may be able to perform in succession regardless of pledge increases of participants. At a point in time, the top X performers, along with their support selections, may be displayed in the status section of the web page of the performance bidding system 340.

While a user is performing on the web site 305, data from her profile may be displayed to participants of the performance bidding system 340. Participants may also have an opportunity to follow a web hyperlink and, thereby, view the performing user's full profile on the web site 305. Participants may then be able to learn more about the performing user and may leave feedback on the performing user's profile.

At the end of each performance, a rating window may automatically be presented to the participants. Through the rating window, the participants may rate the performance or leave feedback regarding the performance. Top-rated performances may be stored on the server assembly 150 and accessible for replay by each participant.

Figure 12:
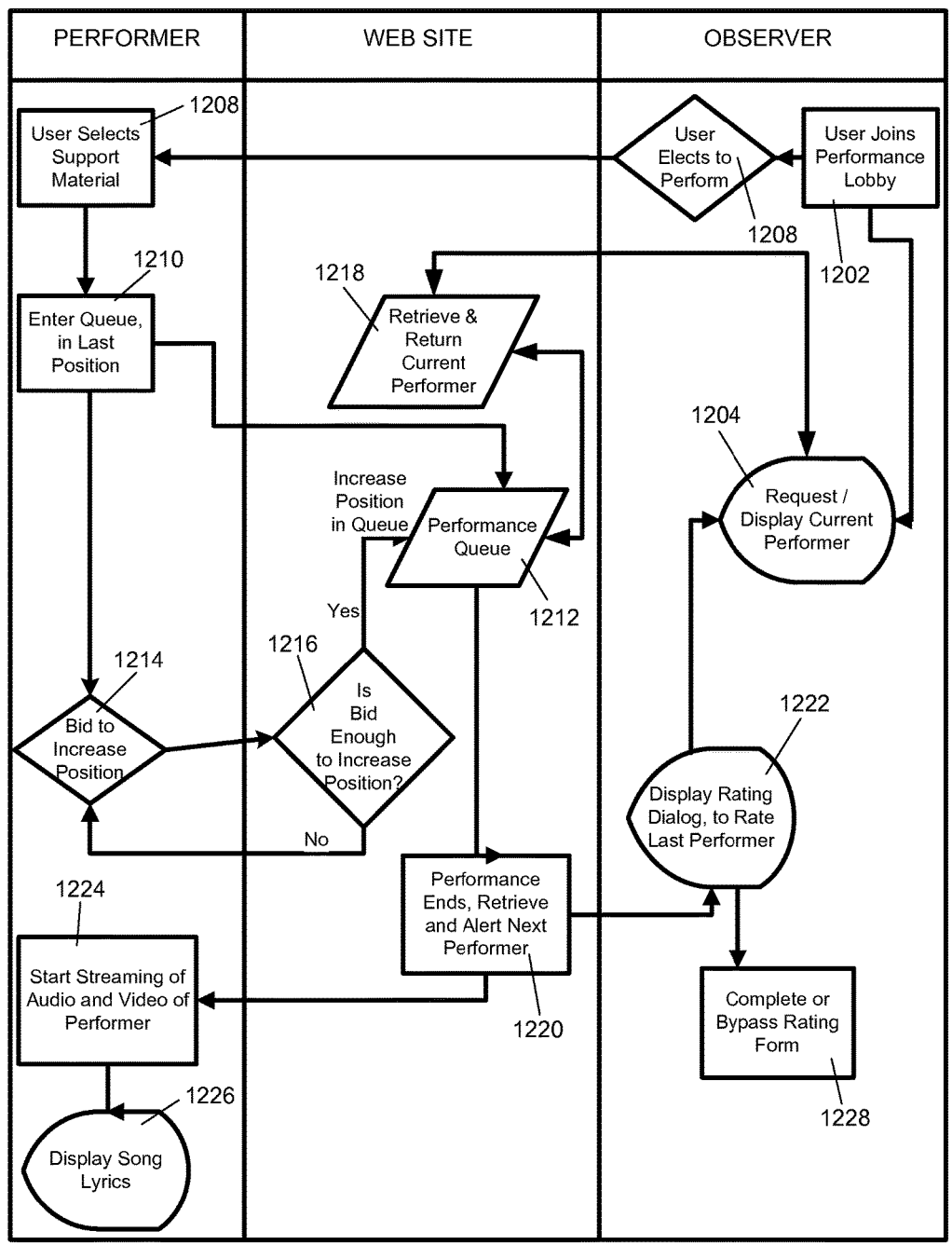
FIG. 12 illustrates a flow diagram of an operation of a performance bidding system of the networking system, according to an exemplary embodiment of the present invention.

FIG. 12 illustrates a flow diagram of a process 1200 of the performance bidding system 340, according to an exemplary embodiment of the networking system 300. As shown in FIG. 12, at 1202, a participant may enter a lobby, or introductory web page, of the performance bidding system 340 of the web site 305. The participant may participate passively by requesting, receiving, and viewing streaming media of the current performing user at 1204. The participant may elect to become a performer at 1206. At 1208, the participant may be presented with a selection of support material, such as a list of songs from which the participant may select a song to perform. After the participant selects support material, the user's username and support material may be inserted into the last position of the performance queue, at 1210, if no credits are yet pledged. The performance queue may be maintained and dynamically updated at 1212. At 1214, the participant may be offered an option to pledge credits, or additional credits, to escalate her position in the performance queue. If the participant bids credits to escalate her position, at 1216, the networking system 300 may determine whether the bid is sufficient to raise the participant's position in the performance queue. If the bid is sufficient, the process 1200 returns to 1212 and updates the performance queue.

When a performance ends at 1220, a next performer in the performance queue may be alerted. Additionally, the queue may be updated, and a rating dialog box may be displayed at 1222, providing participants an opportunity to rate the previous performer and to provide comments about the performance. Accordingly, participants, including the previous performer, may be provided with instant feedback from other participants. Viewing participants may complete a rating form in the dialog box or may bypass completing the rating form at 1228.

When a participant performs, streaming media, such as audio and video, of the performer may be presented to all viewing participants at 1224. In some instances, the participant may be provided with background music and lyrics at 1226.

Accordingly, users of the networking system 300 may interact with one another by performing for one another, viewing such performances, and communicating regarding such performances.

Telephony Switching System

In accordance with an exemplary embodiment of the telephony switching system 350, parties may contact one another anonymously. The telephony switching system 350 may enable a party to limit calls from certain users and groups of users, and according to predefined schedules. This feature of the web site 305 may be especially beneficial for featured users 635. Through the telephony switching system 350, a featured user 635 may place or accept a call to or from a common user 615 while maintaining a concealed phone number. Additionally, through predefined scheduling rules, the featured user 635 may block all calls during certain time periods. Furthermore, common users 615 may transition a chat session to a telephone call without compromising the privacy common to chat sessions.

In an exemplary embodiment of the networking system 300, a calling party may request a connection, such as a telephone chat, to a receiving party. Prior to attempting to forge the connection, the networking system 300 may verify that the receiving party is willing to accept the connection from the calling party. Once verified, the networking system 300 may place a call to each of the calling party and the receiving party, and may then patch the two calls together so that each of the two parties can engage in a chat without divulging contact information, such as a telephone number, to the other party. Alternatively, the calling party may initialize the connection by contacting a service center and requesting to be connected to the receiving party via a communication device. In such an embodiment, the service center may initiate a call to the receiving party and patch that call to the calling party.

Figure 13A:
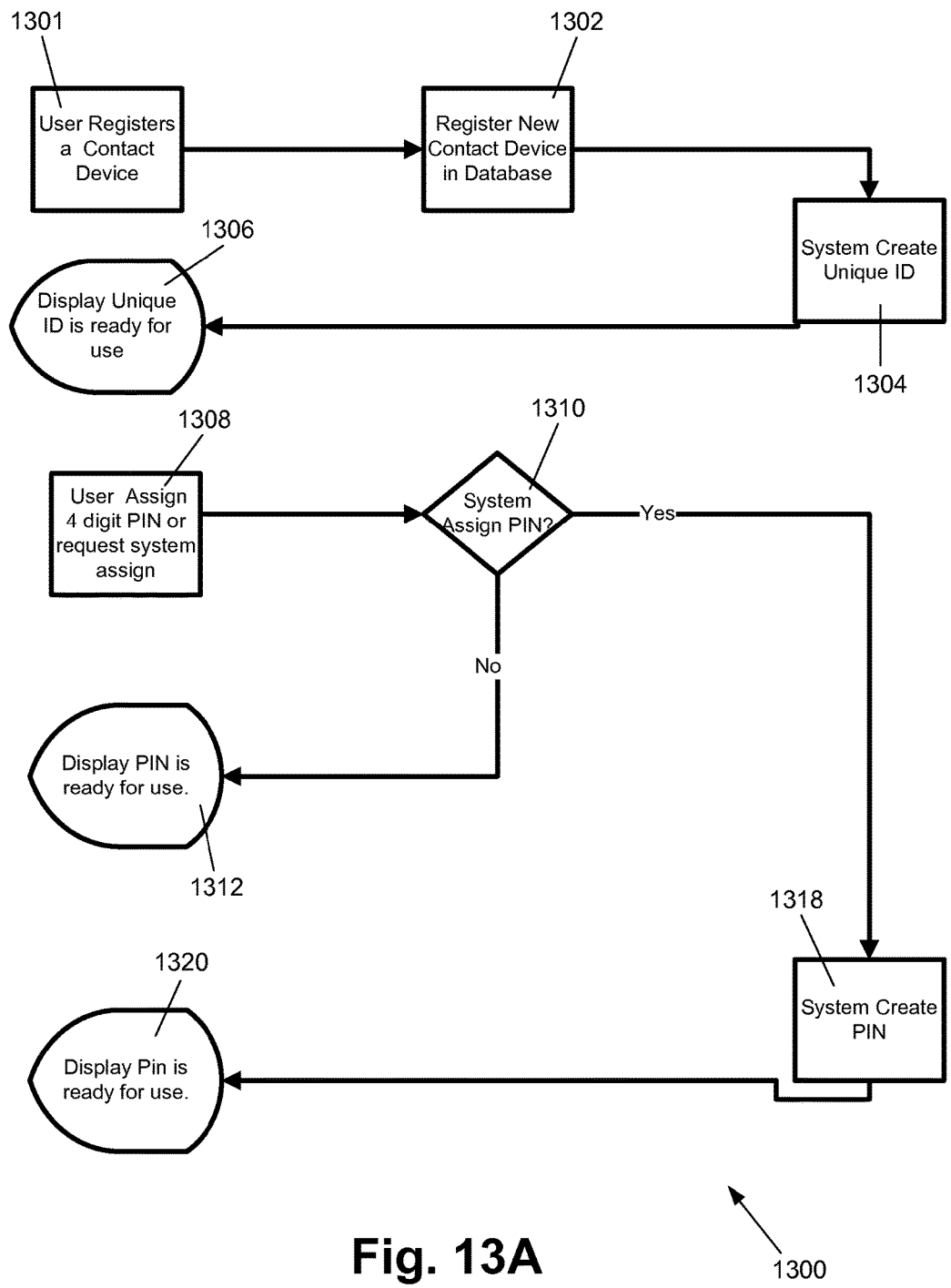
FIG. 13A illustrates a process of registering a communication device with the telephony switching system of the networking system, according to an exemplary embodiment of the present invention.

Before a user may utilize the telephony switching system 350, a communication device of the user may need to be registered with the telephony switching system 350. FIG. 13A illustrates a process 1300 of registering a communication device with the telephony switching system 350. As shown in FIG. 13A, at 1301, the user of the telephony switching system 350 may request that the communication device be registered. At 1302, the telephony switching system 350 may register the communication device on a database of the server assembly 150. At 1304, the telephony switching system 350 may create a unique identifier associated with the communication device. At 1306, a message may be displayed on the web site 305 notifying the user of the unique identifier and its availability for use. At 1308, the user may either assign his own personal identification number ("PIN") or request that the telephony switching system 350 create a PIN for the user. At 1310, telephony switching system 350 may determine whether to create a PIN or, alternately, whether the user has submitted a PIN for validation. If the telephony switching system 350 was asked to assign a PIN, such a PIN is created and assigned by the telephony switching system 350 at 1312. Otherwise, the user assigned PIN may be validated. At 1320, the web site 305 may display that the PIN is active and ready for use.

Accordingly, after completing the registration process, the communication device may be associated with a unique identifier and a PIN. Generally, the unique identifier may be used to identify a calling party when a connection is requested via the telephony switching system 350. The PIN, on the other hand, may be used to identify a receiving party. In other words, when attempting a connection, the calling party may provide a unique identifier to identify himself, and may provide a PIN to identify the receiving party. Accordingly, the calling party may be required to receive a PIN from the receiving party before connecting to the receiving party. Each receiving party may request and receive multiple PINs from the telephony switching system 350. According to wishes of the receiving party, each PIN may serve a distinct purpose. For example, a first PIN may be distributed to family members for contacting the receiving party, and a second PIN may be distributed to business associates for contacting the receiving party. This will be described in further detail below.

Figure 13B:
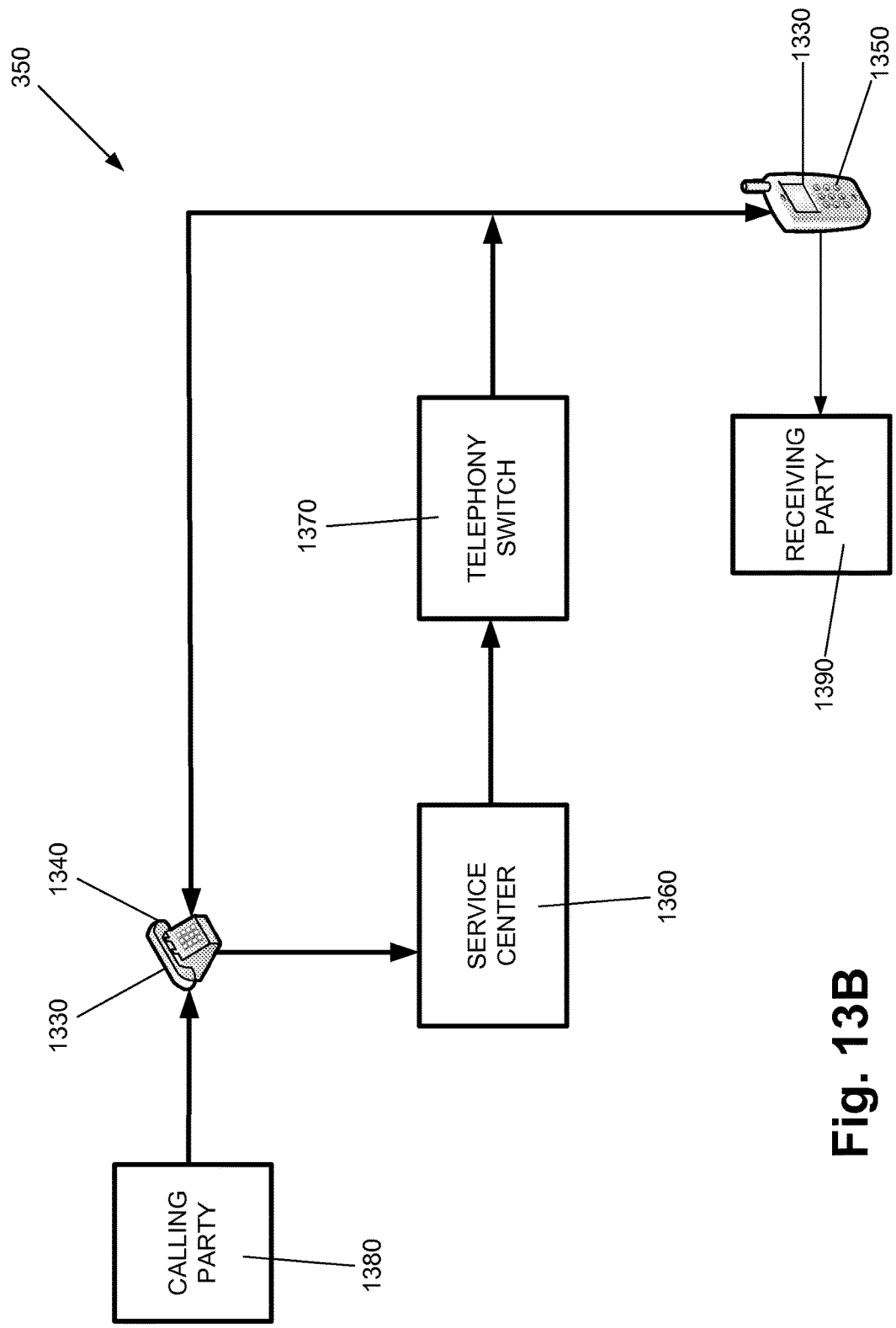
FIGS. 13B-13C illustrate block diagrams of a telephony switching system of the networking system, according to an exemplary embodiment of the present invention.
Figure 13C:
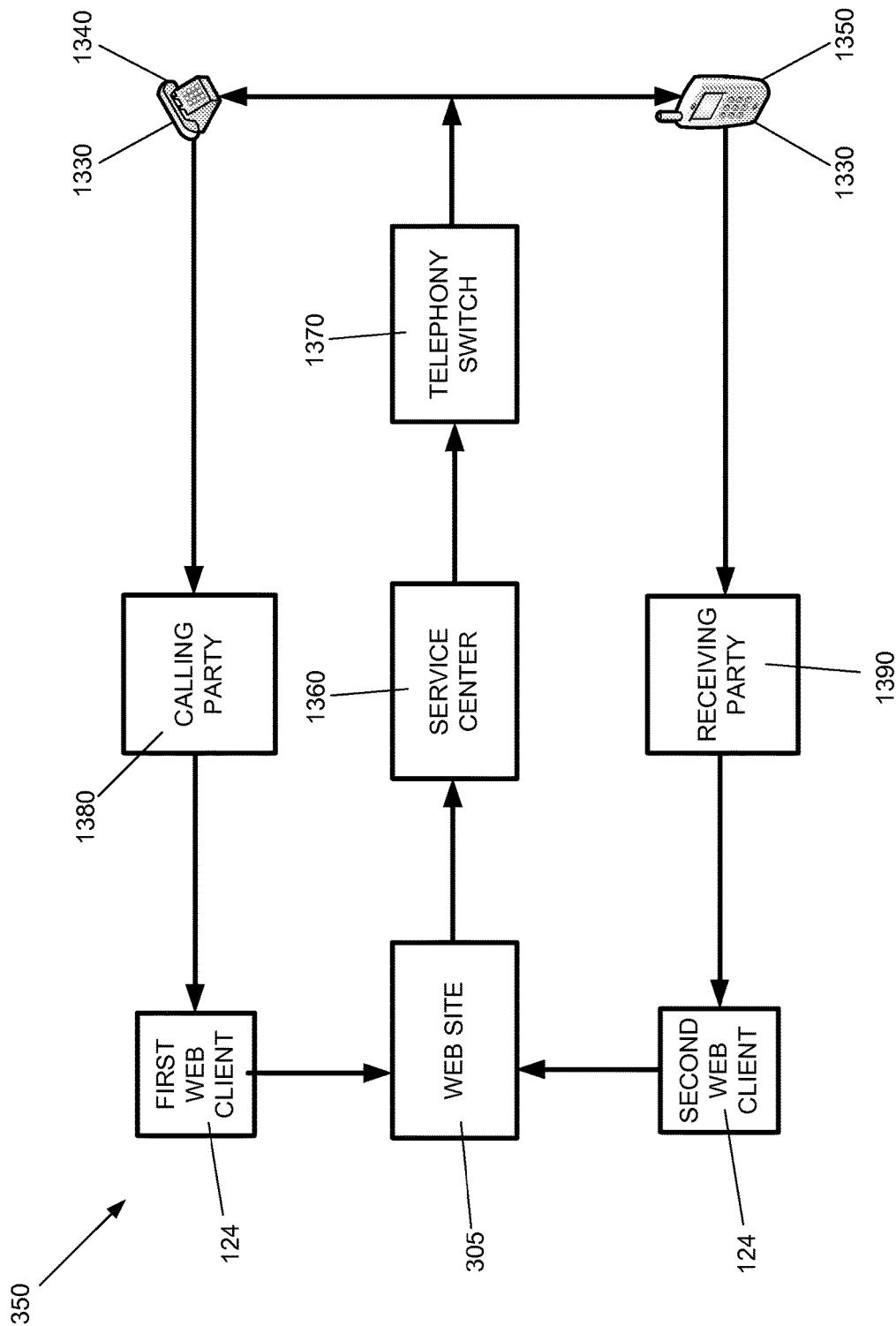

FIGS. 13B-13C illustrate block diagrams of exemplary embodiments of the telephony switching system 350. As shown in FIG. 13B, an exemplary embodiment of the telephony switching system 350 may generally comprise at least two communication devices 1330, a service center 1360, and a telephony switch 1370.

As shown in FIG. 13B, the calling party 1380 may use the first communication device 1340 to communicate with the service center 1360. The service center 1360 may be in communication with the telephony switch 1370. The telephony switch 1370 may be in communication with the first communication device 1340 and the second communication device 1350, and may connect the first communication device 1340 to the second communication device 1350. For purposes of FIGS. 13B-13C, the communication devices 1330 are already registered with the telephony switching system 350.

The communication devices 1330 may include a first communication device 1340 and a second communication device 1350. For purposes of an exemplary embodiment of the telephony switching system 350, communication devices 1330 may comprise various devices capable of communicating over a communications network, such as a telephone network or the internet. Each communication device 1330 may be a wired telephone, wireless telephone, cellular telephone, satellite telephone, voice over IP ("VoIP") phone, PDA, soft phone, computer, or other device capable of audio and/or video communications. The first communication device 1340 may be associated with a first phone number and a calling party 1380. The first phone number identifies the first communication device 1340. Similarly, the second communication device 1350 is associated with a second phone number and a receiving party 1390. The second phone number identifies the second communication device 1350.

The service center 1360 may comprise one or more hardware or software devices, or various combinations thereof, capable of receiving and storing registrations relating to communication devices 1330, managing such registrations, analyzing connection requests relating to registered communication devices 1330, and initiating and managing connections.

The telephony switch 1370 may comprise various telephone exchanges, switches, or combinations thereof. For example, and not limitation, the telephony switch 1370 may be a private branch exchange ("PBX"). The telephony switch 1370 may connect the calling party 1380 to the receiving party 1390 if such a connection is deemed allowed.

In an exemplary embodiment of the telephony switching system 350, the telephony switch 1370 may comprise one or more PBX switches trunked to other telephony switches and telephony service centers with various PBXs located around the world. Trunks may allow multiple calls to be combined into a single channel and be delivered to other PBXs either in the same telephony switch 1370 or other telephony switches having available channels to VoIP termination providers or public switched telephone network ("PSTN") terminations. In addition, the telephony switch 1370 may provide trunks and termination end points to provide high quality and low cost termination to communication devices 1330. The termination end points and trunks may also be provided through a third party VoIP termination or PSTN. In an exemplary embodiment, the PBX implementation may be a software system allowing existing telephony infrastructure to interact using VoIP standards.

In some exemplary embodiments of the telephony switching system 350, the service center 1360 and the telephony switch 1370 may be integrated together. For example, the service center 1360 may comprise a PBX for providing the call-handling for users requesting communications with other users. Calls may traverse digital circuits, analog interfaces, VoIP networks, or various other networks for delivering communications. Digital circuits may be defined telephony standards, such as T1 lines carrying 24 channels of voice to standard telephony companies. Analog interfaces may provide single channels of voice for delivery to the public switched telephone network (PSTN). VoIP protocols, such as SIP, IAX, H.323, and others, may enable audio, metadata, and video to be digitized, secured, and compressed for delivery over computer networks to other service centers or other termination endpoints. These delivery mediums may enable the PBX in the service center 1360 to connect two or more parties anonymously.

Figure 14:
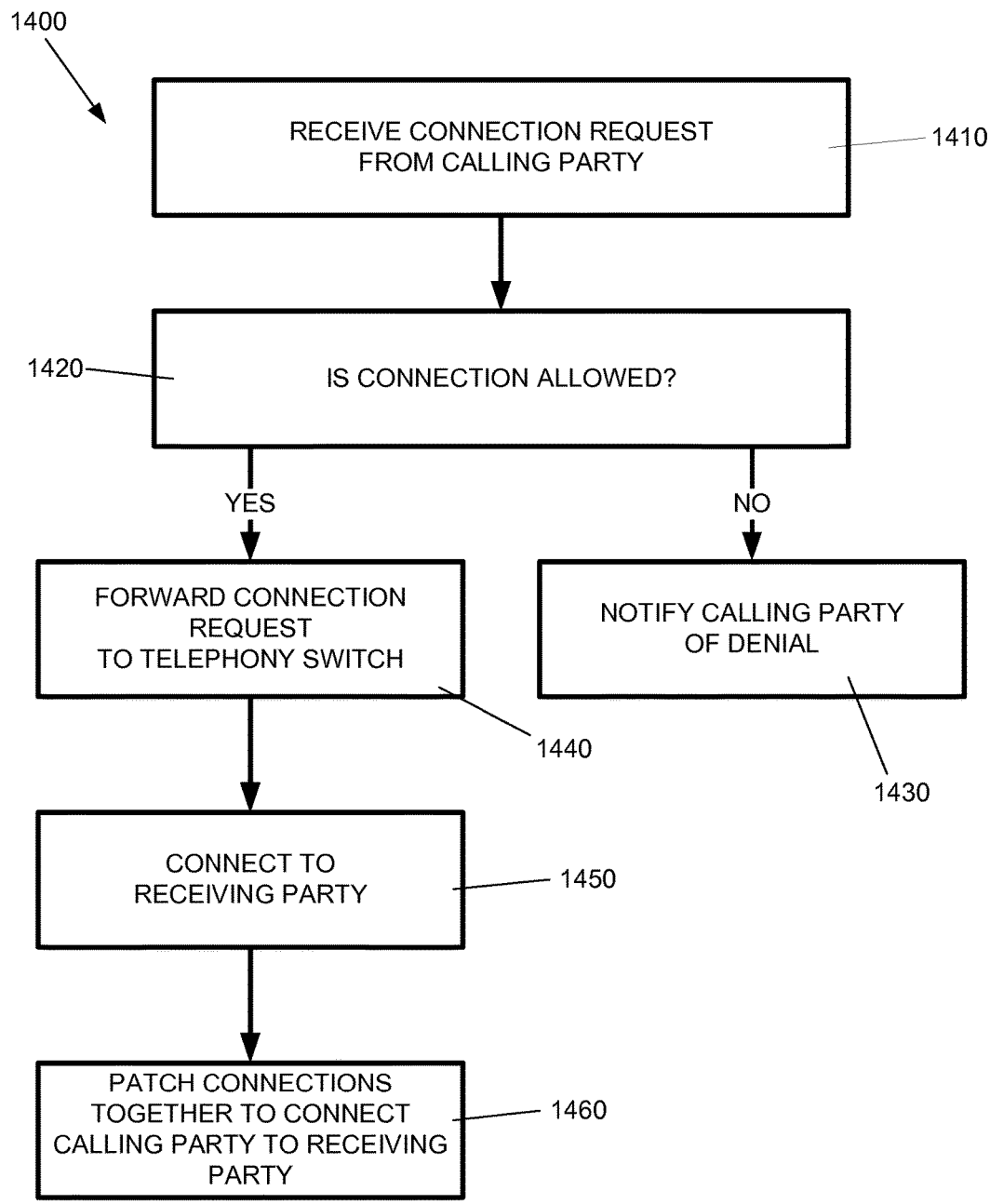
FIG. 14 illustrates a flow diagram of a method of handling a connection request from a calling party to a receiving party in the telephony switching system of the networking system, according to an exemplary embodiment of the present invention.

FIG. 14 is a flow diagram illustrating a method 1400 of handling a connection request from the calling party 1380 to connect to the receiving party 1390, according to an exemplary embodiment of the telephony switching system 350. At 1410, the service center 1360 receives a connection request from the calling party 1380 to connect to the receiving party 1390. Such communication request may be made by the calling party 1380 through the first communication device 1340. Alternatively, the communication request may be made by the calling party 1380 via a web interface. At 1420, the service center 1360 may determine whether a connection is allowed given predetermined variables. Such variables may include certain contact rules preset by the receiving party 1390. For example, and not limitation, each user may provide a list of users permitted to call, a list of users not permitted to call, times when calls are allowed, or other suitable calling criteria. If the connection request is not allowed, the service center 1360 may notify the calling party 1380 of the denial, as at 1430. Otherwise, if the connection request is approved, at 1440, the service center 1360 may forward the connection request to the telephony switch 1370. At 1450, the telephony switch 1370 may connect to the second communication device 1350 and, therefore, to the receiving party 1390 using the second communication device 1350. Finally, at 1460, the telephony switch 1370 may patch together its connections to the calling party 1380 and the receiving party 1390, such that the two parties 1380 and 1390 are in communication with each other. If the receiving party 1390 does not answer, the calling party 1360 may be permitted to leave a voice message within the receiving party's video/voice mailbox.

Referring now back to FIG. 13B, communication devices 1330, such as the first and second communication devices 1340 and 1350, may be registered with the service center 1360. Registrations may be communicated to the service center 1360 through various manners. For example, and not limitation, registration of the first communication device 1340 may be communicated to the service center 1360 through a phone call, such as by the calling party 1380 calling the service center 1360 and providing registration information.

Alternatively, registration may be accepted through a web client 124. The web client 124 may receive registration information and send it to the server assembly 150. The server assembly 150 may be part of, or in communication with, the service center 1360. Alternatively, the service center 1360 may be part of the server assembly 150. The server assembly 150 may provide the registration information to the service center 1360. Registration information for a communication device 1330 may include, without limitation, a phone number associated with the communication device 1330, an account identifier, and a set of contact rules.

The account identifier may comprise information for identifying a user account on the web site 305. The specified user account may then be associated with the communication device 1330. As discussed above, an account user, such as the calling party 1380, may have a credit account associated with the user account. The credit account may track a number of credits available to the associated user for purchasing services from the web site 305. By associating the user account with the communication device 1330, credits available to the user of the user account may also become available for the purpose of purchasing connections through the telephony switching system 350. Additionally, credits may be charged for the duration of connections initiated through the telephony switching system 350.

In the case of a sponsored user, credits used by the sponsored user for connections through the telephony switching system 350 may be charged to an account of an associated sponsoring user. In some embodiments, the sponsoring user may specify, such as in his or her sponsor guidelines, that credits used by the sponsored user for these connections must be limited to interactions with the sponsoring user. If such a specification is made, then the telephony switching system 350 may deny connections requested by the sponsored user to users other than the sponsoring user, if such connections would otherwise be charged to the sponsoring user.

As a part of a registration, the set of contact rules may indicate who may connect to the communication device 1330, and when such connections may occur. Various rule types may be included in the contact rules. For example, and not limitation, the contact rules for the receiving party 1390 or the second communication device 1350 may specify that connections may be made from the first communication device 1340 only during certain hours. For purposes of establishing contact rules, the receiving party 1390 may refer to the first communication device 1340 by, for example, its associated phone number, its unique identifier, or a username or other alias of the receiving party 1390. For additional example, the contact rules may specify that users of a predefined group may not connect to the second communication device 1350, or that users of the predefined group may connect to the second communication device 1350 only during specified hours. The contact rules may specify that the first communication device 1340, or users of the predefined group, may never connect to the second communication device 1350 or, alternatively, may connect to the second communication device 1350 at any time. The contact rules may also specify categories of allowed or disallowed calls, such as conference calls, faxes, or calls from cellular telephones. One skilled in the art will recognize that the contact rules may specify alternate handling of connection requests based on various factors, including, without limitation, subject matter of the call, gender of the calling party, geographic location of the calling party, and/or time of the call.

At least partially because of the wide range of potential contact rules, embodiments of the telephony switching system 350 may have wide application. For example, the telephony switching system 350 may be used for recruiting and screening employment opportunities. A potential hiree may structure contact rules around acceptable employment opportunities. For further example, the potential hiree may allow calls only from recruiters or employers having job opportunities in a predefined geographic area, with salaries over a predetermined threshold, and/or with a predetermined set of benefits.

The contact rules may specify actions to be taken if a connection is requested when the receiving party 1390 is unavailable and cannot, therefore, respond to a connection made through the telephony switching system 350. For example, and not limitation, the contact rules may specify which parties are approved to leave messages, and which parties are to be presented with a pre-recorded message from the receiving party 1390. Further, the contact rules may specify alternate voicemail recordings to be presented to alternate calling parties 1380. A connection may be automatically terminated if the calling party 1380 is not approved to leave a message or to receive a pre-recorded message when the receiving party 1390 is unavailable. Additionally, if a call is attempted, but the receiving party 1390 does not answer the call, the telephony switching system 350 may terminate the call when detecting that the receiving party's voicemail is answering the call. Such termination may be useful in maintaining the privacy of the receiving party 1390 because personal information, such as the person's identity or phone number, may be present on the standard voicemail greeting. In such cases, the calling party 1380 may be diverted to the receiving party's mailbox associated with the telephony switching system 350, or the call may be terminated without allowing a message to be left.

Mailboxes may receive messages of various types. For example, and not limitation, such mailboxes may include conventional voice mailboxes, video mailboxes, audio mailboxes, email mailboxes, and multimedia mailboxes capable of receiving various types of mail. When a call to the receiving party 1390 is unanswered, the calling party 1380 may be redirected to a voice mailbox, or may receive instructions for leaving a message in some other media format. Through the web site 305 or over a phone call, the receiving party 1390 may have various options for organizing, sorting, retrieving, and responding to messages, including those messages left through the telephony switching system 350. For example, the receiving party 1390 may sort messages based on characteristics of senders of the messages, or on other characteristics of the messages. The receiving party 1390 may respond individually or en masse to all messages or a set of messages. Such response may also take various media formats, such as video, audio, email, or multimedia.

In addition to the above, the contact rules may specify that any person who provides a specific PIN may connect to the second communication device 1350 according to a predefined schedule associated with the caller PIN. As described above, the receiving party may have multiple PINs for distinct purposes. Multiple caller PINs may be assigned and used for various users, groups, or call types. For example, different caller PINs may be provided for chat sessions, for a family group, and for a celebrity fan group. Each caller PIN may be automatically generated by the service center 1360, or the receiving party 1390 may create the caller PIN and provide such caller PIN to the service center 1360. Each caller PIN may, for example, allow unlimited uses, a specific number of uses, or may be given an absolute or relative termination date.

Connections may be requested in various ways. For example, the calling party 1380 may call the service center 1360, which is preferably identified by a toll free number. When connected to the service center 1360, the calling party 1380 may provide information to identify the receiving party 1390. For example, and not limitation, the calling party 1380 may enter a username for a user account of the receiving party 1390, an identifying PIN associated with the receiving party 1390, the unique identifier of the receiving party 1390, or various other identifiers or aliases of the receiving party 1390. Preferably, the service center 1360 receives such information from the calling party 1380 via an automated service provided by the service center 1360.

If the receiving party's contact rules dictate that the calling party 1380 provide a caller PIN, the calling party 1380 may be prompted to provide such a caller PIN. In a first exemplary embodiment, the service center 1360 may automatically recall the unique identifier of the first communication device 1340. In an alternate exemplary embodiment, the service center 1360 may prompt the calling party 1380 to enter the unique identifier of the first communication device 1340. The service center 1360 may consider this unique identifier when determining whether to approve the connection. After receiving the connection request, the service center 1360 may approve or deny the connection based on data received from the calling party 1380 and the first communication device 1340, as compared to the contact rules of the receiving party 1390.

As illustrated in FIG. 13C, and as briefly discussed above, the connection request may also be made over the internet through use of one or more web clients 124. Through a first web client 124, the calling party 1380 may be logged into a user account on the web site 305. Through links in the web site 305, the calling party 1380 may request a connection to the receiving party 1390. The calling party 1380 may not be required to know the name or phone number of the receiving party 1390, so long as the calling party 1380 can provide predetermined identifying information regarding the receiving party 1390. For example, and not limitation, the calling party 1380 may provide or select a username of a user account associated with the receiving party 1390. The server assembly 150 may receive the connection request and may route the request to the service center 1360 for approval. The service center 1360 may approve or deny the connection based on contact rules of the receiving party 1390.

Alternatively, the receiving party 1390 may be logged onto the web site 305 when the calling party 1380 requests a connection to the receiving party 1390. In that case, the receiving party 1390 may be notified of the connection request via a second web client 124 used by the receiving party 1390. Via the second web client 124, the receiving party 1390 may approve or deny the connection request. The receiving party's approval or denial may be received by the server assembly 150. If the receiving party 1390 approves or denies the connection request via the second web client 124, the service center 1360 need not determine whether to connect the calling party 1380 to the receiving party 1390. If the receiving party 1390 approves the connection, the server assembly 150 may notify the telephony switch 1370 of such approval. The telephony switch 1370 may then connect the calling party 1380 to the receiving party 1390, as described further below.

The service center 1360 may receive connection requests from the server assembly 150 or from the calling party 1380. In response to such receipt, the service center 1360 may determine whether to honor connection requests. After receiving the connection request of the calling party 1380, the service center 1360 may query the contact rules of the receiving party 1390 to determine whether the calling party 1380 may connect to the receiving party 1390. If the contact rules specify that the calling party 1380 or the first communication device 1340 may connect to the receiving party 1390 or the second communication device 1350 at the time the connection request is made, then the service center 1360 may approve the connection request. Otherwise, the service center 1360 may deny the connection request. If the receiving party 1390 is logged into the web site 305 and approves the connection, the contact rules verification step may be skipped.

If a connection request is denied, the calling party 1380 may be disconnected from the service center 1360 without being connected to the receiving party 1390. Preferably, such a disconnection is preceded by the service center's providing a polite message to the calling party 1380 notifying the calling party 1380 that the requested connection is not allowed. If the connection request was made via the first web client 124, then the server assembly 150 may prompt the first web client 124 to notify the calling party 1380 of the denial.

If, on the other hand, the connection request is approved, the service center 1360 may communicate the approved connection request to the telephony switch 1370. The telephony switch 1370 may then connect the calling party 1380 to the receiving party 1390. For example, and not limitation, the telephony switch 1370 may direct a signal to the second communication device 1350 indicating that a connection is requested. Such a signal may result in the second communication device 1350 issuing an alert, such as an audible tone, to notify the receiving party 1390 that a call is waiting. Caller identification data associated with the service center 1360 may also be transmitted to the second communication device 1350. Accordingly, if the second communication device 1350 is capable of displaying caller identification data, it may display data related to the service center 1360. If the second communication device 1350 is activated after receiving the signal, such as by the receiving party 1390 answering a phone call, the telephony switch 1370 may connect the first communication device 1340 to the second communication 1350 device. Upon activation of the second communication device 1350, the telephony switch 1370 may immediately connect the first and second communication devices 1340 and 1350. Alternatively, the service center 1360 or the telephony switch 1370 may prompt the receiving party 1390 to accept the connection. Then, the call may be connected only if the receiving party 1390 accepts the connection.

If an approved connection request was received via the first web client 124, then the telephony switch 1370 may send signals to both the first communication device 1340 and the second communication device 1350. Caller identification data associated with the service center 1360 may be transmitted to the first and second communication devices 1340 and 1350. Accordingly, if the communication devices 1340 and 1350 are capable of displaying caller identification data, they may display data related to the service center 1360. In response to such signals, the communication devices 1340 and 1350 may issue alerts to the calling 1380 and receiving parties 1390 of the connection. When the calling and receiving parties 1380 and 1390 activate the first and second communication devices 1340 and 1350, the two parties 1380 and 1390 may be connected.

In an exemplary embodiment of the telephony switching system 350, the caller identification information may include data relating to the service center 1360, such as a phone number of the service center 1360. In an alternative embodiment, calls may be associated with alternative caller identification information. For example, and not limitation, the caller identification information may include an alias, username, or handle of the other party and/or a telephone number associated with the web site 305 or service center 1360.

In an exemplary embodiment of the telephony switching system 350, at least one of the calling party 1380 and the receiving party 1390 (or a sponsoring user associated with either) may be required to use credits to purchase the connection request, the approved connection, or both. Additionally, call crediting may be required for each unit or other measurement unit of call time. Credits may be automatically debited from applicable accounts when a connection is requested or when a call is connected.

The cost, in credits, of connection requests and connections may vary based on predetermined variables. For example, connection to a fax machine may require more credits than connection to a landline telephone. A connection during a business day may require more credits than a connection on an evening or weekend. When the calling party 1380 requests a connection to the receiving party 1390, the calling party's credit account may be debited for the request. If the receiving party 1390 accepts the connection, through contact rules or through an affirmative approval, credit accounts of both parties 1380 and 1390 may be debited for the connection. Alternatively, a debit may only be required for approved connections instead of for connection requests as well, or a debit may only be required for the calling party 1380. Additionally, in some exemplary embodiments of the telephony switching system 350, a debit may only be required from the calling party 1380 when a common user 615 connects to, or requests a connection to, a featured user 635. Regardless of when the actual debits occur, some exemplary embodiments may substitute a sponsoring user's credit account instead of the calling or called party's account, where applicable.

Media Interaction System

The networking system 300 may further comprise a media interaction system 360 accessible through the web site 305. The media interaction system 360 may enable a first user to interact with a second user through a use of one or more media objects.

Media objects may allow users a creative and personal means to interact with other users. Media objects may comprise various types of media, such as computer animations, other video, audio, or text. Preferably, a media object may comprise an animation in conjunction with an illustration package capable of superimposing a user's existing display objects. An animation in the media object may be implemented in various formats, such as Flash™, Microsoft Silverlight™, or the like. When displayed, the media object may have a transparent background. In other words, media objects of the networking system 300 may appear to float in front of other objects displayed on a client computer 102.

Media objects may comprise web-based objects selectable by the first user and sent to the second user after prompting by the first user. The first user may select a media object from a predetermined collection of media objects presented to the first user. The media objects may be associated with a theme, such as a particular holiday, feeling, or season. Media objects available for selection on the web site 305 may change or rotate based on various factors, such as season or political climate.

Media objects may be dynamic and customizable to further personalize interactions between the first user and the second user. For example, and not limitation, a username of the first user may be automatically inserted into a media object sent to the second user, or the networking system 300 may prompt the first user for text to insert into the media object. For further example, the media object may comprise a personalized note to the second user. After the first user selects an option to send the personalized note, the first user may be prompted to enter custom text to be displayed in the note. When the second user receives the note, an animation may play in the web client 124 of the second user. The animation may display, for example, a pen writing the text entered by the first user.

When a media object is selected for sending, the selected media object and any user customizations may be stored and queued on the server assembly 150. To efficiently utilize space on the server assembly 150, if a media object includes an animation, the media object may preferably comprise no more than approximately 30 seconds of animation at 30 frames per second. Additionally, the file size of a media object is preferably no more than approximately 150 kilobytes. Those of skill in the art will recognize that these exemplary animation characteristics and file size are provided as sample characteristics for use in an exemplary computer system. As computing technology improves, these characteristics may be broadened.

When the first user selects a media object to send to the second user, the chosen media object may be stored in a queue of the server assembly 150. In an exemplary embodiment, display of the packaged media object on the second user's client computer 102 may be purposely delayed until a predetermined event occurs. For example, such display may be delayed until the second user returns to a chat room in which the second user actively chats with the first user.

In an exemplary embodiment of the media interaction system 360, the media object may be delivered to the second user's client computer 102 through a pull method. The pull method may be implemented by creating a pulse, or heartbeat, that is repetitively fired by the web client 124, and may be received by the server assembly 150. The request may inform the server assembly 150 of a current state of the web client 124 and any events that should be handled. In return for each pulse sent by the web client 124, data is delivered to the web client 124 regarding how to handle such events.

The first user's request to send the media object may be transmitted to the server assembly 150 in this manner, and may create an event and accompanying metadata on the server assembly 150. The server assembly 150 may read the metadata to determine how to handle the event. Based on the metadata, the server assembly 150 may determine that the event is a media object and should be addressed to the second user's client computer 102. The server assembly 150 may then create an event and metadata for the second user's web client 124, and may retain the event and metadata in a queue until the server assembly 150 hears from the second user's web client 124. When the second user's web client 124 fires a pulse, the server assembly 150 may respond by transmitting the data in its queue, such as the event related to the media object, to the web client 124. The web client 124 may then receive the data in the queue, including the media object event. After the event is received, the second user's web client 124 may display the media object selected by the first user.

In an alternative exemplary embodiment, in which a communications channel is enabled between the second user's web client 124 and the server assembly 150, the media object may be delivered to the second user's client computer 102 via a push method. In that case, the server assembly 150 may remain aware of the web client 124 because of the open channel and, therefore, the web client 124 may remain available to respond to requests sent by the server assembly 150. The server assembly 150 may send the event and associated metadata directly to the second user's web client 124 without the web client 124 firing a pulse to determine whether it should receive the media object.

The networking system 300 may provide three categories of media objects, including packaged media objects, extended media objects, and bi-directional media objects.

A packaged media object may comprise a flash animation allowing little to no selectable customization by the first user. In other words, the packaged media object may be pre-packaged and sent as-is. The packaged media object may be an animation, such as a flash animation, which may include a catch phrase or punch line.

A packaged media object may be selected for delivery from various portions and web pages of the web site 305. Preferably, however, the first user may select and send a packaged media object from within a chat session with the second user. During the chat session, there may be a portion of the chat web page comprising a menu of sendable packaged media objects. The menu may represent each packaged media object as an icon, which may or may not be animated. For example, the web site 305 may provide a drop-down menu of selectable media objects. When the first user places a cursor over a menu item for a particular packaged media object, a pop-up may identify a name or description of the packaged media object.

When the first user clicks a list item representing a chosen packaged media object, the packaged media object may be delivered to the second user. In some embodiments of the networking system 300, before the packaged media object is sent, the first user may be asked to confirm that he wants to send the packaged media object. But this is not required. The networking system 300 may display the media object on the client computers 102 of both the first user and the second user. For example, if the media object comprises a flash animation, the flash animation may be played on each of the client computers 102.

Extended media objects may comprise interactable flash animations from the first user to the second user. For example, and not limitation, an extended media object may be a virtual gift, such as a locket containing an image selected by the first user. Alternatively, an extended media object may contain virtual food or a virtual beverage. In an exemplary embodiment of the networking system 300, the first user may select the extended media object from a virtual gift shop on the web site 305. The extended media object may then be displayed to the second user without affirmative prompting of the second user or, alternatively, the extended media object may be delivered to a virtual mail box or other virtual location of the second user. In the latter case, the second user may be required to retrieve the extended media object from its virtual location.

A difference between a packaged media object and an extended media object may be that, before a chosen extended media object is sent, the first user may be prompted to provide some degree of customization for the extended media object. For example, the first user may be asked to select a specific gift or beverage for the second user. As a result, unlike with a packaged media object, the first user may observe a different display of the media object than observed by the second user. For example, while the first user may view a virtual bar for selecting a drink to send the second user, the second user may view a prepared drink.

A bi-directional media object may allow, or require, interaction from both the first user and the second user. For example, and not limitation, the bi-directional media object may comprise a game for two or more players. The first user may initiate the bi-directional media object from, for example, a profile of the second user. Alternatively, the first user may choose to send a bi-directional media object and may then be prompted to select a recipient user, such as the second user, to receive the bi-directional media object. After the first user initiates the bi-directional media object, a prompt or invitation may be sent to the second user, requesting that the second user participate in the bi-directional media object.

During interaction within a bi-directional media object, the first user may dictate an action and may receive a response from the second user. This may occur iteratively in a bi-directional media object constituting an ongoing game. Selected action of the first and second users within a bi-directional media object may be stored in a shared object within a flash animation file.

Two or more users may participate in a bi-directional media object. When users, such as the first and second users, participate in a bi-directional media object, their web clients 124 may become statically linked through a dedicated server object providing a dedicated communications channel. This may provide an efficient delivery mechanism for the users.

The media object may be cached on the client computers 102 of the first and second users. In a first exemplary embodiment of the media interaction system 360, an HTTP protocol is provided for implementing a pull method for bi-directional media objects. The pull method may be similar to that described above for other media objects. With the bi-directional media object, however, the pulse from each involved web client 124 requests that the server assembly 150 act as a proxy, and that the data being transmitted from the web client 124 should be addressed to the dedicated server object associated with the bi-directional media object. In the pulse, the web client 124 may also request that the server assembly 150 transmit event data relating to the bi-directional media object, such as actions of other users participating in the bi-directional media object.

In another exemplary embodiment, when a communications channel is enabled between the web client 124 and the server assembly 150, a push method may be implemented similar to the push method described above. In that case, the web client 124 may have direct access to the dedicated server object, which may send events and metadata for the bi-directional media object directly to the involved web clients 124.

Because the bi-directional media object may require interaction from both the first and second users, it may be required that both users be logged into the web site 305 during use of the bi-directional media object.

When a bi-directional media object is complete, such as when a game has come to its conclusion, either of the users may choose to run the bi-directional media object again. In that case, the other user may receive a prompt requesting whether to replay the bi-directional media object. If the user and the second user agree to replay the bi-directional media object, the bi-directional media object may be restarted. Results of the bi-directional media object, such as who won a game in the bi-directional media object and statistics of the game, may be stored in a database on the server assembly 150 for future use.

Figure 15:
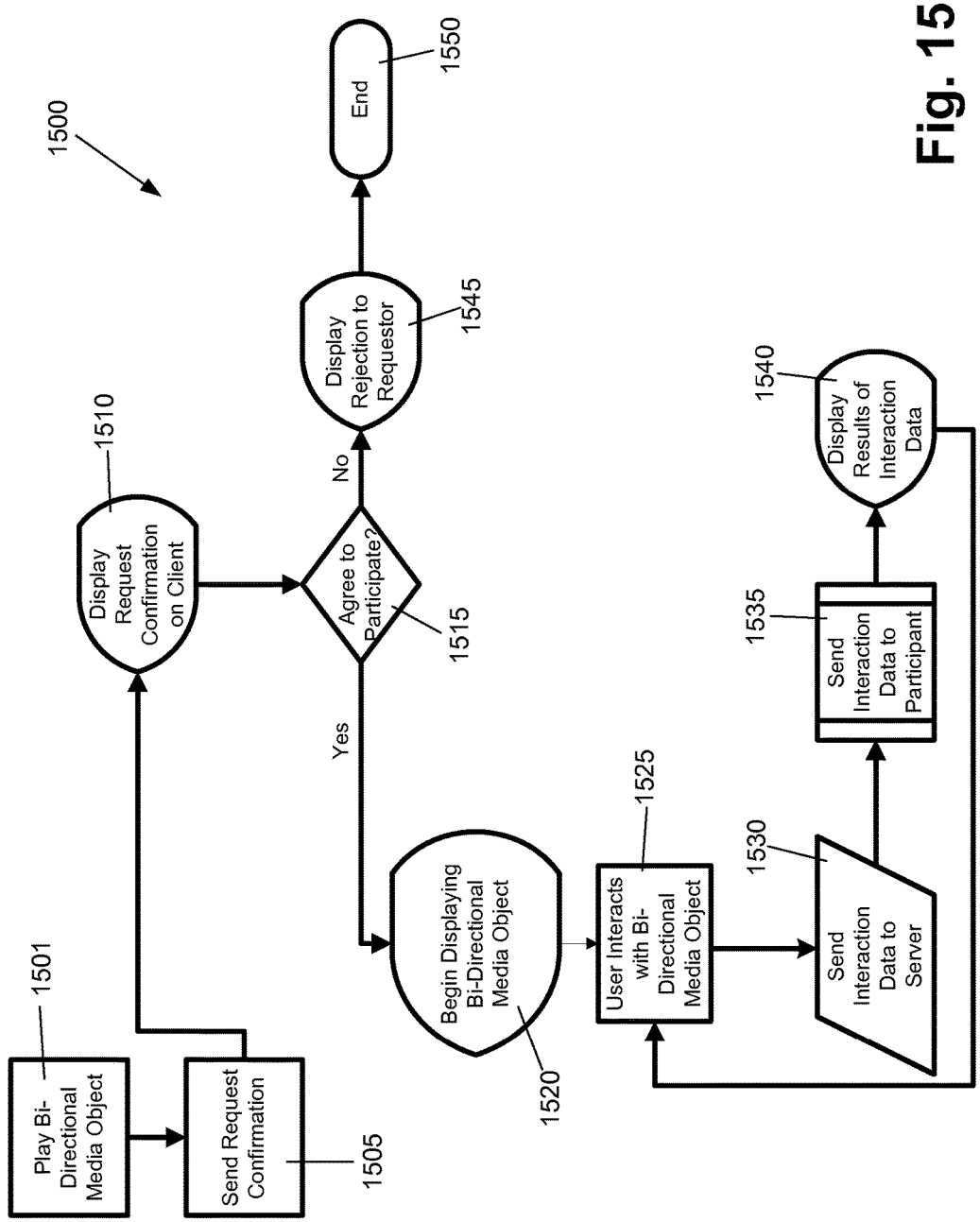
FIG. 15 illustrates a flow diagram of an operation of a media interaction system of the networking system, according to an exemplary embodiment of the present invention.

FIG. 15 illustrates a flow diagram of an operation 1500 of a bi-directional media object, according to an exemplary embodiment of the media interaction system 360. At 1501, a web client 124 may begin to play the bi-directional media object. At 1505 and 1510, the first user may send a request to the second user requesting participation in the bi-directional media object. At 1515, the second user may agree or refuse to participate. If the second user refuses, a rejection may be displayed to the first user at 1545, and the bi-directional media object may terminate at 1550. Otherwise, if the second user agrees to participate, the bi-directional media object may be displayed on the web clients 124 of both users at 1520. At 1525, a cycle may begin of the first and second users taking turns interacting with the bi-directional media object. In a first iteration of the cycle, the first user may interact with the bi-directional media object at 1525. Interaction data may be transmitted to the server assembly 150 at 1530, and may be transmitted to the second user at 1535. At 1540, the results of the first user's interaction may be displayed on the web clients 124 of the first and second users. Then, the cycle may repeat at 1525, with the second user interacting with the bi-directional media object.

Accordingly, the media interaction system 360 may enable users to interact with one another through multimedia content displayed on the web site 305.

Display System

The display system 370 of the web site 305 may provide a means to modify a look and feel of the web site 305 as presented to the user via the web client 124. Predetermined elements of the visual look and data content of the web site 305 may be user-adjustable. The data presented to the user may be customized by changing the colors and layout of web site data element containers. Also, the web site data presented may be filtered by the user's theme preference.

User configurations may be stored in a web cookie on the client computer 102, and in a database field unique to each individual user's profile. Web cookies provide a standard means for the web client 124 to maintain its state within a given internet domain. Accordingly, future visits to the web site 305 may not require the web client 124 to download data relating to the theme, color, or display defaults for the user. The web cookie may remain on the client computer 102 even after the web client 124 is closed. If the user logs into the web site 305 and the web client 124 is unable to find a web cookie on the client computer 102, the web client 124 may then retrieve default theme, color, and display value, and may create a web cookie for future use.

When the user logs onto the web site 305, an access token is generated for the user. A new access token may be generated each time a user is authenticated and logs into the web site 305. The access may be provided to the server assembly 150 when the web client 124 interacts with the server assembly 150. The access token may enable the server assembly 150 to uniquely identify the web client 124. The access token may have a limited lifespan and may be regenerated at each login. The access token may be stored in web cookies and in a cache object. While the user is logged into the web site 305, the user's configurations may be stored in the cache object in addition to being stored in the database.

If the user has not selected a preferred theme or color in their web site preferences, a default theme and color may be used. Default configurations may be based on certain data relating to the user. Such data determining the default configuration may include, without limitation, the user's member category (i.e., common or featured), gender, or specified purpose for using the web site 305. The web site manager 308 may modify available themes and color schemes periodically, or at any time. Users may be able to change a displayed color scheme with a single mouse click. This may be made possible by switching cascading style sheets ("CSS") and page graphics of the web site 305 through an object-oriented language and dynamic updates.

Page graphics and text may be altered for a variety of needs. Such alteration may be implemented by using compartmentalization, or a hierarchy, for art and text for presentation to the user via the web client 124. For example, distinct folders may be provided for site, theme, and sub-theme. Each folder may include, for example, a color and a language. Further, each color for site, theme, and sub-theme may include its own language folder.

By breaking the site into these compartments, a change of folder reference for each CSS, graphic, or text object may dynamically change colors, themes, and languages without requiring reloading of a web page on the web site 305. This implementation may also simplify development of the web site 305, as background code need not define themes, sub-themes, languages, or colors. New themes, colors, languages, and various other configuration details may be provided without any additional code.

When the user changes his or her color preference, the change is stored in the current session's cache object and in the user's local web cookie. The user's login session on the web site 305 may expire from the cache object after the web site 305 is unloaded from the web client 124. Removal of the cache object on the server assembly 150 may occur by various means. In an exemplary embodiment of the display system 370, the web client 124 may send a log-off request to the server assembly 150. In the event this signal is not received, the server assembly 150 may recognize that the web client's pulse has terminated. Then, the server assembly 150 may retain the cache object for a predetermined duration, or until occurrence of a predetermined event, before removing the cache object. Retaining the cache object for a predetermined duration, or until occurrence of a predetermined event, may ensure that the server assembly 150 does not prematurely remove the cache object.

At a color change request, various tasks may be performed to effect a new color scheme. The user's cache object may modify a stored color value. The user's web site cookie may be altered with the new color value. The user's web site preferences database field may be updated with the new color value. The CSS provided for web site 305 rendering may change to a CSS specific to the new color value. Additionally, the web site 305 may be re-rendered using the new web site preference color.

As described above, color changes may be implemented through folder compartmentalization. Folders may be provided for each color option of the web site 305. Accordingly, the web client 124 may dynamically alter a color of the web site 305 without requiring a re-login or reloading of a web page of the web site 305.

Themes may be provided to allow the user to further customize the web site 305. A theme may define graphic images and data content presented to the user. In addition to being stored in the user's database field, the chosen theme may also be stored in the cache object when the user is logged into the web site 305.

When the user selects an available theme, a dynamic update may instruct the application code to display an appropriate set of data and graphics applicable to the theme. The theme choice may be implemented through an object-oriented programming language, and may be processed on the pre-render of page elements.

Photo Management System

As mentioned above, the networking system 300 may further include a photo management system 380. The photo management system 380 may enable viewing, organizing, and editing images associated with a user account. Such images may include, but are not limited to, photographs and graphical representations of objects.

With the photo management system 380, a user may have an image library on the web site 305, and may utilize an image editor on the web site 305 to modify images in the image library. A user may be able to view photo libraries, or predetermined portions of photo libraries, of other users. The user may upload images to the library, and may also create and modify images in the library. From the image library, the user may sort images and arrange images in folders for more efficient organization.

The photo management system 380 may include a gallery for viewing images in the image library. In the gallery, the user may scroll through all images, or a set of images, in the image library.

To enable uploading of images, a photo upload dialog may be provided on a web page of the photo management system 380. Through the photo upload dialog, the user may browse images on, or linked to, the client computer 102 and may choose one or more of such photos to add to the image library. A browser of the photo upload dialog may enable users to view thumbnails of images on the client computer 102. This may enable the user to more efficiently select images that the user intends to add to the image library.

Uploaded or newly created images in the image library may not be immediately viewable by other users. When uploaded or created, a new image may have an unapproved status. While approved images may be viewable by others, unapproved images may not be viewable by other users. For an image status to change from unapproved to approved, the web site manager 308 may be required to approve the image. Additionally, an image may not be viewable if it has not been selected as a viewable image by the user of the image.

The photo management system 380 may require that no more than a predetermined number of images from the user's image library be appointed for each purpose that may be given to images. For example, and not limitation, the user may be required to select no more than a predetermined number of images viewable by other users, or no more than a predetermined number of images viewable by those other users categorized as "friends" of the user. The user may appoint an image to a certain purpose by dragging the image into a designated section of a web page of the photo management system 380.

Figure 16:
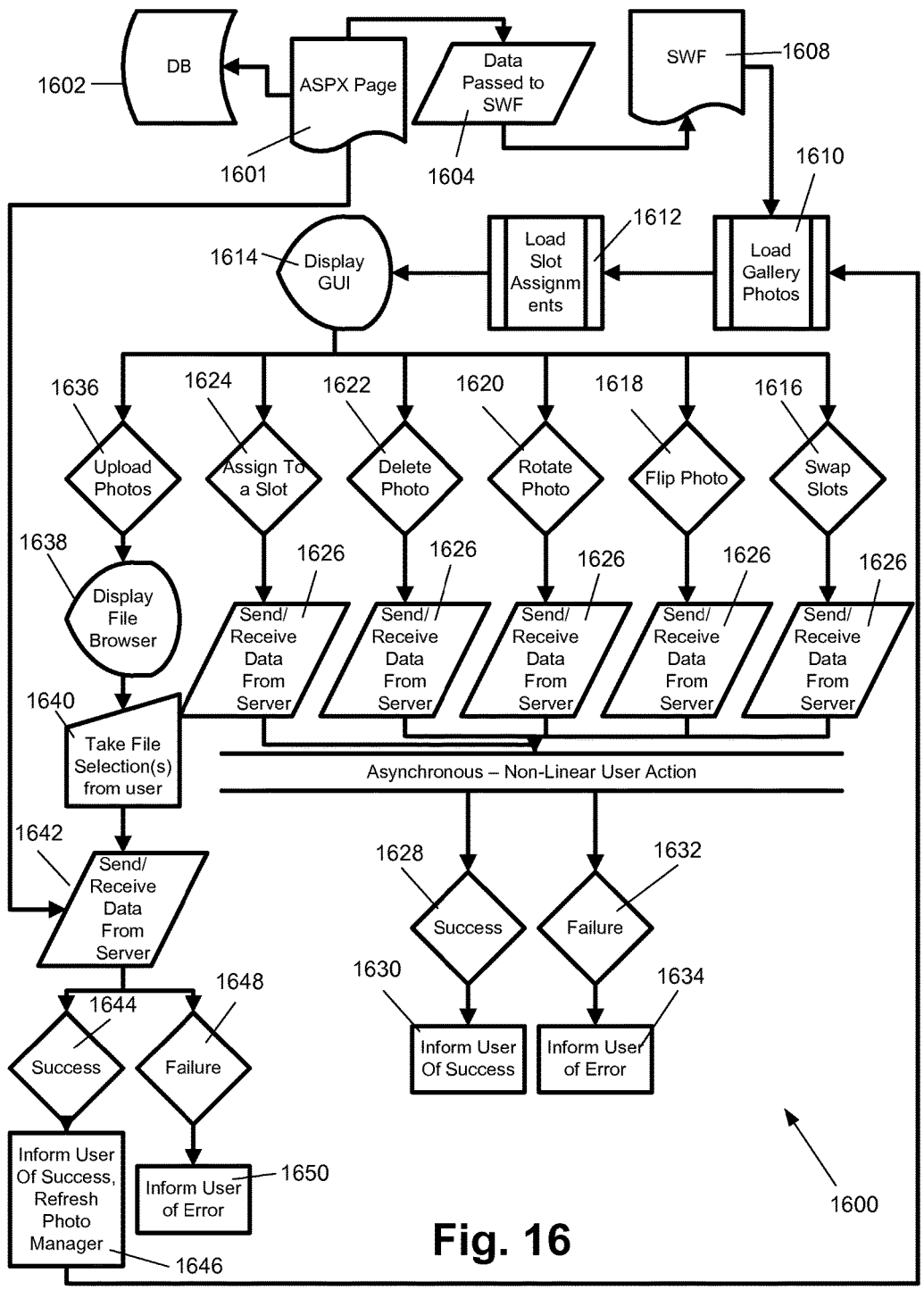
FIG. 16 illustrates a flow diagram of an operation of a photo management system of the networking system, according to an exemplary embodiment of the present invention.

FIG. 16 illustrates a flow diagram of a process 1600 of managing and editing images in an exemplary photo management system 380. At 1601 and 1602, the web client 124 may communicate with a database on the server assembly 150. At 1604 and 1608, the web client 124 may receive image data from the database. The web client 124 may then load images from the image library at 1610. At 1612, the web client 124 may assign the images according to their appointments, such as assigning a position of an image in a certain location based on whether the image represents part of the user's viewable profile, or whether the image is viewable only to friends. The web client 124 may display a graphical user interface to the user at 1614.

The user may then have an ability to perform actions regarding the images, as described above. At 1616, the user may modify appointments of various images. At 1618, the user may flip an image. At 1620, the user may rotate an image. At 1622, the user may delete an image from the image library. At 1624, the user may assign an image to a particular appointment. After the user selects any one of the above actions, data may be communicated between the client computer 102 and the server assembly 150 to accomplish the selected task, and to store the user's modifications to images on the database of the server assembly 150. If the selected action was successful at 1628, the web site 305 may notify the user of the success at 1630. Alternatively, if the action failed at 1632, the user may be notified of the failure at 1634.

The user may upload images to the image library at 1636. In an exemplary embodiment of the photo management system 380, a file browser may be displayed at 1638 to assist the user in selecting a file to be uploaded. At 1640, the selected file may be prepared for uploading, and at 1642, image data from the selected file may be transmitted from the client computer 102 to the server assembly 150. If this operation is successful at 1644, a confirmation may be displayed to the user at 1646. Also at 1646, the web client 124 may refresh a web page of the image library to display the image library containing an image from the selected file. The process 1600 may then, once again, load images in the image library at 1610. Alternatively, if the operation of uploading the selected image file fails at 1648, an error message may be displayed to the user at 1650.

The image editor of the photo management system 380 may enable the user to modify images in the image library. The image editor may include tools to crop an image, rotate an image, flip an image, delete an image, create a photo profile, and various other image-editing tools.

Additionally, the photo editor may provide a tool enabling the user to create a thumbnail image, which may represent the user on the web site 305. The user may associate the thumbnail image with text, which may be used in conjunction with the thumbnail to represent the user on the web site 305. Preferably, the user may have only a single thumbnail image, so creating a new thumbnail may automatically delete any old thumbnail.

The thumbnail tool may enable the user to crop an image to a specified size or to specified dimensions or aspect ratio. To use the thumbnail photo, the user may first select an image from the image library. The user may select a first point on the selected image, and may do so by clicking with a mouse button, with a cursor over the first point, and holding the mouse button down. The user may then select a second point on the selected image. Selecting the second point may entail dragging the cursor to the second point while holding the mouse button down, and then releasing the mouse button with the cursor over the second point. As the user drags the cursor between the first and second points, a rectangle may be displayed between the first and second point, such that the first and second points lie on opposite corners of the rectangle. If valid, a portion of the selected image lying inside the rectangle may represent a new thumbnail created by the user. The selected portion may be deemed invalid, however, if, for example, the rectangle extends outside the bounds of the image. If the selected portion is invalid, a new thumbnail may not be created for the user.

Figure 17:
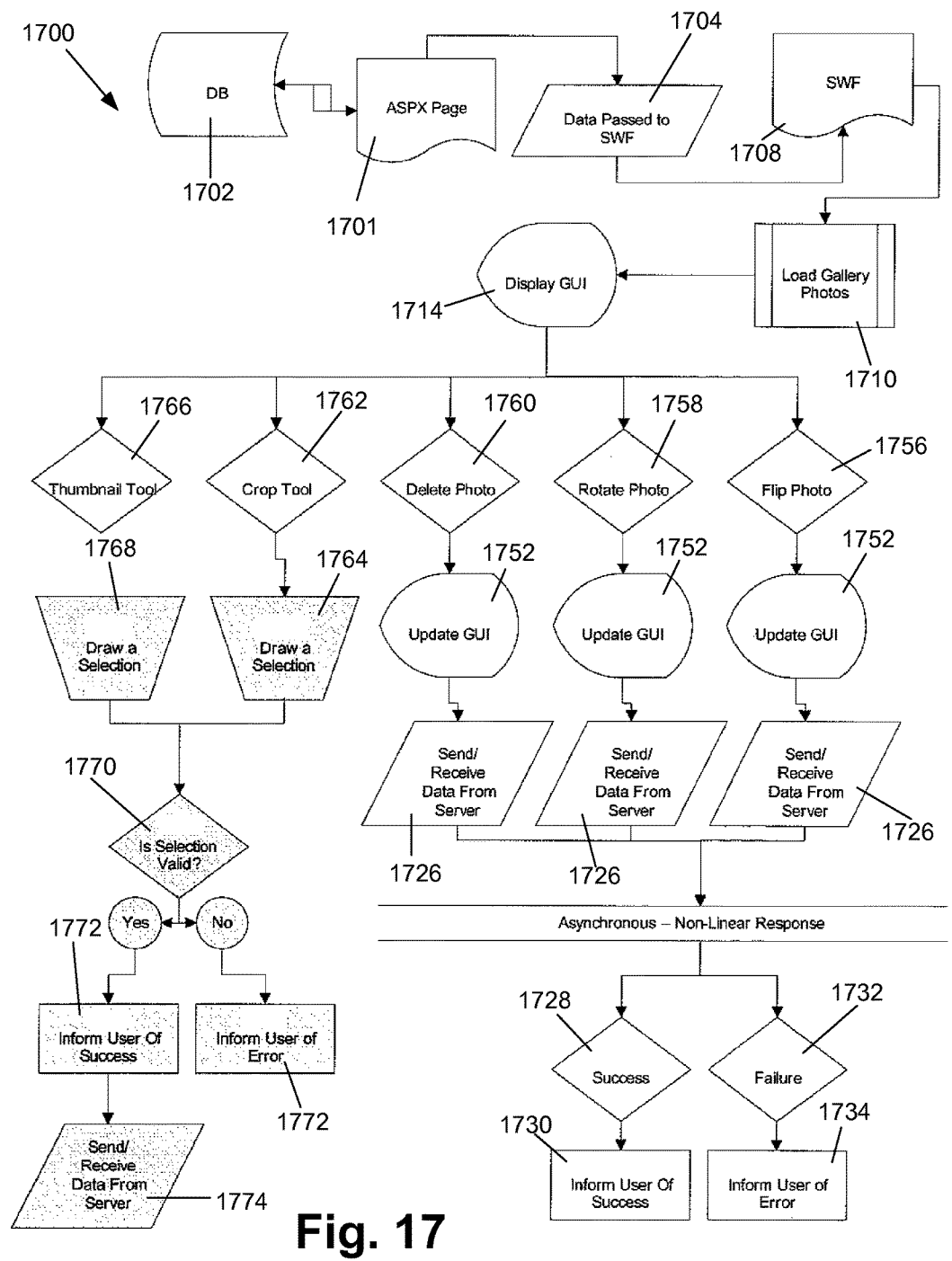
FIG. 17 illustrates a flow diagram of an operation of a photo editor of the photo management system of the networking system, according to an exemplary embodiment of the present invention.

FIG. 17 illustrates a process 1700 of editing images with an exemplary image editor of the photo management system 380. After the networking system 300 displays the graphical user interface at 1614 (as described in FIG. 16), the user may edit images as described above. For example, the user may perform any of the following: flip an image at 1756, rotate an image at 1758, delete an image at 1760, and create a thumbnail at 1766. At 1726, data regarding the user's image modifications may be communicated between the client computer 102 and the server assembly 150. If the modifications fail at 1732, the user may be informed of the failure at 1734. On the other hand, if the modifications succeed at 1728, the user may be informed of the success at 1730.

At 1762, the user may attempt to crop an image. At 1764 and 1768, the user may select a portion of the image as described above, with respect to creating a thumbnail. At 1770, the networking system 300 may determine whether the selected portion of the image is valid. At 1772, the user may be informed of success or failure of cropping the image based on the user's selection. If the cropping was successful, data may be sent to the server assembly 150 to store the user's modifications to the image at 1774.

Figure 18:
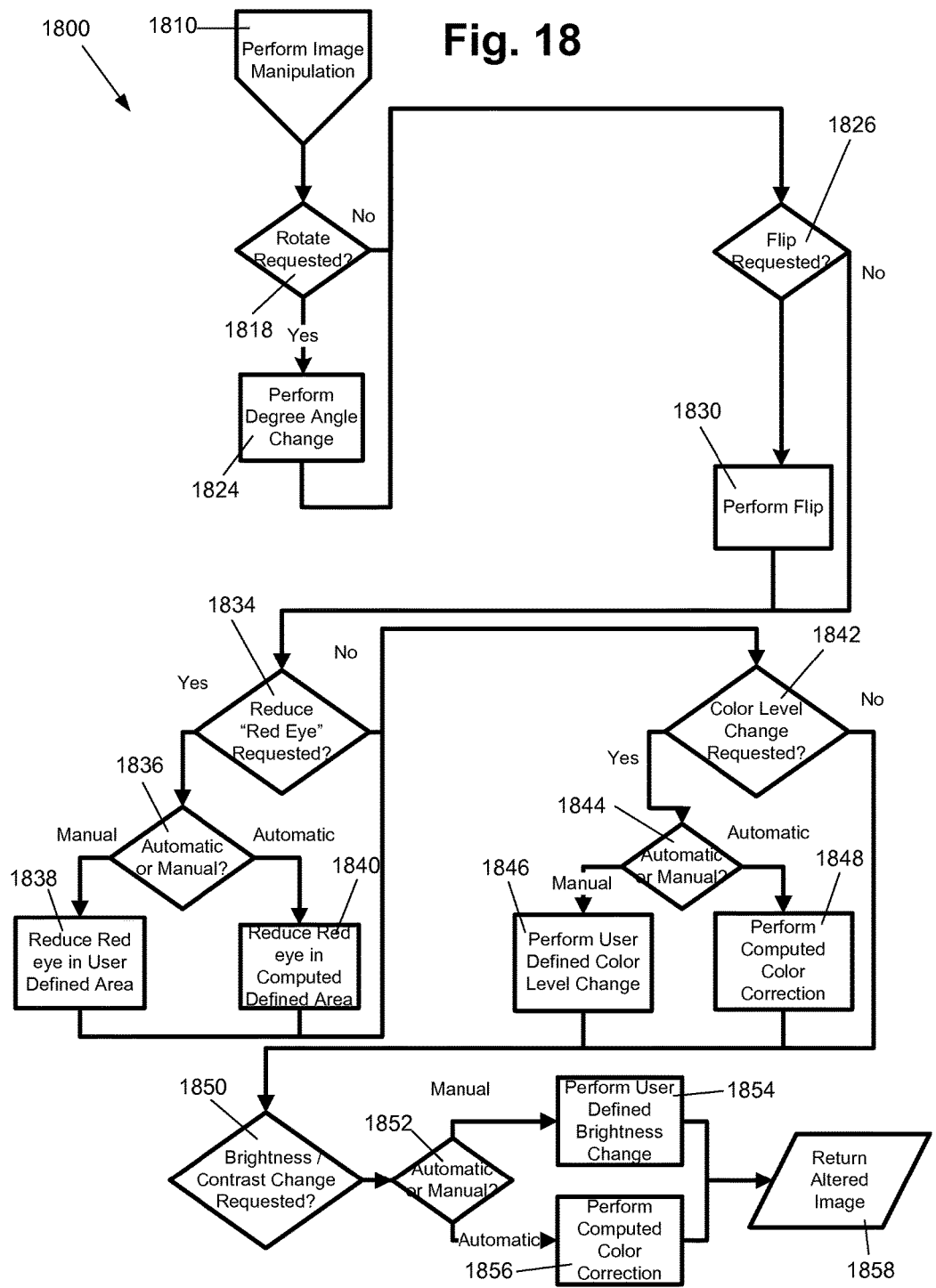
FIG. 18 illustrates a flow diagram of an implementation of the photo editor of the photo management system, according to an exemplary embodiment of the present invention.

The networking system 300 may store both an original raw image and a set of attributes representing modification to the image. The modifications may be a result of photo editing on the part of the user. The attributes may contain all data required to reconstitute the current image having the user's previous modifications. Accordingly, when an image is to be displayed on the client computer 102, the raw image may be manipulated with the stored attributes before being delivered to the client computer 102. FIG. 18 illustrates a flow diagram of an exemplary process 1800 of delivering images to the client computer 102 in the photo management system 380.

As shown in FIG. 18, at 1818, the networking system 300 determines whether the user has requested a rotation of the image. Such determination may occur by examining the stored attributes associated with the image. If a rotation is requested, at 1824, the desired rotation is performed. At 1826, the networking system 300 may determine whether the image should be flipped. At 1834, the networking system 300 may determine whether to perform red-eye reduction and, at 1836, whether such red-eye reduction is to be performed manually or automatically. The networking system 300 may then use the attributes to re-perform the red-eye reduction as originally performed. If a manual red-eye reduction was performed, characteristics of such reduction may be retrievable from the stored attributes.

At 1842, the networking system 300 may determine whether color levels should be modified. If so, at 1844, the networking system 300 may determine whether the user desired manual or automatic modification of color levels. At 1850, the networking system 300 may determine whether to modify brightness and contrast of the image and, at 1852, whether such modifications are manual or automatic. At 1854 and 1856, the networking system 300 may perform the requested modifications. Finally, at 1858 the resulting image is returned.

The image may be at least partially defined by image manipulation arguments, which may reflect the user's modifications to the image. The server assembly 150 may store each image as well as one or more sets of image manipulation arguments. The image manipulation arguments may be stored in a table or array along with a reference to the associated image. Each set of manipulation arguments for the image may define a displayable image created through a set of user manipulations to the original image. For example, a user may create a thumbnail from the original image to identify the user on the web site 305. The user may also rotate and crop the original image for display in the user's profile. Depending on whether the web site 305 is displaying the thumbnail version of the image or the profile version of the image, the networking system 300 may apply a different set of manipulation arguments to the image when displaying the image on the web site 305.

Preferably, the image manipulation arguments define modifications to the image in a coordinate system of the image. For example, if the user rotates and then crops the image, both operations may be stored in a set of image manipulation arguments with reference to coordinates relative to one or more points on the image. This enables appearance of the image to be independent of an order in which the rotation and cropping are applied to the image before the image is displayed. If, in contrast, operations are stored with reference to an absolute coordinate system, then reconstituting the modified image would require performing the operations in the order in which the user originally performed such operations. The present photo management system 380 may allow more flexibility by enabling operations within a set of manipulation arguments to be stored in various orders.

A second set of arguments, display arguments, associated with an image may be provided to define how the web client 124 may manipulate formatting and display of the image. For example, although the image may be stored in a size of 800×600 pixels, the web client 124 may display the image into a 320×200 display area. Accordingly, display arguments may instruct the web client 124 to shrink the image to fit in a 320×200 display area.

Figure 19:
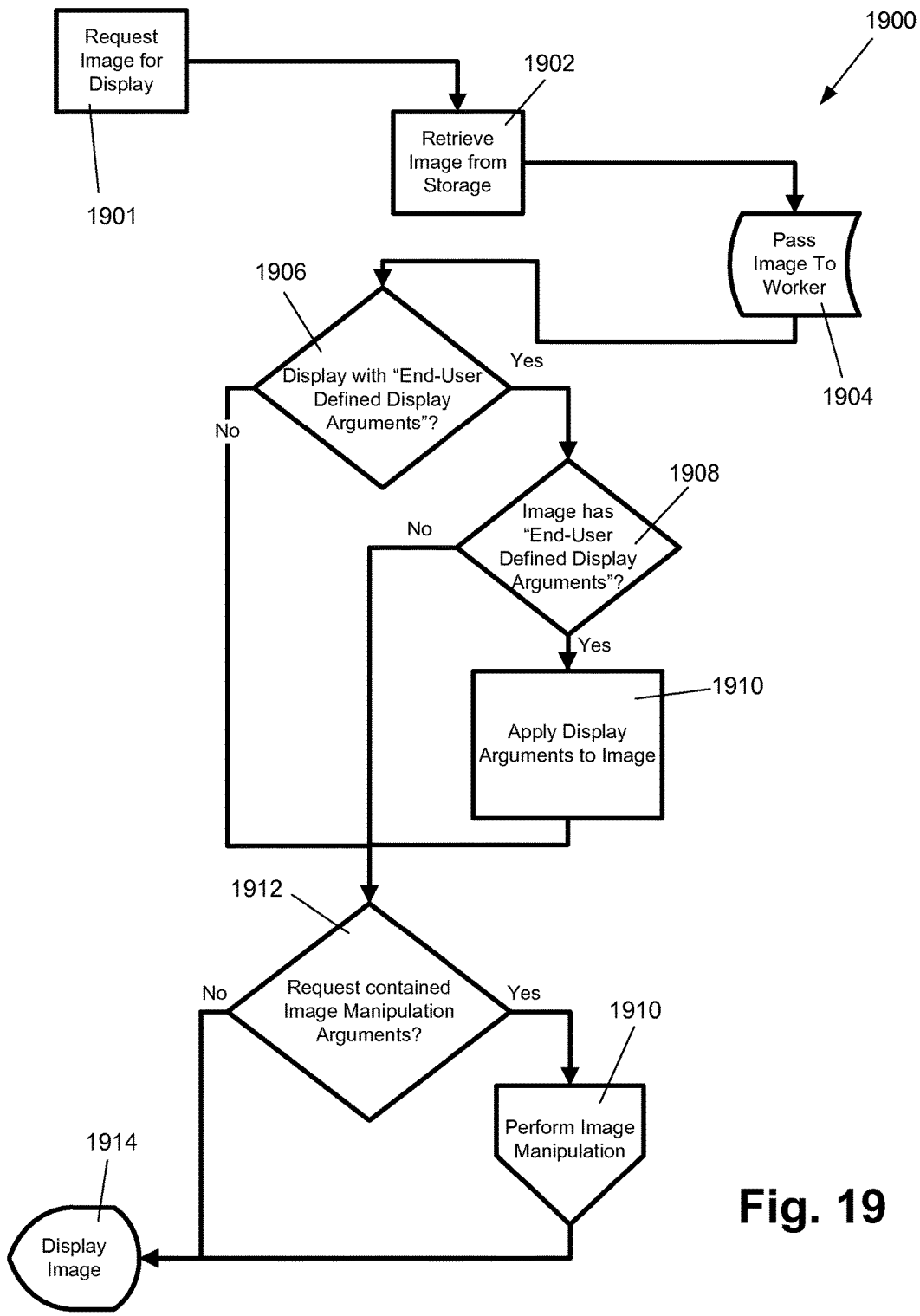
FIG. 19 illustrates a flow diagram of a process of displaying an image in the photo management system of the networking system, according to an exemplary embodiment of the present invention.

FIG. 19 illustrates a flow diagram of a process 1900 of displaying an image in the photo management system 380. At 1901, the user may request that an image be displayed. Accordingly, the networking system 300 may retrieve the image from storage on the server assembly 150 at 1902 and 1904. At 1906, the networking system 300 may determine whether there are any display arguments for the image. At 1908, the networking system 300 may determine that display arguments should be applied to the image, and such arguments are applied at 1910. After the display arguments have been applied, or after the networking system 300 determines that display arguments need not be applied, at 1912, the networking system 300 may determine whether the user requested any user manipulation arguments for the image. If user manipulation arguments exist for the image, the networking system 300 may manipulate the image according to the user manipulation arguments beginning at 1810 (FIG. 18). Finally, at 1914, the image may be displayed to the user.

Image caching may be provided in the photo management system 380 of the networking system 300. Caching may result in efficient image loading, while maintaining conventional benefits of retaining stored images on the database, such as reliable long-term storage. When a web client 124 requests an image from the networking system 300, the image may be modified by parameters of the stored attributes before the image is delivered to the web client 124 at the client computer 102. Images are modified by the processing server using a series of parameters provided when a request is made. After all modifications are complete, the images may be saved to a cache server, which may comprise a storage device associated with a server in the server assembly 150. Use of the cache server to store the modified image may reduce or eliminate the need for the server assembly 150 to repetitively process the image before displaying it. Data in the cache server may be disposable and, accordingly, may be removed from the cache server when the user logs out or when space is needed. The storage device may be implemented in a Redundant Array of Inexpensive Disks ("RAID") array to enhance speed, capacity, and performance of the storage device.

Image caching may relieve the server assembly 150 of potentially extensive processing of the image, by writing the image to the storage device after the image has been modified according to its associated stored attributes. If the image is requested again, the networking system 300 may retrieve a cached copy of the image from the storage device instead of from a database on the server assembly 150.

A benefit of image caching is stateless replication, which enables new servers to be added to the server assembly 150 without replicating an existing cache. Conventionally, each server would be required to replicate caches of other servers, and to synchronize its cache with other servers. This utilizes time and bandwidth. In exemplary embodiments of the photo management system 380, however, a newly-added server would not be required to synchronize cached images with other servers of the server assembly 150. If a requested image does not exist on a storage device of the new server, the image may be retrieved from the database, modified, and then cached on the new server. Accordingly, the caching of a particular image need not occur until that image is needed by the new server.

Messaging System

As mentioned above, the networking system 300 may further comprise a messaging system 390. The messaging system 390 may enable a first user to leave a message for a second user of the networking system 300. For example, the messaging system 390 may enable a common user 615 to leave a message for a featured user 635, such that the featured user 635 may view and respond to the message at the convenience of the featured user 635. A featured user 635 may also leave a message for a common user 615. Additionally, a common user 615 may leave a message for another common user 615, and a featured user 635 may leave a message for another featured user 635.

Figure 20:
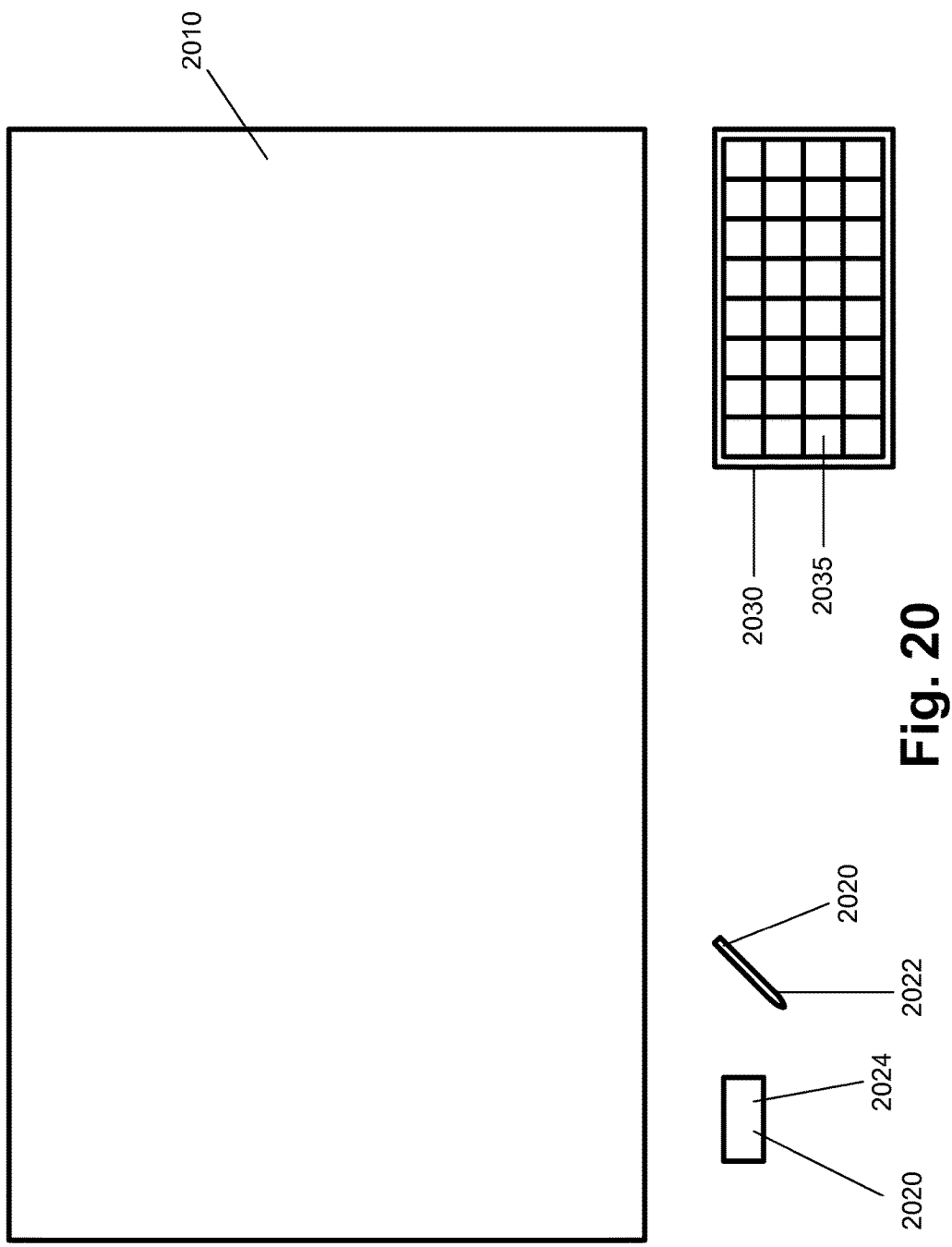
FIG. 20 illustrates a web page of a messaging system of the networking system, according to an exemplary embodiment of the present invention.

FIG. 20 illustrates an exemplary web page of the messaging system 390. As shown in FIG. 20, the messaging system 390 may comprise a message area 2010, at least one graphical tool 2020, and a color selector 2030.

The message area 2010 may provide a background for the message. In some exemplary embodiments of the messaging system 390, the message area 2010 may look similar to a whiteboard, blackboard, piece of paper, computer monitor, or various other objects on which one might conventionally leave a message or receive a message. The look and feel of the message area 2010 may be customizable. For example, and not limitation, the first user may change an appearance of the background provided by the message area 2010 by clicking a button labeled "Background" on the web page.

In an exemplary embodiment of the messaging system 390, the message area 2010 of a particular user may retain text and images left by previous users of the same message area 2010. Accordingly, when the first user views the web page displaying the second user's message area 2010, the first user may see messages previously left by the first user and by other users.

The graphical tools 2020 may comprise one or more representations of implements for creating the message. For example, a stylus 2022 and an eraser 2024 may be provided as graphical tools 2020. Other graphical tools 2020 provided may include, without limitation, a text tool, a brush tool, a spray paint tool, a straight line tool, a rectangle tool, and a circle tool. When activated, the stylus 2022 may add portions of a message to the message area 2010, while the eraser 2024 may remove portions of a message from the message area 2010.

Characteristics of the graphical tools 2020 may be customizable. For example, a size and shape of a graphical tool 2020 may be customizable, which may result in a customizable size and shape of modifications resulting from use of the graphical tool 2020. For example, increasing the size of the stylus 2022 may increase a width of a line drawn in the message area 2010 with the stylus 2022. Additionally, transparency of a graphical tool 2020 may be customizable, such that a resulting modification to the message area 2010 may become more or less opaque. Customizations may affect a single graphical tool 2020 or, alternatively, all graphical tools 2020, depending on either user preference or a specific embodiment of the messaging system 390.

The color selector 2030 may present the first user with two or more color blocks 2035 containing colors applicable to one or more graphical tools 2020. Each color block 2035 may be a predetermined color. When the first user selects a color block 2035, the color of the color block 2035 may be applied to the graphical tool 2020 next utilized in the message area 2010. A default color may be provided if the first user does not select a color block 2035. For example, a black color may be applied to graphical tools 2020 when the first user does not select a color block 2035.

Additionally, the color selector 2030 may allow the first user to adjust characteristics of a color, such as hue and saturation, and thereby create a custom color for application to a graphical tool 2020.

A message of the messaging system 390 may be created by manipulating a graphical tool 2020 on or in proximity to the message area 2010. The first user may select a graphical tool 2020 and, optionally, a color. When the first user activates the graphical tool 2020, such as by clicking a mouse button, the graphical tool 2020 may be applied to the message area 2010, thereby modifying a visual appearance of the message area 2010. For example, when the stylus 2022 is activated, moving the stylus 2022 across the message area 2010 may result in a line being drawn along a path of the stylus 2022 in the message area 2010. For further example, when the eraser 2024 moves across the message area 2010, text and images in a path of the eraser 2024 may be removed from the message area 2010. The modified visual appearance of the message area 2010 represents a viewable message. The message may comprise various combinations of text and images in the message area 2010, and may or may not be intended to portray a specific idea to a recipient of the message.

During message creation, the first user may be able to save the message. This may be enabled, for example, through use of a web page button or link labeled "Save."

Further, the first user may be able to undo a previous action. This may be enabled, for example, through use of a button or link labeled "Undo." In some exemplary embodiments of the messaging system 390, an action may not be undone if the action preceded a saving of the message, as described above.

Figure 21:
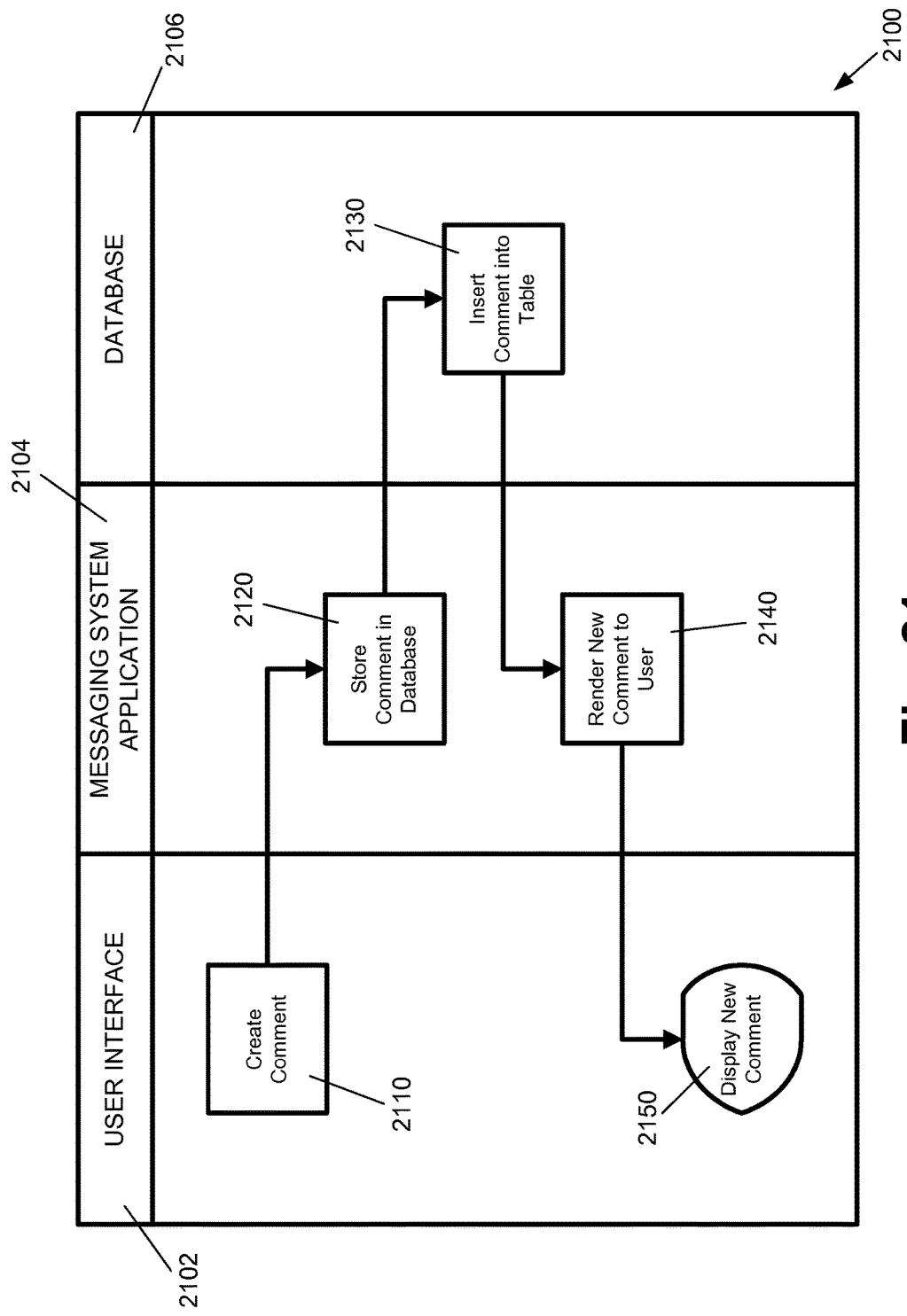
FIG. 21 illustrates a flow diagram of an operation of leaving a message through a messaging system of the networking system, according to an exemplary embodiment of the present invention.

FIG. 21 illustrates a flow diagram of an exemplary process 2100 of leaving a message, such as a text comment, through the messaging system 390. As shown in FIG. 21, three layers of operation may be implemented in the messaging system 390. These operational layers may include a user interface layer 2102, an application layer 2104, and a database layer 2106. Steps of the process 2100 occurring in the user interface layer 2102 may describe an interaction of the messaging system 390 with the user. Steps of the process 2100 occurring in the application layer 2104 may represent operations that occur in the client computer 102. Finally, steps in the database layer 2106 may occur in a database on the server assembly 150.

At 2110, the first user may enter a text comment for the second user. This may occur through use of the stylus 2022. After such text is produced, the text is stored as a record in a database on the server assembly 150 at 2120. Accordingly, at 2130, the text may be retained in a table of the database and properly associated with a message area 2010 of the second user. At 2140, the new text comment may be rendered. Rendering may generally take place behind the scenes of the web page, and a rendered image may not be viewable until displayed on the web page. At 2150, the new text comment may be displayed in the message area 2010, which may occur by making viewable a rendered image of the text comment.

FIG. 22 illustrates a flow diagram of an exemplary operation 2200 of retrieving a message, such as a text comment, from the messaging system 390. As in FIG. 21, three layers of operation 2102, 2104, and 2106 may be utilized in retrieving a message. At 2210, the first user may request that a text comment be displayed. Such a request may be implied when the first user navigates to a web page displaying the message area 2010. The request may be transmitted through the messaging system application, at 2220, to the database. At 2230, the text comment may be retrieved from the database. The messaging system 390 may then render the text comment, preferably in HTML format, at 2240. Finally, at 2250, the text comment may be displayed to the first user.

FIG. 23 illustrates a flow diagram of an exemplary general operation 2300 of the messaging system 390. At 2301 and 2302, the web client 124 may communicate with a database on the server assembly 150 regarding message data. At 2304 and 2307, the web client 124 may receive message data from the database. The web client 124 may then display the graphical user interface ("GUI"), including the message area 2010, via the web client 124 to display messages to a user. At 2310, the messaging system 390 may determine whether the user is attempting to leave a comment in the message area 2010. If so, the user's comment is accepted at 2312. Otherwise, an empty comment is accepted at 2313.

At 2314, a record may be created in the database for storing the comment. At 2316 and 2326, the web client 124 and the server assembly 150 may communicate with each other. The web client 124 informs the server assembly 150 of modifications to the message area 2010, so that the database on the server assembly 150 may be updated. The server assembly 150 may then send a confirmation to the web client 124. At 2318, the GUI may be update to display the new comment to the user.

Operations similar to those of the image editor of the photo management system 380 may also be integrated into the messaging system 390. For example, and not limitation, at 2322, the user may select a tool to modify the GUI. Specifically, the user may modify the message area 2010 by leaving a message. After a modification, the GUI may be updated to display the modifications to the user.

If the user indicates that he would like to save his modifications to the message area 2010, the messaging system 390 may receive a command to the save at 2320. The web site 305 may prompt the user for confirmation at 2321. If the user confirms his desire to save, an image of the message area 2010 may be sent to the server assembly 150 at 2324. At 2326, the database on the server assembly 150 may be updated with the user's modifications. Hence, the user may leave a message in the message area 2010, and may save his message for later viewing. After the database is updated, the message application 2104 may close at 2328.

Accordingly, through implementation of the crediting system 310, the chat bidding system 330, the performance bidding system 340, the telephony switching system 350, the media interaction system 360, the display system 370, the photo management system 380, and the messaging system 390, the networking system 300 may enable interaction between users.

While the networking system 300 has been disclosed in exemplary forms, it will be apparent to those skilled in the art that many modifications, additions, and deletions may be made without departing from the spirit and scope of the system, method, and their equivalents, as set forth in the following claims.

The invention claimed is:

1. An enhanced networking system comprising:
one or more processors; and
at least one memory in communication with the one or more processors and storing instructions that, when executed by the one or more processors, are configured to cause the system to:
provide a plurality of user accounts, the plurality of user accounts including a first user account associated with a first user;
associate a first credit account with the first user account;
responsive to detecting that a balance of the first credit account is at or below a predetermined threshold, automatically apply a sponsored status to the first user account;
provide a plurality of featured user accounts; and
responsive to receiving a request for the first user to participate in an activity with one or more of the featured user accounts, automatically debit a second credit account associated with a second user.

2. The system of claim 1 further storing instructions that, when executed by the one or more processors, are configured to cause the system to:
display a representation of the first user account while the balance of the first credit account is at or above the predetermined threshold; and
dynamically update the representation of the first user account to indicate the sponsored status, after the sponsored status is applied to the first user account.

3. The system of claim 1, wherein the second user is a sponsor of the first user.

4. The system of claim 1, wherein the first user and the request for the first user to participate in an activity with one or more of the featured user accounts meet the second user's sponsorship rules.

5. A computer-enabled method comprising:
providing a plurality of user accounts, each of the plurality of user accounts associated with a user and a credit account;
receiving, from a first user associated with a first user account, (i) an indication of a preference to be a sponsor and (ii) first user sponsorship criteria;
receiving, from a second user associated with a second user account, and indication of a preference to be sponsored; and
responsive to (i) receiving a request for a second user to participate in an activity with a featured user account, and (ii) determining that the second user and the activity with the featured user account meet the first user sponsorship criteria, automatically debiting a first credit account associated with the first user account to pay for the second user to participate in the activity with the featured user account.

6. The computer-enabled method of claim 5 further comprising determining that a second credit account associated with the second user account is below a sponsorship threshold prior to automatically debiting the first credit account.

7. A computer-enabled method comprising:
providing a plurality of user accounts, each of the plurality of user accounts associated with a user and a credit account;

receiving, from a first user associated with a first user account, an indication of a preference to be a sponsor;

receiving, from a second user associated with a second user account, and indication of a preference to be sponsored;

receiving, from the first user, a sponsorship offer to sponsor the second user;

responsive to receiving, from the second user, (i) an indication of an acceptance of the sponsorship offer and (ii) a request for the second user to participate in an activity with a featured user account, automatically debiting a credit account associated with the first user account.

* * * * *